(12) United States Patent
Vacher et al.

(10) Patent No.: US 11,795,009 B2
(45) Date of Patent: Oct. 24, 2023

(54) METHOD FOR MERGING, WITHIN A LOGISTICAL WAREHOUSE, K INCOMING FLOWS OF PAYLOADS INTO ONE OUTGOING FLOW

(71) Applicants: SAVOYE, Dijon (FR); UNIVERSITE DE TECHNOLOGIE DE COMPIEGNE, Compiegne (FR)

(72) Inventors: Blandine Vacher, Neuilly-le-Real (FR); Stéphane Pietrowicz, Fixin (FR); Antoine Jouglet, Compiegne (FR); Dritan Nace, Compiegne (FR)

(73) Assignees: SAVOYE, Dijon (FR); UNIVERSITE DE TECHNOLOGIE DE COMPIEGNE, Compiegne (FR)

( * ) Notice: Subject to any disclaimer, the term of this patent is extended or adjusted under 35 U.S.C. 154(b) by 595 days.

(21) Appl. No.: 17/083,887

(22) Filed: Oct. 29, 2020

(65) Prior Publication Data
US 2021/0130107 A1   May 6, 2021

(30) Foreign Application Priority Data

Oct. 30, 2019 (FR) ........................................ 1912231
Nov. 15, 2019 (FR) ........................................ 1912777

(51) Int. Cl.
*B65G 47/70* (2006.01)
*B65G 47/68* (2006.01)
(Continued)

(52) U.S. Cl.
CPC ........... *B65G 47/70* (2013.01); *B65G 47/681* (2013.01); *G05B 19/042* (2013.01); *G05B 2219/2621* (2013.01)

(58) Field of Classification Search
CPC .... B65G 47/70; B65G 47/681; G05B 19/042; G05B 2219/2621; G06Q 50/28; G06Q 10/06312
See application file for complete search history.

(56) References Cited

U.S. PATENT DOCUMENTS 4,501,528 A * 2/1985 Knapp .................... B65G 1/08
                                                       221/13
8,327,609 B2 * 12/2012 Krizmanic ........... B65G 1/1378
                                                         53/473
(Continued)

FOREIGN PATENT DOCUMENTS

WO      2013150080 A1   10/2013

OTHER PUBLICATIONS

French Search Report and Written Opinion dated Mar. 26, 2020 for French Application No. 1912777, filed Nov. 15, 2019.
(Continued)

*Primary Examiner* — Michael Collins
(74) *Attorney, Agent, or Firm* — David D. Brush; Westman, Champlin & Koehler, P.A.

(57) ABSTRACT

Method for merging, within a logistical warehouse, k incoming flows of payloads, transported respectively by k FIFO conveyor lanes $\alpha_i$ with $i \in \{1, \ldots, k\}$ into one outgoing flow of payloads transported by a collector conveyor. The k lanes are distributed along the collector and numbered $a_1$ to $a_k$. $\Delta_i$ is a time-related distance between the lanes $a_i$ and $a_k$. A control system obtains a set L having n payloads distributed on the k lanes and having to be injected into the collector to form an exit sequence; computes a date $t_0$ at which the first payload $\sigma_1$ of the exit sequence $\sigma$ passes in front of the lane $a_k$; and computes n dates of injection of the n payloads into the collector, as a function of $t_0$; and commands the collector (Continued)

and the k alleys, for an injection of the n payloads into the collector in compliance with the injection dates.

13 Claims, 25 Drawing Sheets

(51) Int. Cl.
  *G06Q 50/28* (2012.01)
  *G06Q 10/06* (2023.01)
  *G05B 19/042* (2006.01)

(56) References Cited

U.S. PATENT DOCUMENTS

| | | | |
|---|---|---|---|
| 9,205,981 B2 | 12/2015 | Valentin et al. | |
| 9,771,218 B2* | 9/2017 | Meurer | B65G 1/1378 |
| 10,239,704 B2* | 3/2019 | Messner | B65G 1/0492 |
| 10,280,001 B2* | 5/2019 | Oki | B65G 1/06 |
| 2006/0245858 A1* | 11/2006 | Suess | B65G 1/10 |
| | | | 414/277 |
| 2013/0275236 A1* | 10/2013 | Koke | G06Q 30/0212 |
| | | | 705/15 |
| 2014/0195032 A1* | 7/2014 | Horn | A24C 5/35 |
| | | | 700/115 |
| 2020/0102146 A1* | 4/2020 | Collin | B65G 1/1371 |

OTHER PUBLICATIONS

Koster et al., "Design and control of warehouse order picking: a literature review" (2007), European Journal of Operational Research 182(2), 481-501.

Imran Ali Chaudhry and Abid Ali Khan, "A research survey: review of flexible job shop scheduling techniques", International transactions in operation research, 2015.

Runwey Cheng, Mitsuo Gen and Yasuhiro Tsujimura, "A tutorial survey of Job Shop scheduling problems using genetic algorithms—Part I. Representation", Ashikaga Institute of Technology, Ashikaga 326, Japan.

English Translation of French Written Opinion dated Mar. 26, 2020 for French Application No. 1912777, filed Nov. 15, 2019.

* cited by examiner

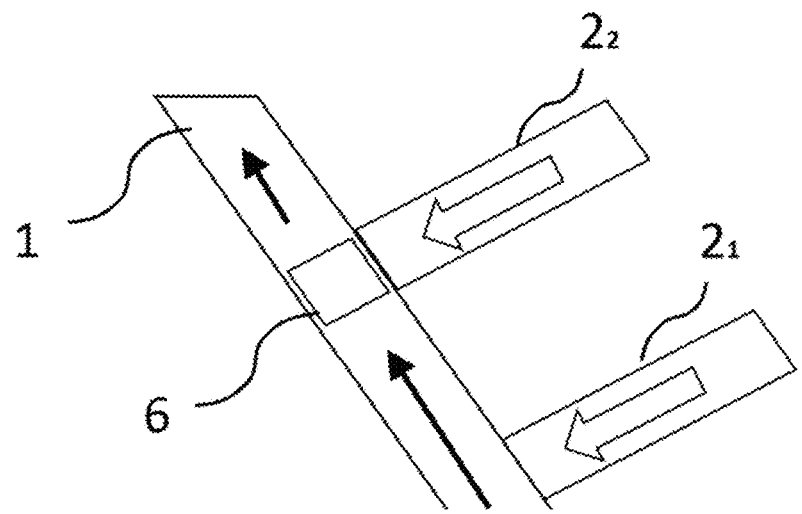
Fig. 3
Fig. 4
Fig. 5

| Time | 0 | | $t_0$ | | | 5 | | | | |
|---|---|---|---|---|---|---|---|---|---|---|
| $M_1$ | 2 | | 4 | | | | | | | |
| $M_2$ | 1 | 2 | | | | 6 | 7 | | | |
| $M_3$ | | 1 | 2 | | 4 | 5 | 6 | 7 | 9 | |
| $M_4$ | | | 1 | 2 | 3 | 4 | 5 | 6 | 7 | 8 | 9 |

Desired final sequence σ

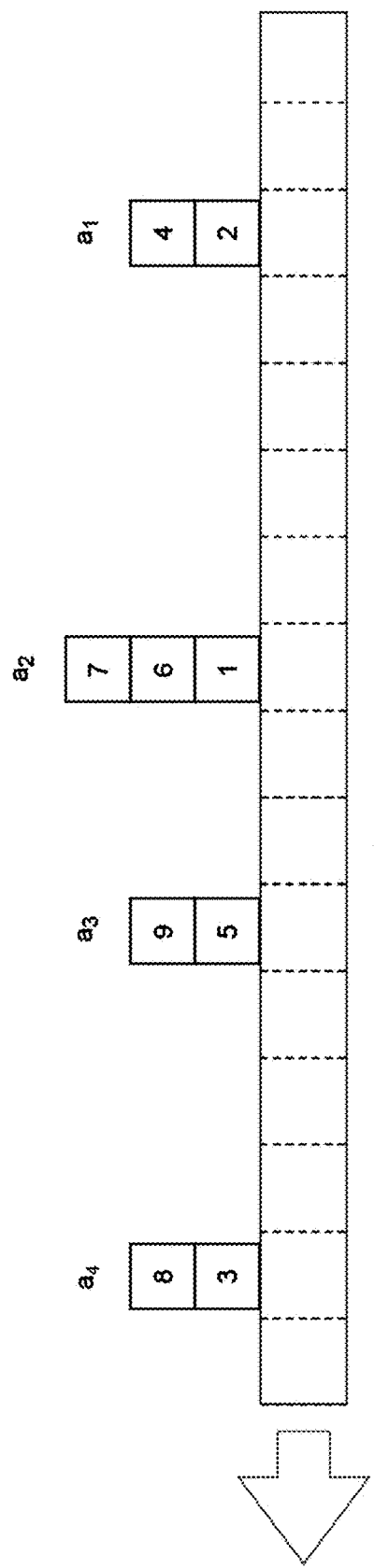

| Time | 0 | | | 5 | | | | | | $t_0$ | | | | | | | | |
|---|---|---|---|---|---|---|---|---|---|---|---|---|---|---|---|---|---|---|
| M1 | 2 | A | B | 4 | | | | | | | | | | | | | | |
| | | 2 | A | B | 4 | | | | | | | | | | | | | |
| M2 | | | 2 | A | B | 4 | | | | | | | | | | | | |
| | | | | 2 | A | B | 4 | C | | | | | | | | | | |
| | | | | | 2 | A | B | 4 | C | | | | | | | | | |
| | | | | | | 2 | A | 4 | C | 6 | C | 7 | | | | | | |
| M3 | | | | | | | 2 | 4 | | 6 | C | 7 | | | | | | | |
| | | | | | | | 2 | 4 | | 6 | C | 7 | | | | | | | |
| | | | | | | | | 2 | 4 | 6 | C | 7 | 9 | | | | | |
| | | | | | | | | | 2 | 4 | 5 | 6 | 7 | 9 | | | | |
| | | | | | | | | | 1 | 2 | 4 | 5 | 6 | 7 | 9 | | | |
| | | | | | | | | | 1 | 2 | 4 | 5 | 6 | 7 | 9 | | | |
| | | | | | | | | | 1 | 2 | 3 | 4 | 5 | 6 | 7 | 8 | 9 | |
| M4 | | | | | | | | | | 1 | 2 | 3 | x | 4 | 5 | 6 | x | 7 | 8 | 9 |

Final desired sequence σ with two gaps

Fig. 39

METHOD FOR MERGING, WITHIN A LOGISTICAL WAREHOUSE, K INCOMING FLOWS OF PAYLOADS INTO ONE OUTGOING FLOW

1. TECHNICAL FIELD

For the past several years, intra-logistics activity has been highly impacted by a drastic change in the behavior of consumer society and by the development of novel technologies. The constant increase in demand is forcing the main players in logistics to become increasingly responsive and competitive. It has become vital to improve and optimize routing, storage and customer-order picking solutions. The firm SAVOYE, a builder of customer-order-picking equipment, is specialized in the automation and computerization of logistical warehouses and is constantly improving and evaluating its solutions.

The management of a logistical warehouse includes the procurement of supplies, the receiving and management of flows and stocks. Improving travel time for a customer order often means minimizing its conveyance time. 50% of the picking time (preparation time) for a customer order is devoted to this conveying operation, according to De Koster, R., Le-Duc, T., and Roodbergen, K. J., *"Design and control of warehouse order picking: a literature review"* (2007), European Journal of Operational Research 182(2), 481-501. It is therefore necessary first of all to look at the main problem faced by warehouses, that of optimizing the flows conveyed in order to ensure the highest possible production rate. We shall focus more particularly on the intersections of flows of loads (packages, bins, containers, etc.). The goal is to maximize the throughput of the final flow (also called an outgoing flow or outflow) combining various incoming flows (inflows) coming from different places.

2. BACKGROUND

2.1 Object

In a logistical warehouse, it happens that several incoming flows of loads (also called injection flows) are grouped together into a single outgoing flow (or outflow) (also called an exit flow). A flow of loads corresponds to a list of sequenced loads, filing past one after the other. These flows can be transported by a conveyor that is similar to a conveyor belt moving all the loads situated on it in a given sense in single file. Here below in the description, conveyors that transport incoming flows are called lanes and the conveyor transporting the exit flow is called a collector.

The injection flows are distributed all along the collector. The positions of the loads composing these injection flows are known and identifiable. For each injection flow, we can choose the instant at which its first load is injected into the collector. A sequential distribution of the injection flows enables a lane situated upstream to the flow of the collector to benefit from a number of injection possibilities greater than that of a lane situated downstream. Indeed, the latter can shed its loads only when there is space left free by the lanes further upstream.

In order to prevent an imbalance of injection of loads between the incoming flows, it is preferred to make a definition in advance of the order of the loads once they are all placed on the collector (this order is called a final sequence or, again, an exit sequence).

The governing idea of the present disclosure is to push the flow of the collector to the maximum mechanical capacity of the collector. To this end, the number of vacant spaces in the collector needs to be limited. We propose an approach based on the right dates for injecting loads, to constitute a final flow that has no vacant spaces (or as few of them as possible). These injection dates are defined in order to comply with every achievable final sequence, namely every sequence complying with FIFO (First-in-first-out) sequential orders of the injection flows.

The solution proposed and described here below to respond to this set of problems and issues is novel and inventive with respect to known models of scheduling problems, described for example in:

Runwey Cheng, MitsuoGen and YasuhiroTsujimura, *A tutorial survey of Job Shop scheduling problems using genetic algorithms—Part I. Representation*, Ashikaga Institute of Technology, Ashikaga 326, Japan; and Imran Ali Chaudhry and Abid Ali Khan, *A research survey: review of flexible job shop scheduling techniques*, International transactions in operation research, 2015

2.2 Example of Application

In short, the system studied is composed of injection flows (incoming flows) transported by lanes (set of conveyors) and a collector (another conveyor) combining these injection flows into a single final flow (outgoing flow). The control system (or overall control system) proposed and described here below can be applied especially but not exclusively to a "continuous non-accumulation conveyor" type of collector or a sorter type collector (belt tray, tilt tray, etc.). This control system enables compliance with any final achievable sequence whatsoever. We therefore give the solution corresponding to the optimal throughput relative to a final given sequence. If no final sequence is desired, we are capable of obtaining the maximum throughput on a completely unoccupied collector in order to combine these injection flows.

However, in certain cases, obstructions can already occupy places on the collector. The term "obstruction of a time step (or time span") of the collector" is understood to mean especially but not exclusively a disturbing load coming from a disturbing flow different from the injection flows. An obstruction is not necessarily a disturbing load but can also be a place of the collector that is damaged, reserved, etc. In this case, the management of the injection flows must take such obstructions into account.

In the particular case where the disturbing loads come from one or more disturbing flows, we can distinguish two types of disturbing flows. A disturbing flow is said to be "non-controlled" if the injection into the collector of the disturbing loads that compose it cannot be controlled by the control system (these disturbing loads arrive without taking account of the environment). By opposition, a disturbing flow is said to be "controlled" if the injection on the collector of the disturbing loads composing it can be controlled by the control system. Our proposed control system supports these different types of disturbing flows (non-controlled or controlled) and gives an optimal solution including the management of the disturbing flows to be controlled.

One illustrative and non-exhaustive example of a concrete application is that of the GTP Intelis PTS (Goods To Person Intelis Picking Tray System) proposed by the firm SAVOYE. This is a comprehensive automated customer-order picking solution in which an automated shuttle-based storage and retrieval (or removal) system (called the Intelis PTS system) 3 enables the feeding of picking stations (also called GTP stations) 4 at very high speeds. The role of the automated system (Intelis PTS) is therefore to store and obtain the entry and the exit of the loads comprising articles needed for the efficient filling of the customer orders at the GTP stations. The automated system consists of several storage racks (also called PTS aisles which however should not be mistaken for lanes (in the sense of conveyors) transporting incoming flows in the context of the present invention (see explanations here below), each composed of shuttles and elevators enabling the to-and-fro movement of these loads respectively on the entry conveyors $5_1$, $5_2$ and exit conveyors $2_1$, $2_2$. These different entry and exit conveyors are all connected by a collector 1 which feeds the picking stations 4 as can be seen in FIG. 50 (for example with three picking stations $4_1$, $4_2$ and $4_3$).

To establish a link with the contextual definition here above, the exit conveyors $2_1$, $2_2$ of the automated system 3 form the conveyors (also called "lanes") transporting the incoming payload flows, these incoming flows being merged on the collector 1 into an outgoing flow of payloads.

In other words, the to-and-fro movement of the loads that enter and exit the automated system 3 is managed by means of the collector. We therefore have several injection flows of loads (also called incoming flows in the present discussion of problems and issues) on the exit conveyors $2_1$, $2_2$ of the automated system 3, all injected on the collector.

In addition, when the flows of loads that return to the automated system 3 (via the entry conveyor $5_1$, $5_2$) pass through the same collector 1, we have an example of disturbing flows, called return flows in this particular case. These disturbing flows are highly interesting because they disappear after the passage of all the injection zones, thus creating vacant spaces for certain injection flows but not for others. As described in detail here below, one embodiment of the proposed solution is aimed at controlling, as far as is possible, these disturbing flows to fill these vacant spaces rather than to let them exist.

The solutions proposed in this example of an application are described here below in the document.

2.3 Current Solutions 2.3.1 Existing Solutions

Known solution A, with a desired final sequencing: in this case, the injection of the loads on the collector follows a well-defined order corresponding to the expected final sequence after merging of the loads. If this final sequence desired at exit from the collector is for example formed by loads having sequence numbers 1, 2, 3, etc. (here below called "load 1", "load 2", etc.), then the load 1 will be injected by priority, followed by the load 2 only if the load 1 is downstream to the load 2 on the collector, followed by the load 3 only if the load 2 is downstream to the load 3 on the collector, and so on and so forth.

Known solution B, without desired final sequencing: each first load of each injection flow is injected into the collector as soon as there is place in its injection zone.

2.3.2 Drawbacks related to these solutions

Known solution A: one drawback of the known solution A is that it leaves (vacant) spaces between the loads, and this slows down the outgoing flow relative to the mechanical capacities of the collector. A vacant space appears between two successive loads in the final sequence as soon as the previous load in the final sequence belongs to an injection flow further downstream than the following load. In addition, the length of these vacant spaces is proportional to the distance of the lanes (conveyors) for injection of these two successive loads.

Several steps of this known solution A are shown by FIG. 1. In this example, we consider the desired final sequence 1, 2, 3, 4. In order to comply with this sequence, it is not possible to inject the loads 1, 2, 3 and 4 directly at the same time on the collector. At the step 0, the installation is activated. Instantly, the loads 1 and 2 are injected into the collector. This operation is made possible because the injection flow of the load 1 is downstream from the injection flow of the load 2. The loads 1 and 2 are on the collector, separated by the distance between the lanes (conveyors) from which they come. The collector moves forward without change until the step 1, where the load 2 passes in front of the injection zone of the flow containing the loads 3. From this instant onwards, the load 3 is injected into the collector directly behind the load 2. It can be noted that the vacant space left between the loads 1 and 2 has stayed the same and will never be filled. At this same step 1, the load 4 is injected directly into the collector with a space between itself and the load 3. The step 2 shows the vacant spaces left by this known method of injection.

Known solution B: one drawback of the known solution B is that the lane (the conveyor) furthest downstream will inject its loads continuously while the others will have to be limited only to filling the remaining free spaces; another drawback of the known solution B is that it proposes a control system that works in reality only when the collector (transporter of the outgoing flow) has a speed far greater than that of the lanes (conveyors) transporting the incoming flows (as many times greater as there are incoming flows to be injected). In the known solution B, the speeds of the lanes (conveyors) must be capped. Now, in the present context, the number of injection flows increases faster than the mechanical speed of the collector. This known solution B no longer suffices, and does not control the optimizing of the throughput of the outgoing flow.

3. SUMMARY

In a first particular embodiment of the invention, a method is proposed for merging, within a logistical warehouse, k incoming flows of payloads, transported respectively by k conveyors called lanes $\alpha_i$ with $i \in \{1, \ldots, k\}$, into one outgoing flow of payloads transported by another conveyor called a collector, the logistical warehouse being such that:

the k lanes are of the "first-in-first-out" type, distributed along the collector and numbered $a_1$ to $a_k$ in one sense of movement of the collector, and $\Delta_i$ is a time-related distance between the lanes $a_i$ and $a_k$ expressed in time units each corresponding to one time span (also referred to as "time step") of the collector, the method being executed at least once by a control system, a given execution being performed at an instant Tb and comprising:

obtaining a set L comprising n payloads distributed at the instant Tb on the k lanes and having to be injected into the collector to form an exit sequence σ, each of the n payloads being identified by a single sequence number within the exit sequence σ, each of the k lanes containing an ordered set, ordered in a rising order of sequence numbers, of $h_i$ payloads having to be injected one by one into the collector;

computing a date $t_0$ at which the first payload $\sigma_1$ of the sequence a passes in front of the lane $a_k$;

computing a date of injection into the collector of each of the n payloads of the set L according to the following formula: $T(u)=t_0+\sigma(u)-1--\Delta_i$, with:

$u=\alpha_i(j) \in L$, a payload of the set L and coming from the $j^{th}$ position in the lane $a_i$, $i \in \{1, \ldots, k\}$, $j \in \{1, \ldots h_i\}$, $\sigma(u)$ is the sequence number of the payload u in the exit sequence $\sigma$;

commanding the collector and the k lanes, for an injection of the n payloads into the collector in compliance with n injection dates $T(u)$, $\forall u \in L$.

According to one particular characteristic of the first embodiment, $\Delta_{i,i'}$ is a time-related distance between the lanes $a_i$ and $a_{i'}$ expressed in time units, each corresponding to a time span of the collector and the method furthermore comprises the following steps:

for each payload $u=\alpha_i(j) \in L$ coming from a lane $a_i$, computing the dates of passage of the payload in front of the lanes $a_i$ to $a_k$, the date of injection $T(u)$ of the payload into the collector being known;

for each lane $a_i$, $i \in \{1, \ldots, k\}$, obtaining a set $V_i$, each containing a date of passage of one of the payloads in front of the lane $a_i$;

for each controlled disturbing payload p of a disturbing flow controlled by a control means situated along the collector and before a lane $a_{g(p)}$ in the sense of movement of the collector, with $g(p) \in \{1, \ldots, k\}$, $a_{g(p)}$ being also the first lane, in the sense of movement of the collector, in front of which the controlled disturbing load passes:

a) initializing t with the date $\delta_1 - \Delta_1$, with $\delta_1$ representing the possible date of arrival of the first controlled disturbing load in front of the lane $a_k$ if this load is not put on hold (i.e. placed in a state of waiting);

b) computing the dates $t+\Delta_{1,g(p)}$, $t+\Delta_{1,g(p)+1}$, ..., $t+\Delta_{1,l(p)}$ of passage of the controlled disturbing load before the lanes $a_{g(p)}$ to $a_{l(p)}$, with $a_{l(p)}$ being the last lane, in the sense of the movement of the collector, in front of which the controlled disturbing passes;

c) if none of the dates $t+\Delta_{1,g(p)}$, $t+\Delta_{1,g(p)+1}$, ..., $t+\Delta_{1,l(p)}$ belongs respectively to the sets $V_{g(p)}$, $V_{g(p)+1}$, ..., $V_{l(p)}$, computing a fictitious date of passage $start_p$ of the controlled disturbing load p in front of the lane $a_1$, with the following formula: $start_p = t$;

d) if one of the dates $t+\Delta_{1,g(p)}$, $t+\Delta_{1,g(p)+1}$, ..., $t+\Delta_{1,l(p)}$ belongs respectively to one of the sets $V_{g(p)}$, $V_{g(p)+1}$, ..., $V_{l(p)}$, incrementing t by one unit and reiterating steps b), c) and d) with the new value of t;

commanding the control means, for an injection at the date $start_p + \Delta_{1,g(p)}$ of each controlled disturbing load pin front of the lane $a_{g(p)}$.

In a second particular embodiment of the invention, a method is proposed for merging, within a logistical warehouse, k incoming flows of payloads, transported respectively by k conveyors called lanes $a_i$ with $i \in \{1, \ldots, k\}$, into one outgoing flow of payloads, transported by another conveyor called a collector, the logistical warehouse being such that:

the k lanes are of a "first-in-first-out" type, distributed along the collector and numbered $a_1$ to $a_k$ in one sense of movement of the collector, and $\Delta_i$ is a time-related distance between the lanes $a_i$ and $a_k$ expressed in time units each corresponding to one time span of the collector, the method being executed at least once by a control system, a given execution being done at an instant Tb and comprising:

obtaining a set L comprising n payloads distributed at the instant Tb on the k lanes and having to be injected into the collector to form an exit sequence $\sigma$, each of the n payloads being identified by a single sequence number within the exit sequence $\sigma$, each of the k lanes containing an ordered set, in a rising order of sequence numbers, of $h_i$ payloads having to be injected one by one into the collector;

for each lane $a_i$, $i \in \{1, \ldots, k\}$, obtaining a set $U_i$ of dates not valid for an injection of one of the payloads of the lane $a_i$ into the collector because of a non-controlled disturbing load or another obstruction of a time span of the collector;

in not taking account of the sets $U_i$, $i \in \{1, \ldots, k\}$, computing a date $t_0$ at which the first payload $\sigma_1$ of the exit sequence a passes in front of the lane $a_k$;

for the first payload $\sigma_1$ of the exit sequence $\sigma$, in assuming that the first payload $\sigma_1$ comes from the lane $a_i$:

a) initializing t with $t_0$;

b) if none of the dates t, $t-\Delta_{k-1}$, $t-\Delta_{k-2}$, ..., $t-\Delta_i$ belongs respectively to the sets $U_k$, $U_{k-1}$, $U_{k-2}$, ..., $U_i$, computing a date of injection of the first payload $\sigma_1$ into the collector with the following formula: $T(u)=t-\Delta_i$, with $u=\sigma_1=\alpha_i(j)$;

c) if one of the dates t, $t-\Delta_{k-1}$, $t-\Delta_{k-2}$, ..., $t-\Delta_i$ belongs respectively to one of the sets $U_k$, $U_{k-1}$, $U_{k-2}$, ..., $U_i$, incrementing t by one unit and reiterating steps b) and c) with the new value of t;

for each following payload $\sigma_c$ of the exit sequence $\sigma$, $c \in \{2, \ldots, n\}$, in assuming that the following payload $\sigma_c$ comes from the lane $a_i$:

a') incrementing t by one unit with t used to compute the date of injection of the preceding payload $\sigma_{c-1}$;

b') if none of the dates t, $t-\Delta_{k-1}$, $t-\Delta_{k-2}$, ..., $t-\Delta_i$ belongs respectively to the sets $U_k$, $U_{k-1}$, $U_{k-2}$, ..., $U_i$, computing a date of injection of the following payload $\sigma_c$ into the collector with the following formula: $T(u)=t-\lambda_i$, with $u=\sigma_c=\alpha_i(j)$;

c') if one of the dates t, $t-\Delta_{k-1}$, $t-\Delta_{k-2}$, ..., $t-\Delta_i$ belongs respectively to the one of the sets $U_k$, $U_{k-1}$, $U_{k-2}$, ..., $U_i$, incrementing t by one unit and reiterating steps b') and c') with the new value of t;

commanding the collector and the k lanes for an injection of the n payloads into the collector in compliance with the n injection dates $T(u)$, $\forall u \in L$.

According to one particular characteristic of the second embodiment, the step of commanding the collector and the k lanes for an injection of the n payloads into the collector in compliance with the n injection dates $T(u)$, $\forall u \in L$, is preceded by the following steps:

computing $t_{min}$ according to the following formula: $t_{min} = \min\{T(u), \forall u \in L\}$;

if $t_{min} > 0$, modifying n injection dates according to the following formula: $T(u)=T(u)-t_{min}$, $\forall u \in L$.

According to one particular characteristic of the second embodiment, $\Delta_{i,i'}$ is a time-related distance between the lanes $a_i$ and $a_{i'}$ expressed in time units each corresponding to a time span of the collector and the method furthermore comprises the following steps:

for each payload $u=\alpha_i(j) \in L$ coming from a lane $a_i$, computing the dates of passage of the payload in front of the lanes $a_i$ to $a_k$, the injection date T(u) of the payload in the collector being known;

for each lane $a_i$, $i \in \{1, \ldots, k\}$, obtaining a set $V_i$, containing, on the one hand, each date of passage of one of the payloads in front of the lane $a_i$ and, on the other hand, the set $U_i$ of dates not valid for an injection of one of the payloads of the lane $a_i$ into the collector;

for each controlled disturbing load p of a disturbing flow controlled by a control means situated along the collector and before a lane $a_{g(p)}$ in the sense of movement of the collector, with $g(p) \in \{1, \ldots, k\}$, $a_{g(p)}$ also being the first lane in the sense of movement of the collector, in front of which the controlled disturbing load passes:

a) initializing t with the date $\delta_1 - \Delta_1$, with $\delta_1$ representing the possible date of arrival of the first disturbing load in front of the lane $a_k$ if this load is not put on hold;

b) computing dates $t+\Delta_{1,g(p)}$, $t+\Delta_{1,g(p)+1}$, ..., $t+\Delta_{1,l(p)}$ of passage of the controlled disturbing load in front of the lanes $a_{g(p)}$ to $a_{l(p)}$, with $a_{l(p)}$ being the last lane, in the sense of movement of the collector, in front of which the controlled disturbing load passes;

c) if none of the dates $t+\Delta_{1,g(p)}$, $t+\Delta_{1,g(p)+1}$, ..., $t+\Delta_{1,l(p)}$ belongs respectively to the sets $V_{g(p)}$, $V_{g(p)+1}$, ..., $V_{l(p)}$, computing a fictitious date of passage $start_p$ of the controlled disturbing load p in front of the lane $a_1$, with the following formula: $start_p = t$;

d) if one of the dates $t+\Delta_{1,g(p)}$, $t+\Delta_{1,g(p)+1}$, ..., $t+\Delta_{1,l(p)}$ belongs respectively to one of the sets $V_{g(p)}$, $V_{g(p)+1}$, ..., $V_{l(p)}$, incrementing t by one unit and reiterating the steps b), c) and d) with the new value of t;

commanding the control means for an injection at the date $start_p + \Delta_{1,g(p)}$ of each controlled disturbing load pin front of the lane $a_{g(p)}$.

According to one particular characteristic of the first or second embodiment of the invention, the date $t_0$ is computed with the following formula:

$$t_0 = \max_{u=a_i(j) \in L'} \{\Delta_i + 1 - \sigma(u)\}, \text{ with:}$$

$u = \alpha_i(j) \in L'$, a payload of a set L' comprising payloads placed in first position of the lanes situated, according to the sense of movement of the collector, from the lane $a_1$ up to the lane $a_{i1}$ containing the first payload $\sigma_1$ of the exit sequence $\sigma$.

According to one particular characteristic of the first or second embodiment, the method is executed iteratively, each new execution being carried out at a new instant Tb computed with the following formula: $Tb = (u_{last}) - \Delta_1 + \Delta_{i^{last}}$, with $u_{last} = \alpha_{i^{last}}(j^{last})$ a last payload coming from the $(j^{last})$th position in the lane $\alpha_{i^{last}}$, of the exit sequence $\sigma$ of a preceding execution at a preceding instant Tb.

According to one particular characteristic of the first or second embodiment, the method is executed iteratively, each new execution being carried out at a new instant Tb defined as an instant at which no load of the exit sequence $\sigma$ of a preceding execution at a preceding instant Tb is situated in a portion of the collector extending from the first lane $a_1$ to the lane $\alpha_{i_1}$, this lane $\alpha_{i_1}$ containing the first load of the exit sequence $\sigma$ of the new execution at the new instant Tb.

According to one particular characteristic of the first or second embodiment, the method is executed iteratively, each new execution being carried out at a new instant Tb computed with the following formula: $Tb = Max(Tb+1, T(u_{last}) - \Delta_1 + \Delta_{i^{last}})$, with:

$u_{last} = \alpha_{i^{last}}(j^{last})$ being a last payload, coming from the $(j^{last})^{th}$ position in the lane $\alpha_{i^{last}}$, of the exit sequence $\sigma$ of a preceding execution at a preceding instant Tb, and (Tb+1) being obtained by an incrementing, by one unit, of the preceding instant Tb.

Another embodiment of the invention proposes a computer program product comprising program code instructions for the implementing of the above-described method (in any one of its different embodiments), when said program is executed on a computer.

Another embodiment of the invention proposes a computer-readable and non-transient storage medium storing a computer program comprising a set of instructions executable by computer to implement the above-mentioned method (in any one of its different embodiments).

Another embodiment of the invention proposes a control system (device) comprising means for implementing steps that it performs in the method as described here above in any one of its different embodiments.

4. LIST OF FIGURES

In the following description, given by way of an indicative and non-exhaustive example, reference is made to the appended drawings, of which:

FIG. 3 is a drawing of two lanes (conveyors), one collector and one load (box);

FIG. 4 is a drawing of the system under study in lanes

FIG. 5 is a drawing of the system with identification of the loads by their sequential number;

FIG. 16 show an example of a collector with four lanes that are placed in any unspecified manner;

FIG. 17 is a Gantt chart related to the job shop with any unspecified distances between the lanes;

Figure 21:
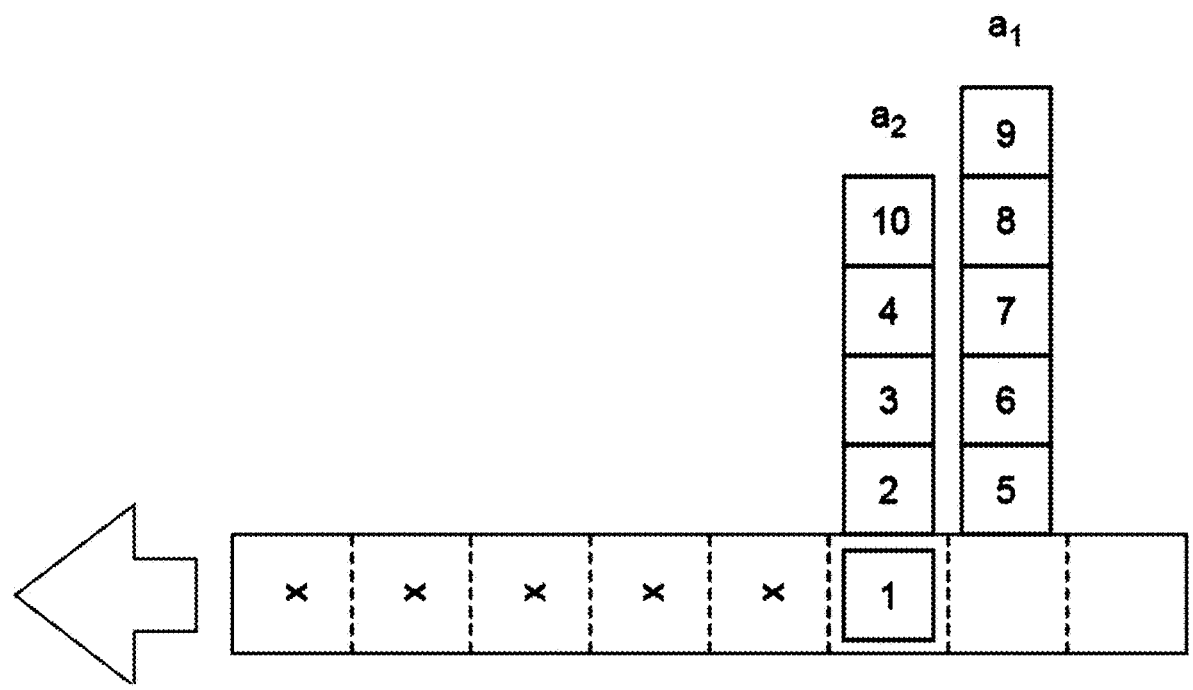
Figure 22:
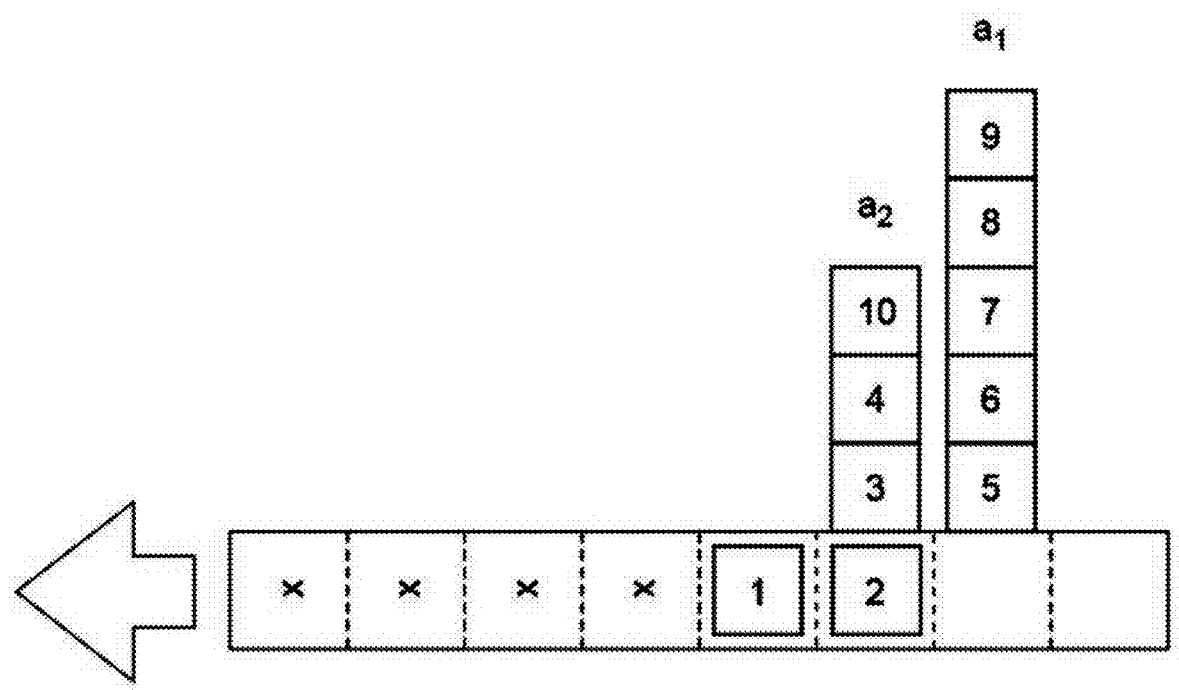
Figure 23:
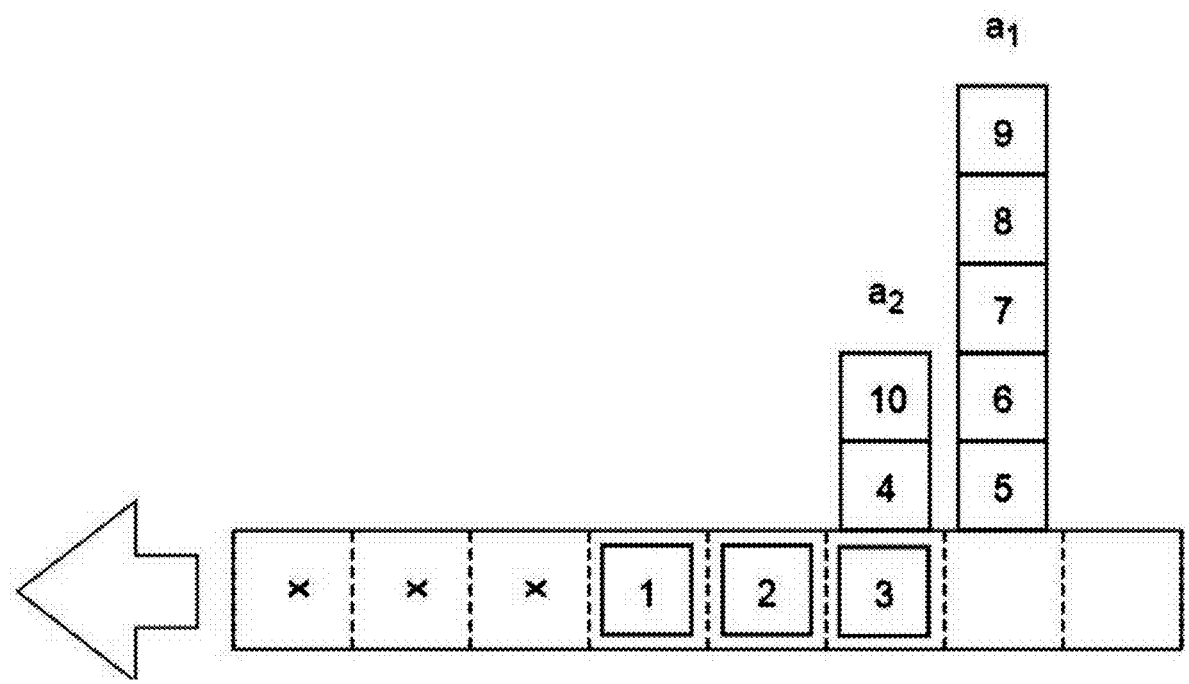
Figure 24:
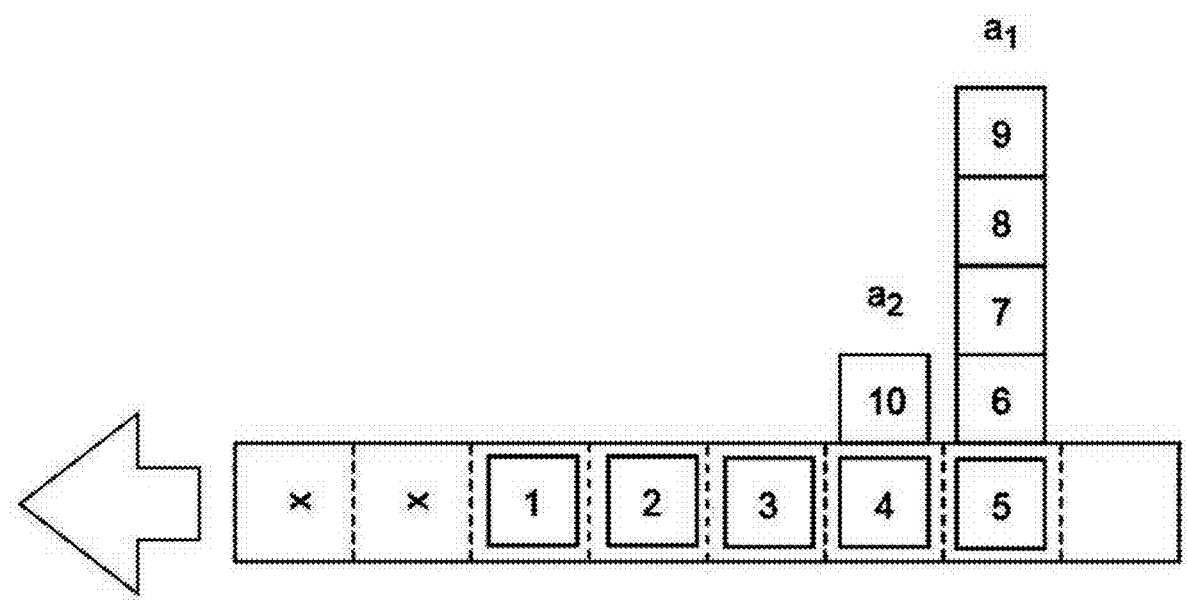
Figure 25:
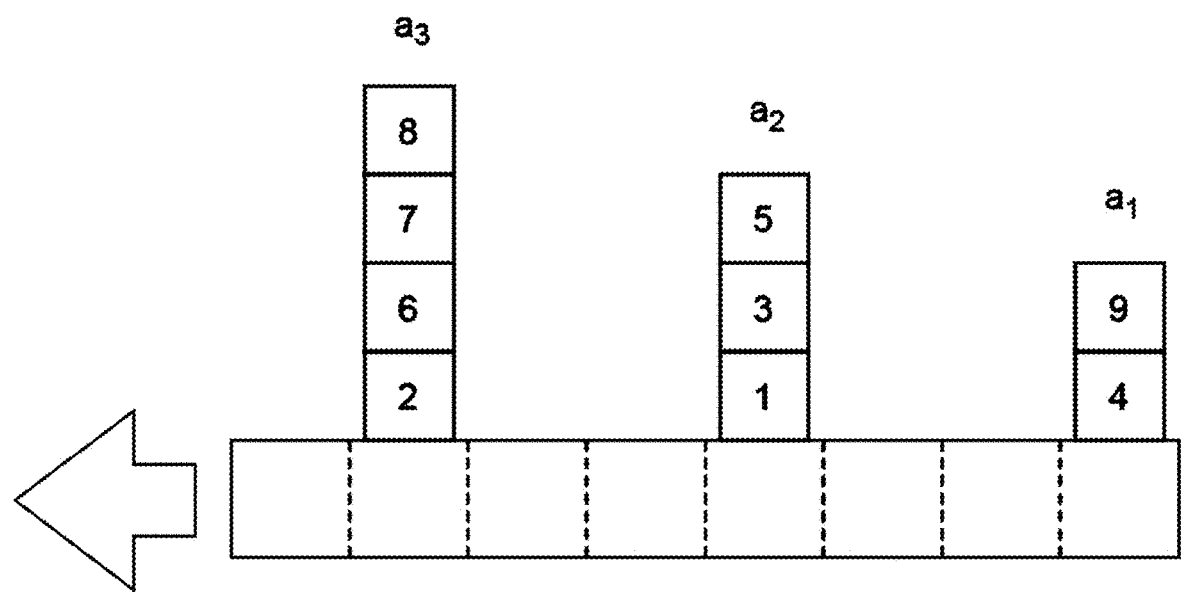
Figure 26:
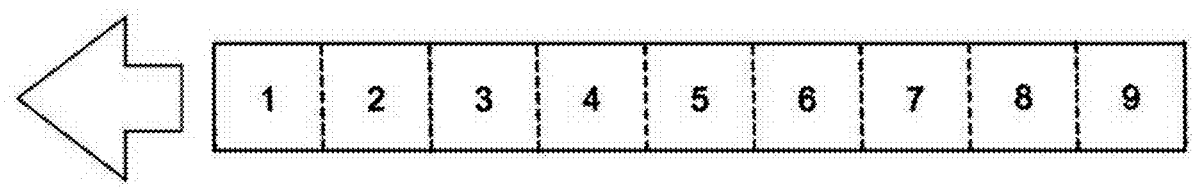
Figure 27:
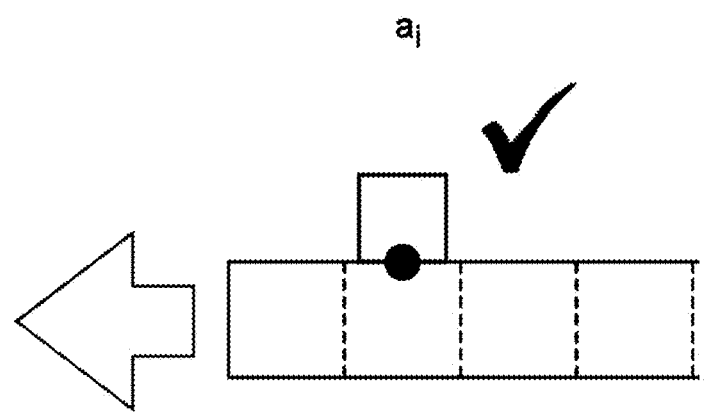
Figure 28:
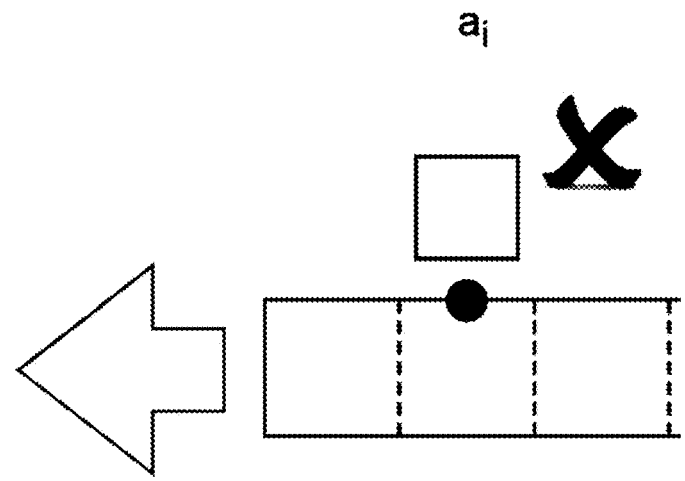
Figure 29:
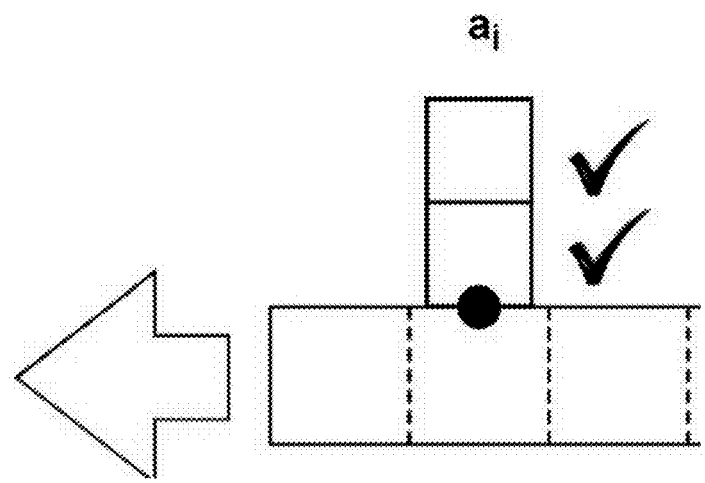
Figure 30:
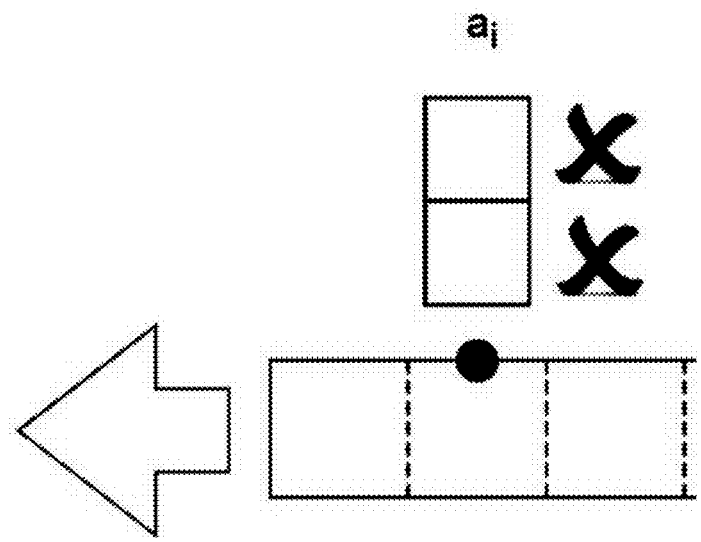
Figure 31:
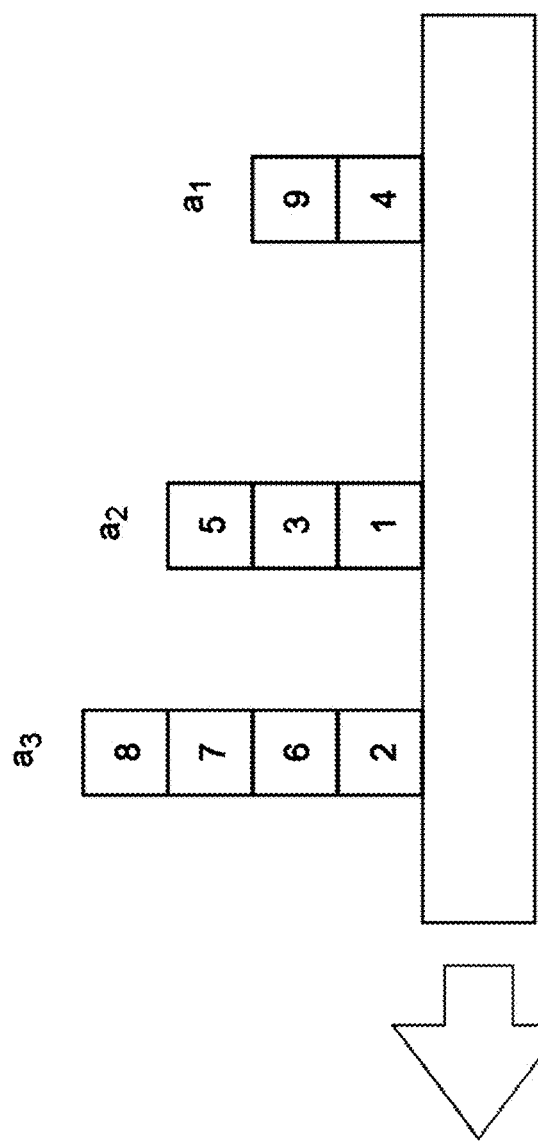
Figure 32:
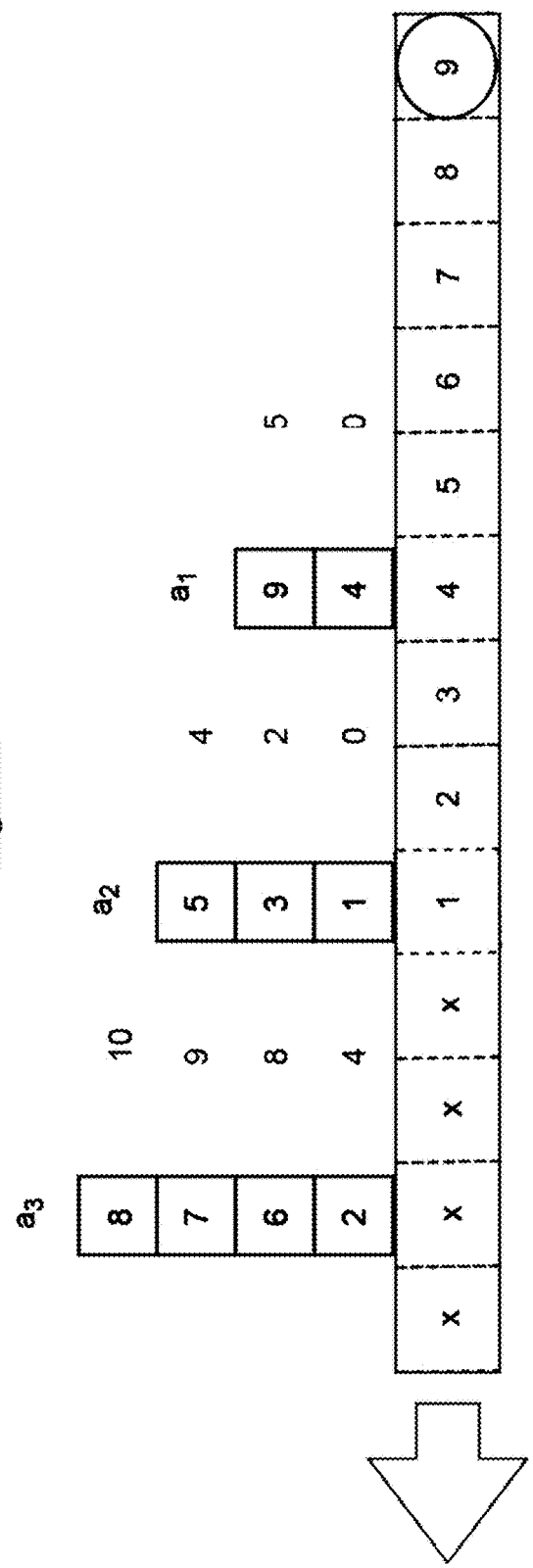
Figure 33:
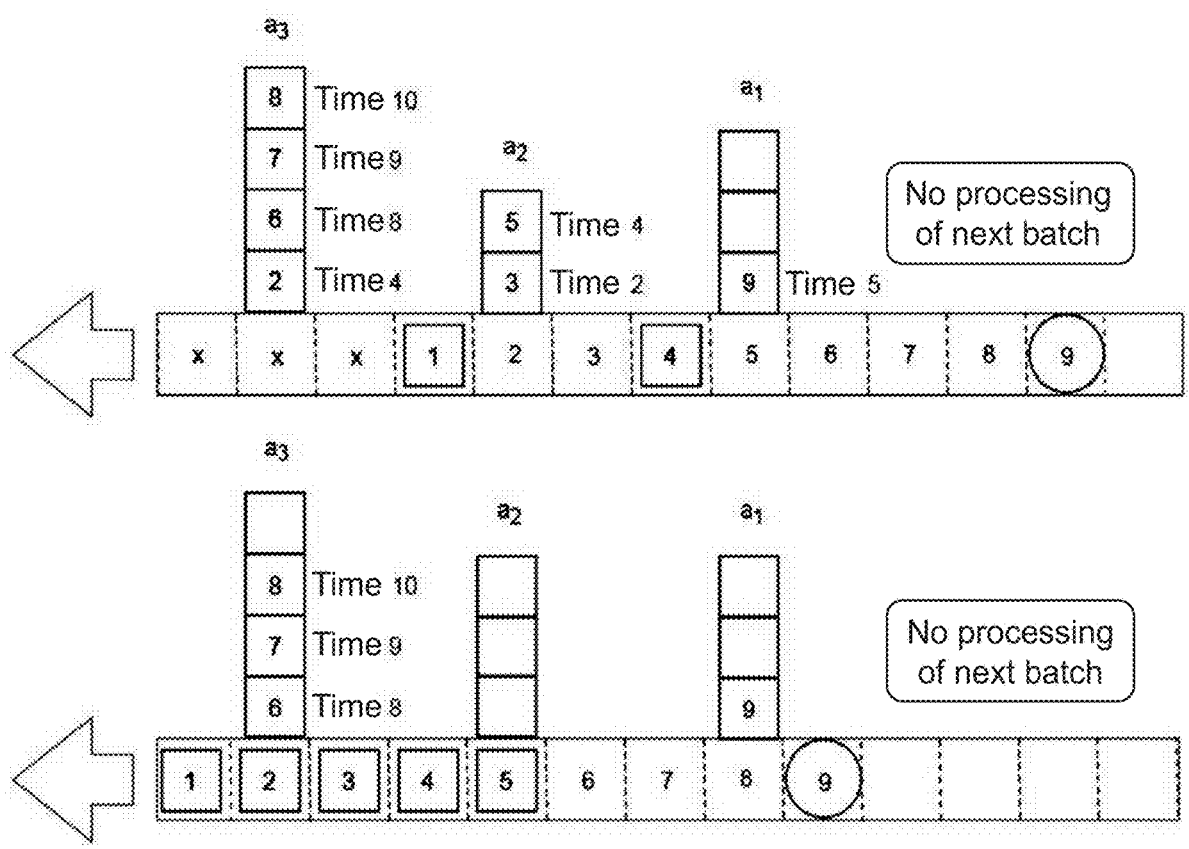
Figure 34:
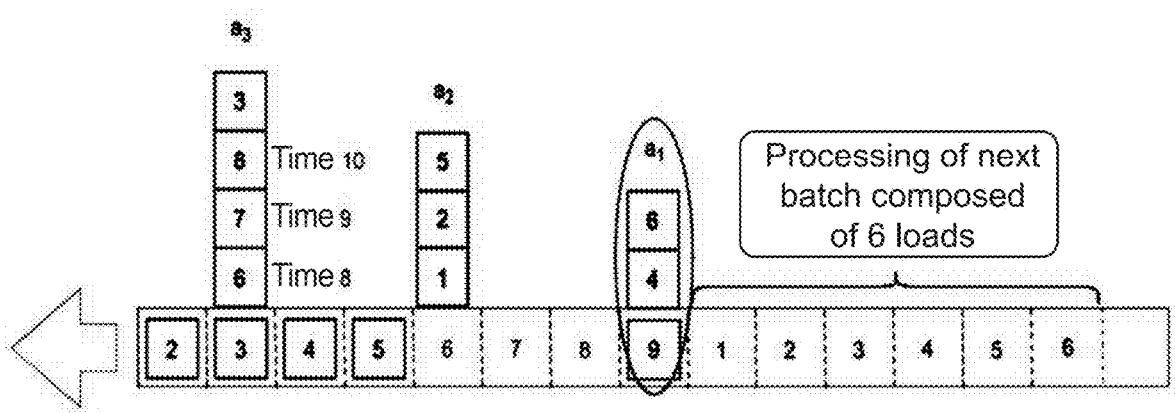
Figure 35:
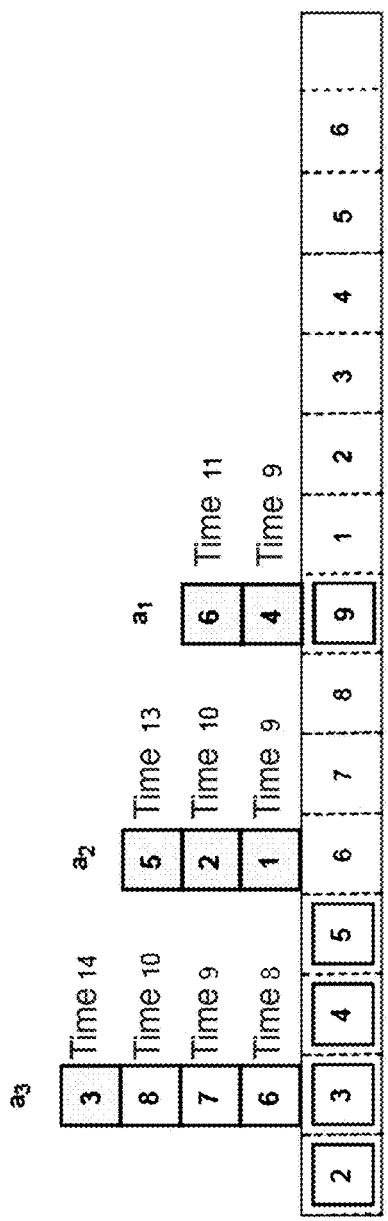
Figure 36:
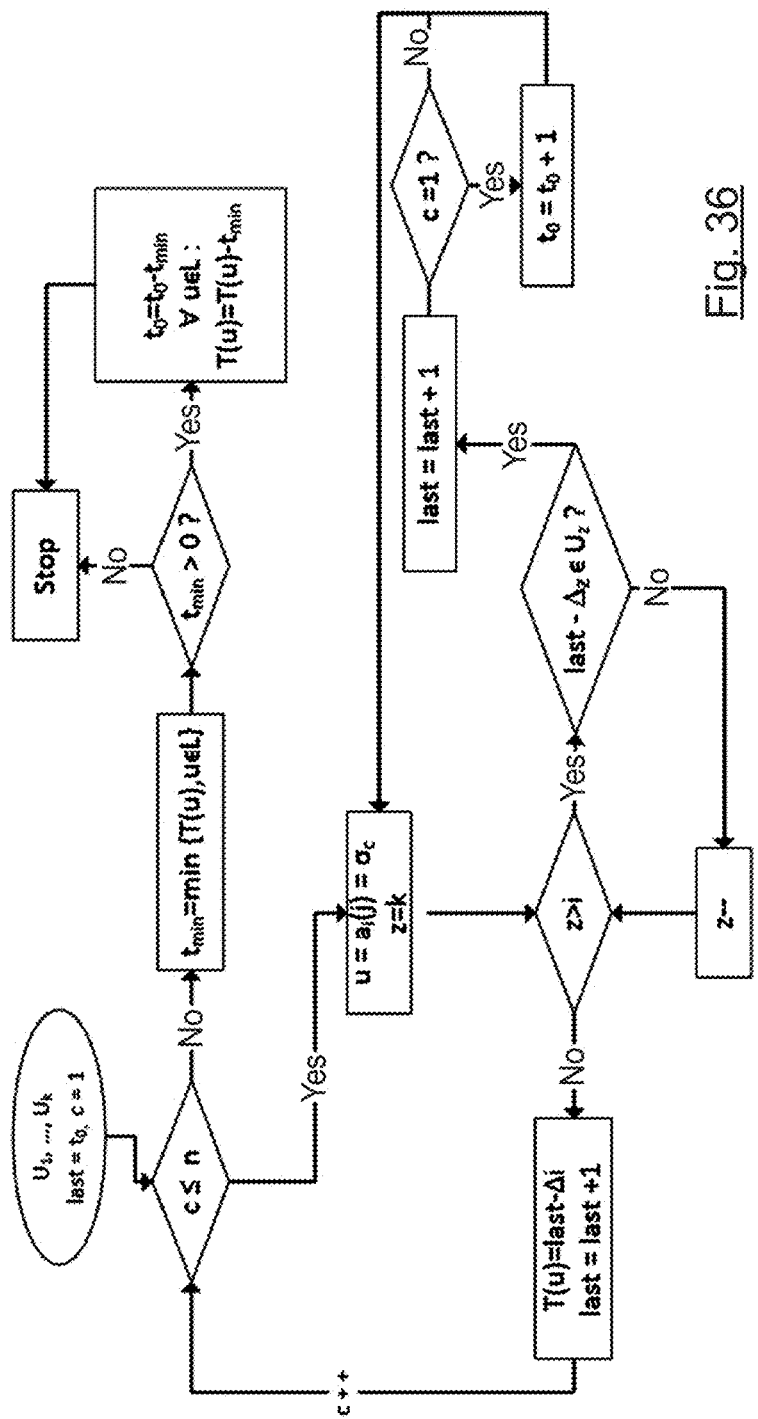
Figure 37:
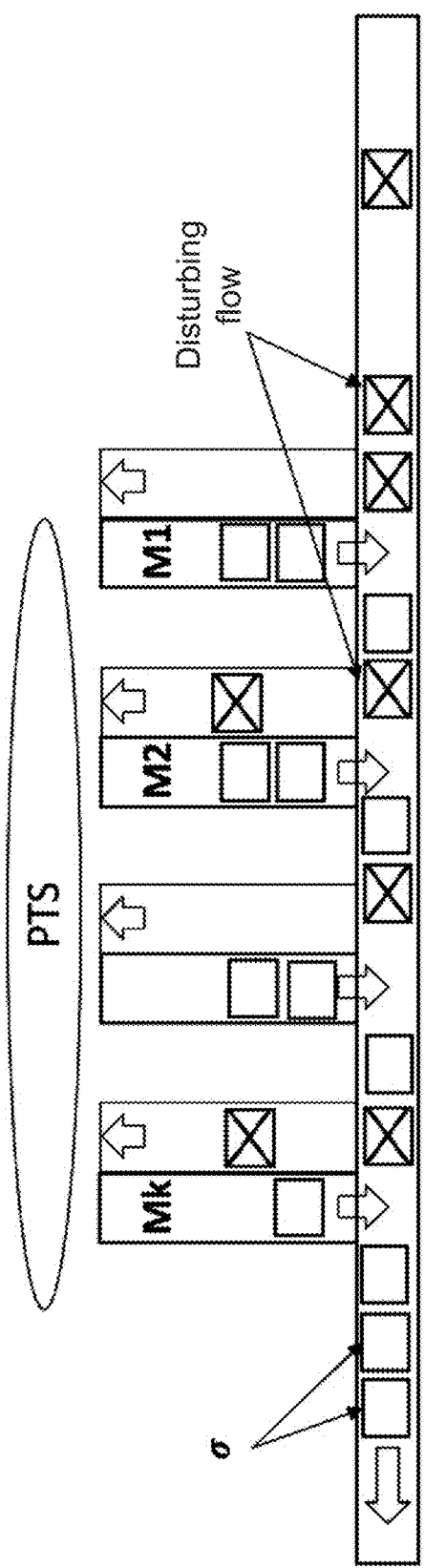
Figure 38:
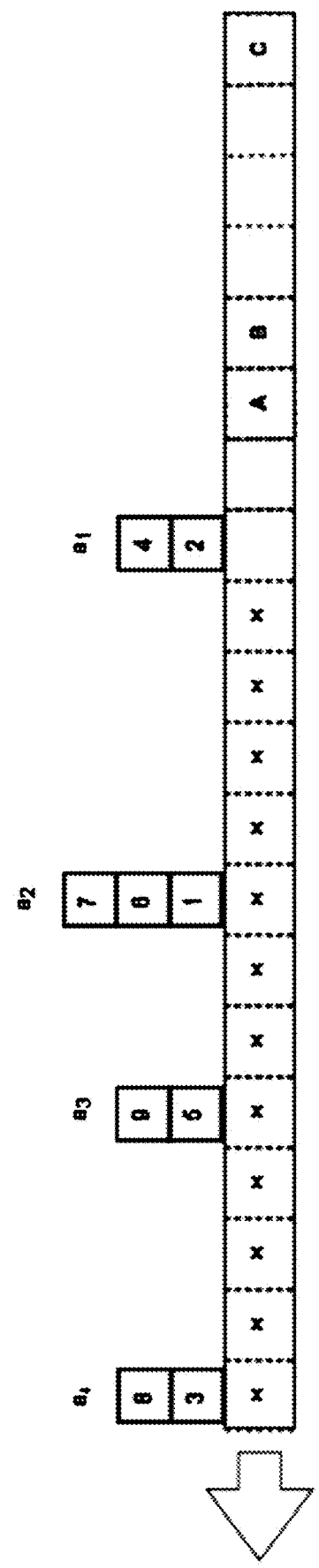
Figure 40:
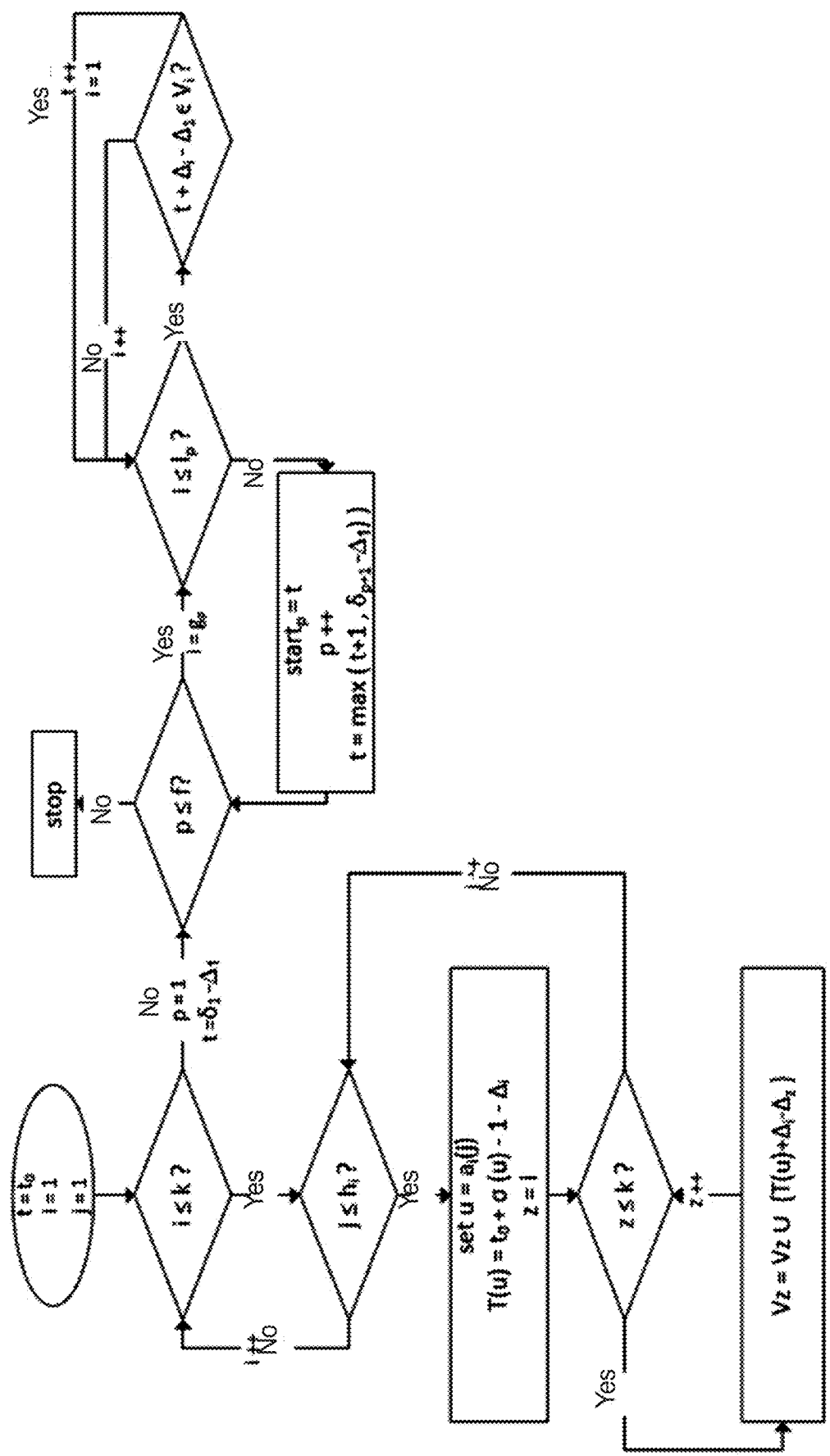
Figure 41:
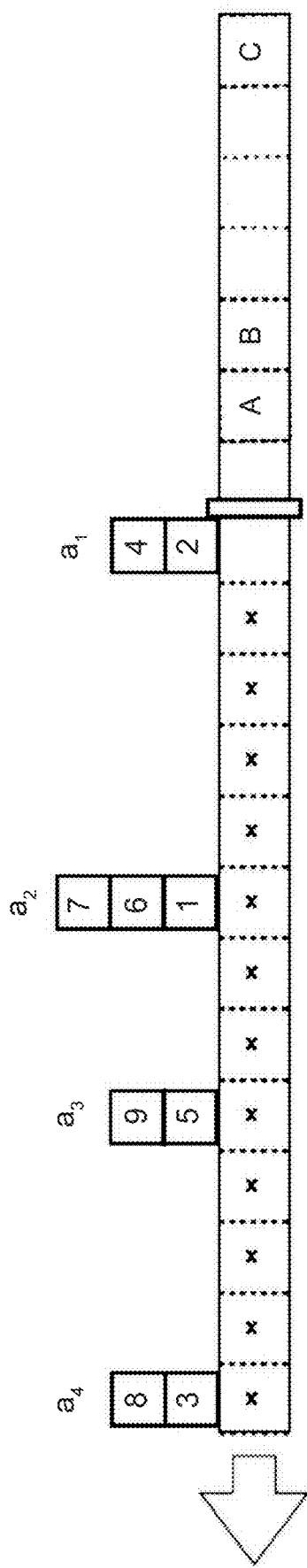
Figure 42:
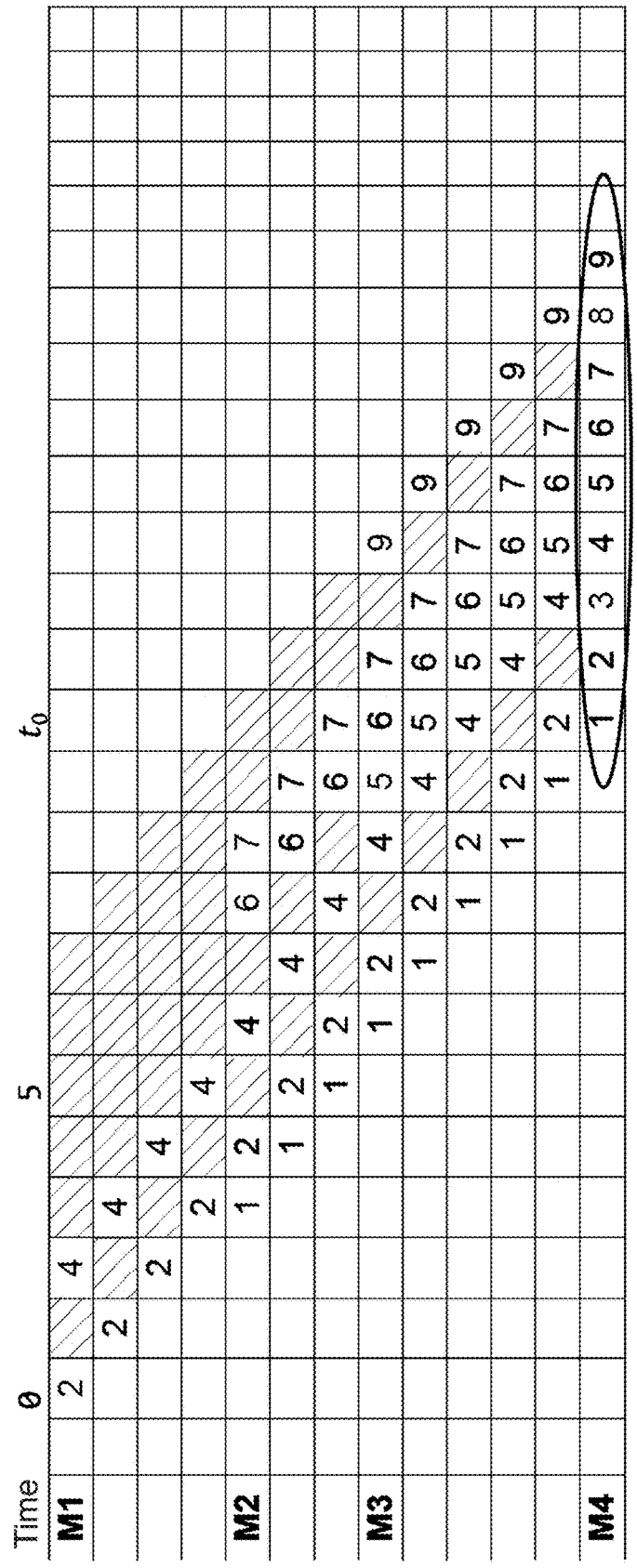
Figure 43:
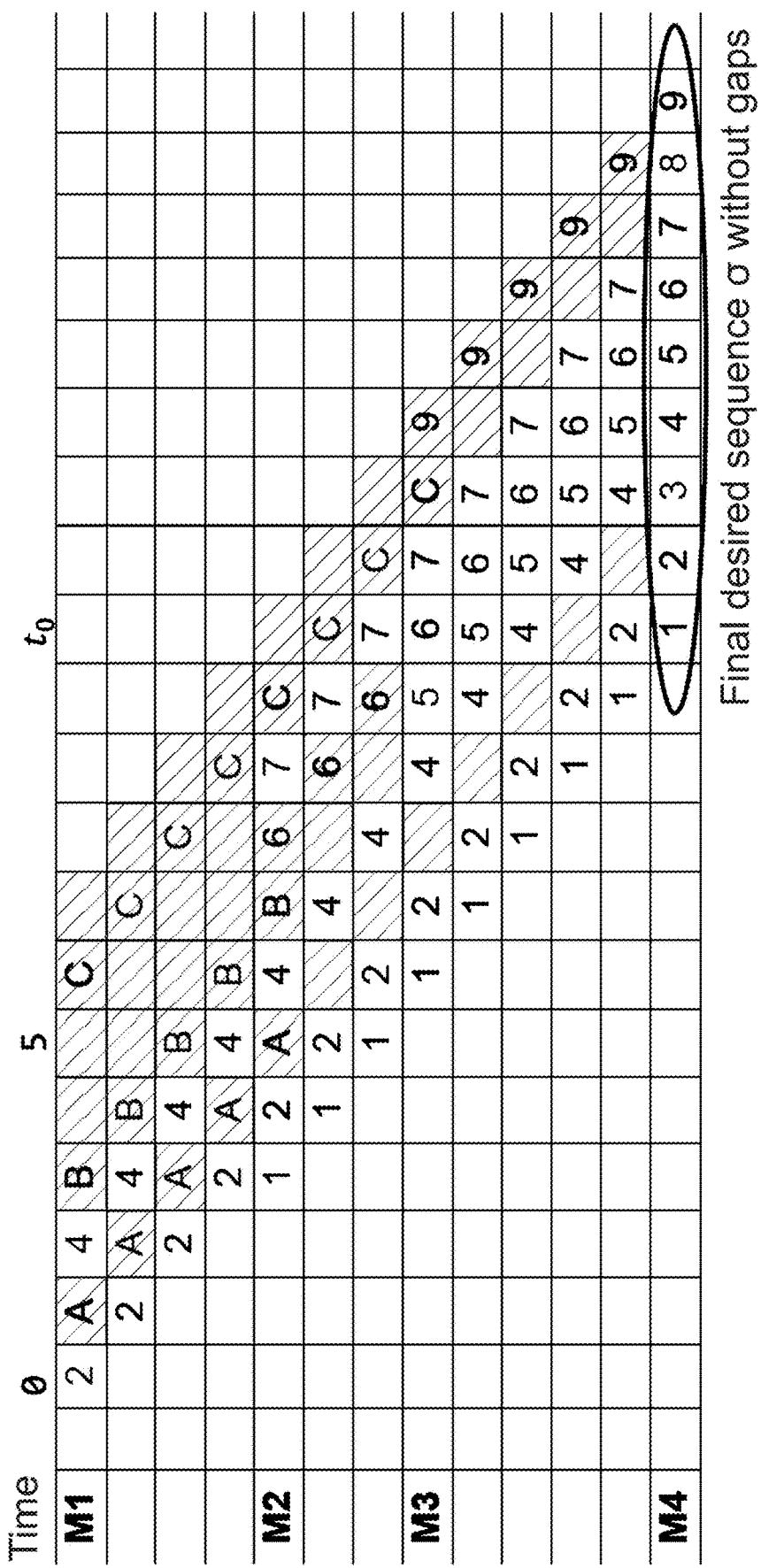
Figure 44:
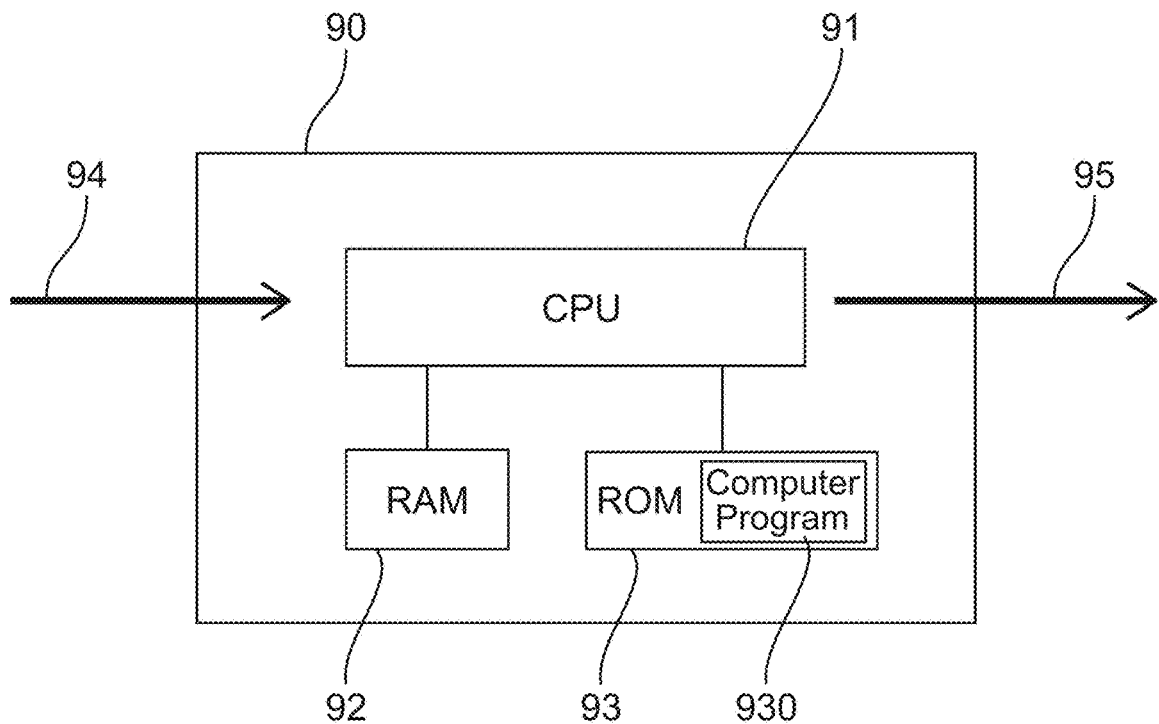
Figure 46:
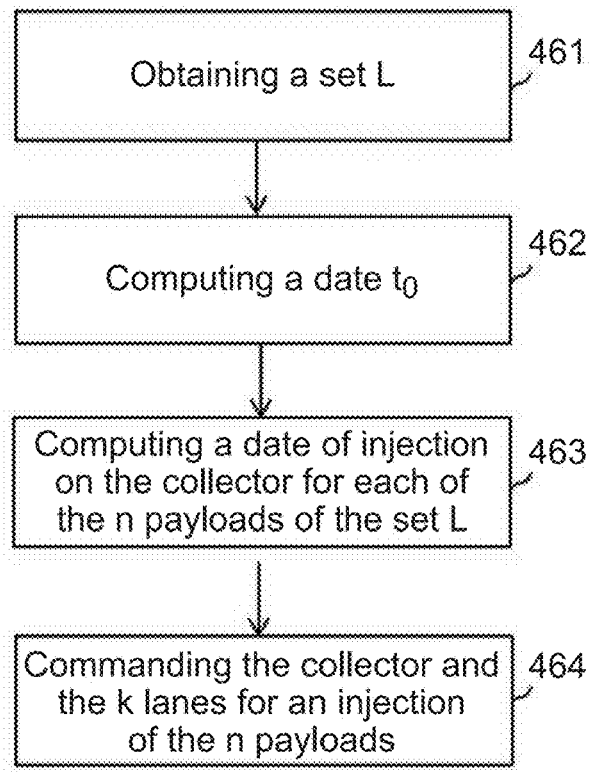
Figure 45:
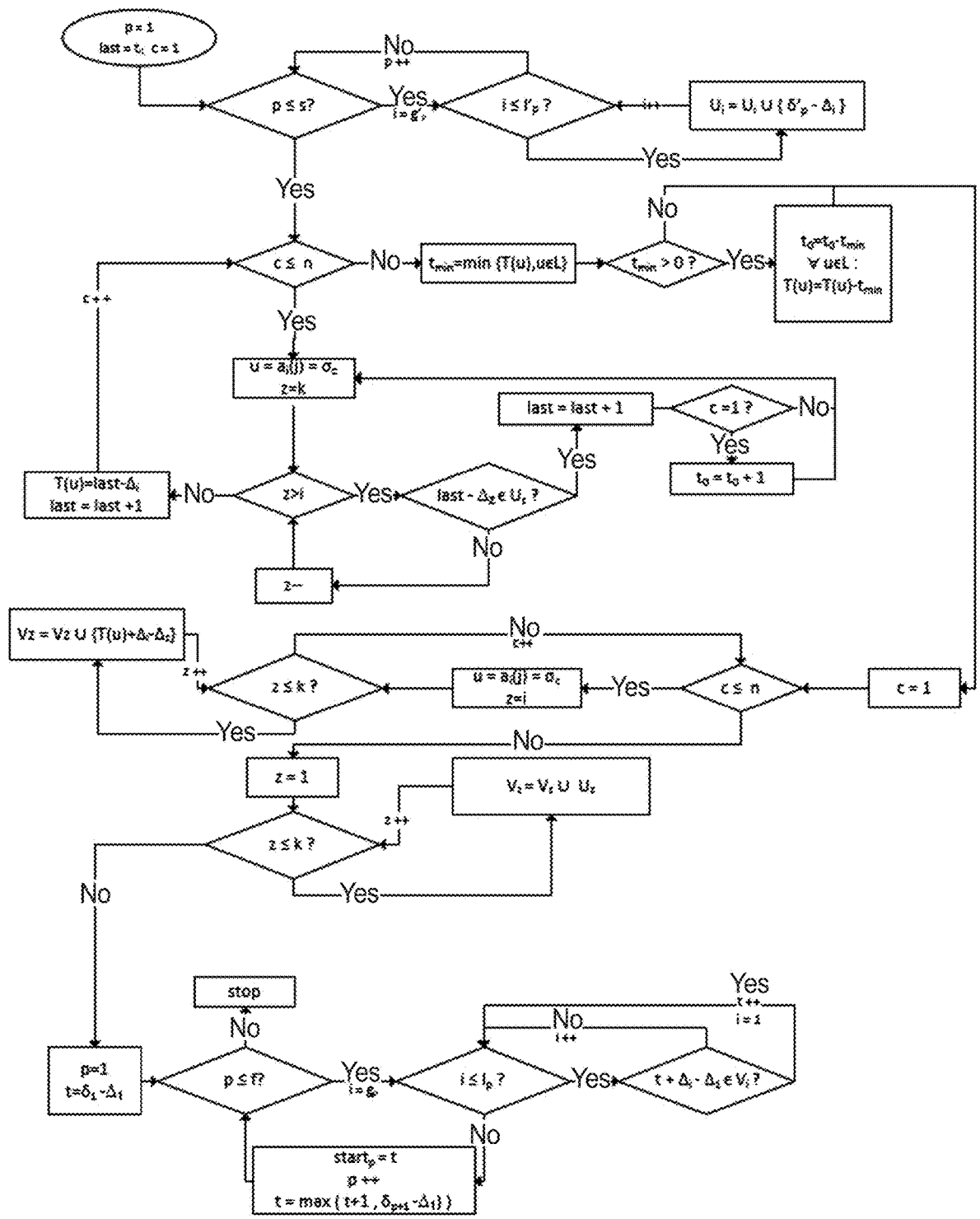
Figure 47:
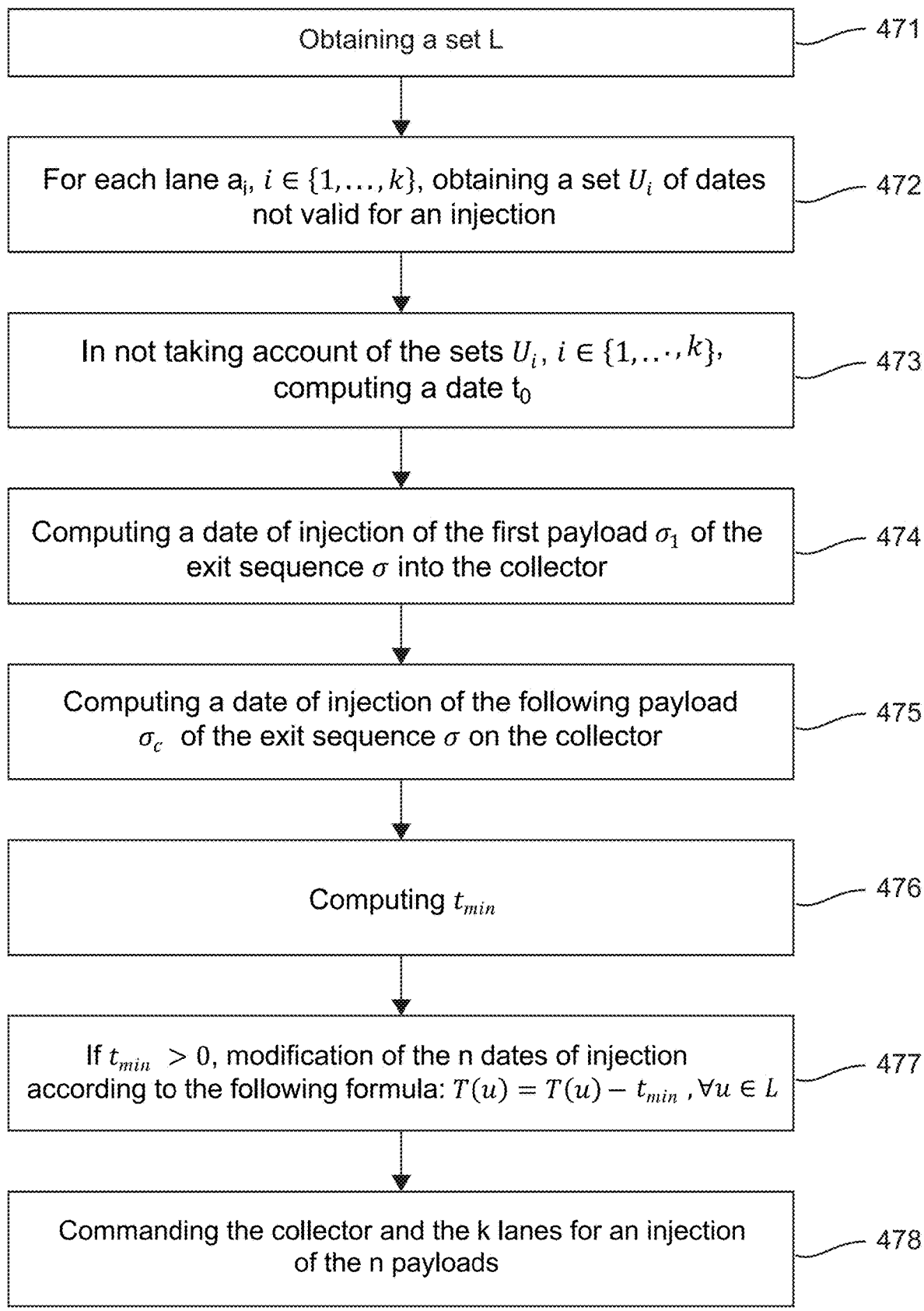
Figure 48:
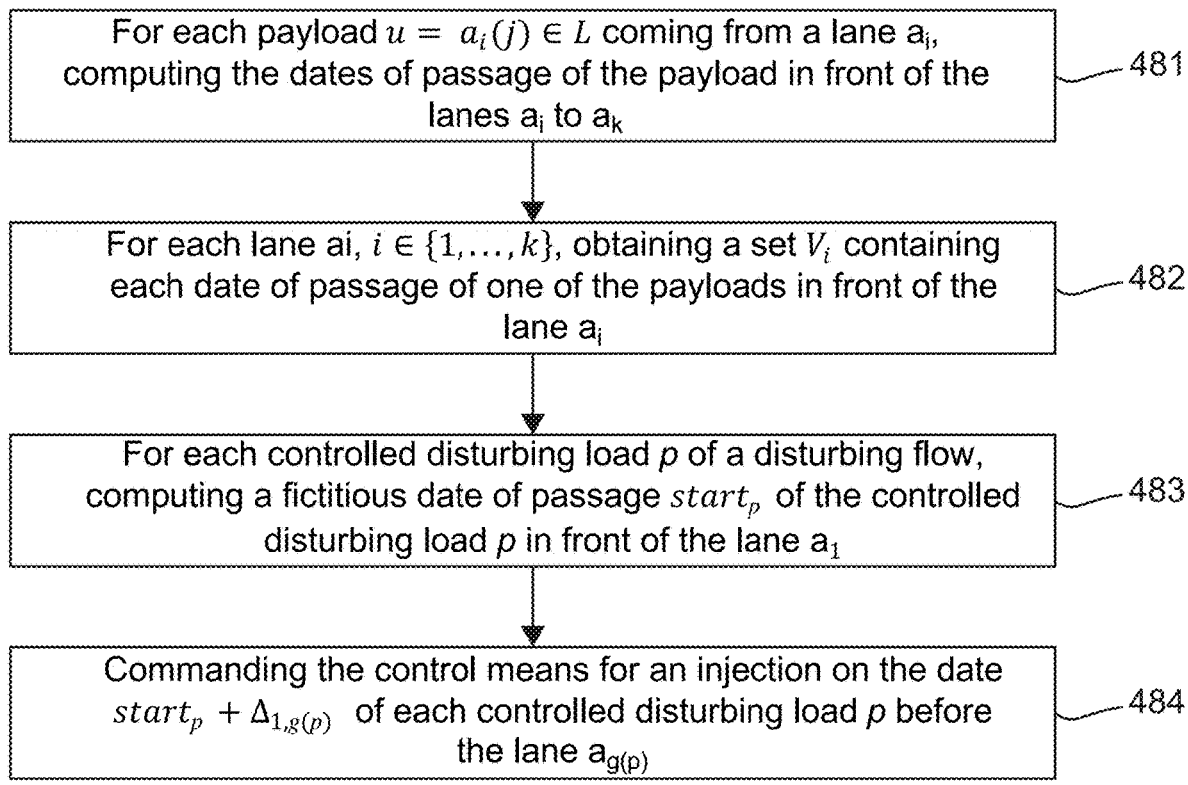
Figure 49:
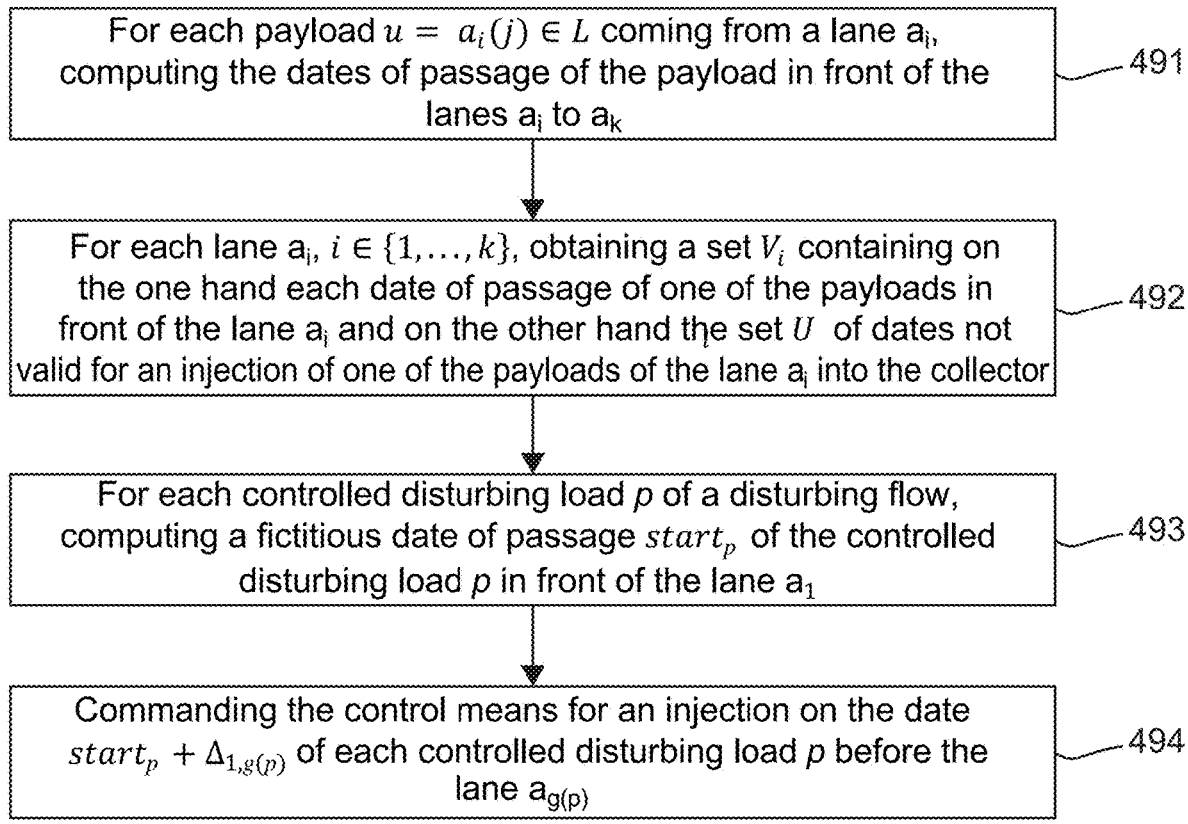
Figure 50:
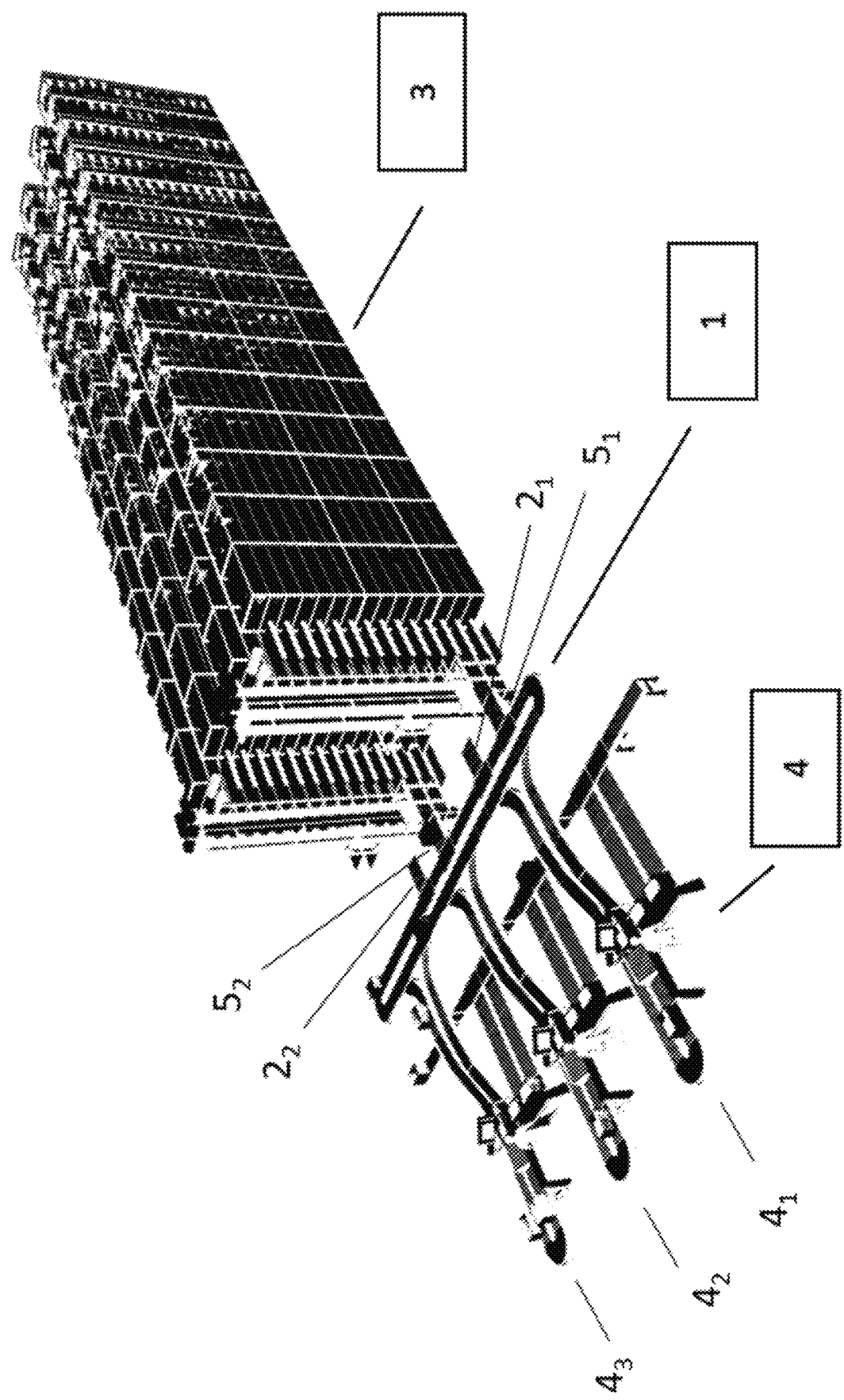

FIG. 21 shows an image of the collector at the instant 0;
FIG. 22 shows an image of the collector at the instant 1;
FIG. 23 shows an image of the collector at the instant 2;
FIG. 24 shows an image of the collector at the instant 3;
FIG. 25 shows an example of a FIFO list associated with three lanes;
FIG. 26 shows an achievable sequence, expected on the collector;
FIG. 27 shows the first load of the flow attached to the injection point, forming part of the FIFO list;
FIG. 28 shows the first load of the flow not attached to the injection point, not forming part of the FIFO list;
FIG. 29 shows loads on continuous hold behind a first load forming part of the FIFO list;
FIG. 30 shows loads on continuous hold behind a first load not forming part of the FIFO list;
FIG. 31 shows an example of a work batch;
FIG. 32 shows a computation of the dates of injection and processing of the batch 1;
FIG. 33 shows the processing of a batch in progress;
FIG. 34 shows the end of processing of the batch 1 and the formation of the batch 2;
FIG. 35 shows the end of processing of the batch 2 and its application;
FIG. 36 is a chart of the algorithm in the general case with non-controlled disturbing flow;
FIG. 37 shows an example of a disturbing flow: grey-colored loads returning to the PTS;
FIG. 38 shows an example of a collector with four unspecified lanes with non-controlled disturbing flow;
FIG. 39 is a Gantt chart with non-controlled disturbing flow forming spaces;
FIG. 40 is a chart of algorithm 4;
FIG. 41 shows an example of a collector with four lanes placed in any unspecified way with controlled disturbing flow;
FIG. 42 is a Gantt chart of the injections showing the spaces to be used for the disturbing loads;
FIG. 43 is a Gantt chart when choosing the placing of the disturbing loads;
FIG. 44 shows a structure of a control system according to one particular embodiment of the invention;
FIG. 45 is a chart of the algorithm 5;
FIG. 46 is a flowchart of a method of merging k incoming flows into one outgoing flow, according to a first particular embodiment based on the algorithm 2;
FIG. 47 is a flowchart of a method of merging k incoming flows into one outgoing flow, according to a second particular embodiment based on the algorithm 3 (illustrated in FIG. 36);
FIG. 48 is a flowchart of a method of merging k incoming flows into one outgoing flow, according to a third particular embodiment based on the algorithm 4 (illustrated in FIG. 40);
FIG. 49 is a flowchart of a method of merging k incoming flows into one outgoing flow, according to a fourth particular embodiment based on the algorithm 5 (illustrated in FIG. 45);
FIG. 50 shows an example of an application.

DETAILED DESCRIPTION OF ILLUSTRATIVE EMBODIMENTS

5. Control System Parameters

As mentioned further above, the system under study is formed by a drain-off system (a conveyor called a collector), several other conveyors (called lanes) and loads. The system is dynamic, and the loads are transported by the lanes, injected into the collector and then transported by the collector. In a first stage, we shall consider the state of this system in freezing the position of each load present in it at a given instant. We shall define the frozen sub-systems of this system to be able to compute future dates of injection of certain loads. This corresponds to the resolution of the static problem. Section 7 shall examine the way to control and steer this system dynamically.

Figure 1:
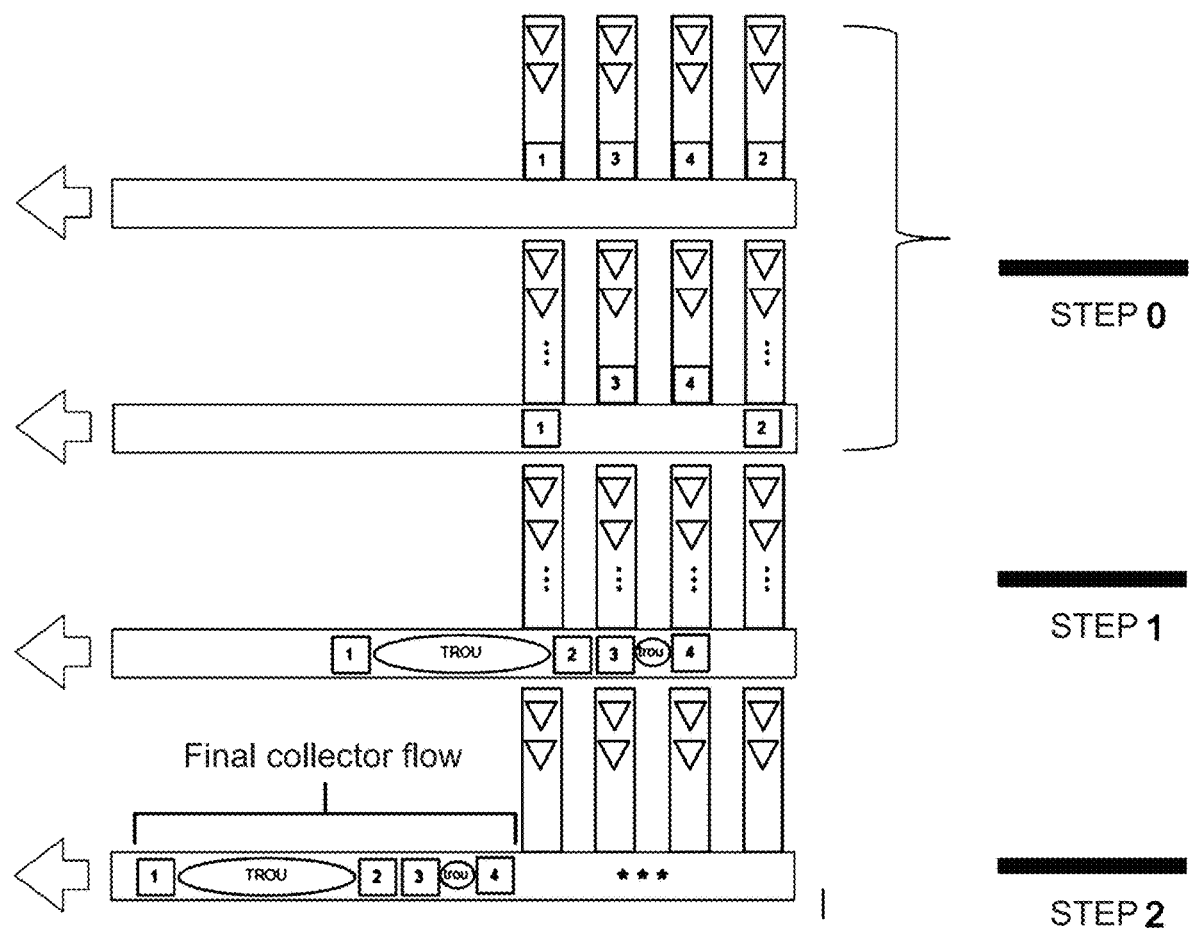
FIG. 1 shows an existing method for the insertion of loads in a given sequential order.
Figure 2:
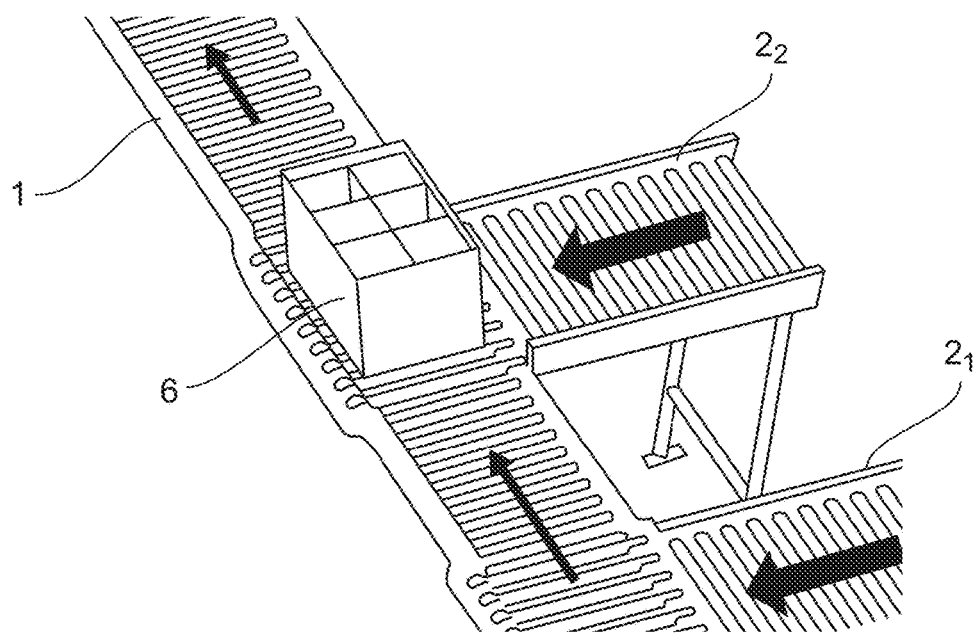
FIG. 2 is an image of two lanes (conveyors), one collector and one load (box)

FIG. 2 is an image illustrating two lanes (conveyors) $2_1$, $2_2$, one collector 1 and one load (box or carton) 6. FIG. 3 is a modelized view of the elements appearing in the image of FIG. 2 (and keeps the same numerical references).

5.1 Notations

The table here below is a summary of the notations.

TABLE 1

| | |
|---|---|
| k | Number of injection flows (incoming flows) of the system |
| $a_i$, $i \in \{1, \ldots, k\}$ | k lanes (conveyors) each transporting an ordered set of loads at a given instant |
| $h_i$, $i \in \{1, \ldots, k\}$ | Number of loads present on the lane (conveyor) $a_i$ |
| $n = \sum_{i=1\ldots k} h_i$ | Total number of loads to be injected into the collector |
| L | Set of loads to be injected into the collector |
| $u = a_i(j)$, $i \in \{1, \ldots, k\}$, $j \in \{1, \ldots, h_i\}$ | Load $u \in L$, coming from the $j^{th}$ position in the lane $a_i$ |
| σ | Desired exit sequence, ordering all the loads of L |
| σ(u), $u \in L$ | Position of the load u in the exit sequence |
| $σ_c$ | $c^{th}$ load of the sequence σ, belonging to L set $u = a_i(j)$ to $σ_c$ signifies the computation of u, i, j for the load $σ_c$ |
| L' | Set of loads placed in first position of the lanes situated between the lane $a_1$ and the lane containing the first load of the sequence σ (i.e. $σ_1$) |
| $T_D(u)$, $u \in L$ | Departure date of the load u, coinciding with the departure point, namely the instant at which the load must leave its lane (conveyor) |
| T(u), $u \in L$ | Date of injection of the load u into the collector, coinciding with the injection point at which the load arrives physically on the collector |
| $Pt_i$, $i \in \{1, \ldots, k\}$ | Time needed to travel the distance between the departure point and the injection point for a load of the lane $a_i$ |
| The <<span>> | Time unit corresponding to the sub-division (or slicing) of the collector into time spans (also called time positions or time slots) |
| The date 0 | Date as which we can start injecting the loads into the collector (date taking the form of the first unoccupied location on this collector) |
| The date $t_0$ | Date at which the first load of the desired exit sequence passes in front of the lane $a_k$ |
| $\Delta_i$, $i \in \{1, \ldots, k\}$ | Distance in "spans" between the lane $a_i$ and the lane $a_k$ |
| $\Delta_{i,j}$, $i \in \{1, \ldots, k-2\}$, $j \in \{1, \ldots, k-1\}$ | Distance in "spans" between the lane $a_i$ and the lane $a_j$ |

5.1.1 Notations on Lanes of the Conveying System

For a configuration of the system at a given instant, each lane will comprise an ordered set of loads. Let k be the number of lanes in our system, each lane being numbered $\alpha_1$ to $\alpha_k$ in the sense of movement of the collector. These lanes respectively possess a number $h_i$ of loads represented by a First-In-First-Out (FIFO) list that has to be injected one by one into the collector.

An example is given in FIG. 4. The sense of movement of the collector 1 is from right to left, this direction being indicated by the arrow. Each lane is numbered and comprises ordered loads which will have to be injected one by one, from bottom to top, into the collector. In this example, we therefore have k=3 with $h_1$=2, content of $\alpha_1$={id11, id12}, $h_2$=3, content of $\alpha_2$={id21, id22, id23} and $h_3$=4, content of $a_3$={id31, id32, id33, id34}.

5.1.2 Notations of Loads to be Injected

There are n loads (boxes, bins, containers, etc.) in all to be injected into the collector, coming from the different injection flows. Let L denote the set of these loads and u=$\alpha_i$(j) a load u belonging to L, coming from the $j^{th}$ position in the lane $\alpha_i$.

In addition, let $\sigma$ be the exit sequence in which these loads must be ordered once they are all injected into the collector. The function $\phi(u)$ gives the position of the load u in this sequence. Each load can thus be identified by a single "sequence" number between 1 and n, corresponding to its position in the desired exit sequence ($\sigma$). This is how we will identify the loads here below. It can be noted that, in this case, it is easy to verify if the sequence is achievable: it is enough for each lane to have an ordered list of loads identified by sequence numbers in rising order that are not necessarily consecutive.

Let us now specify the set L', specially grouping together the first loads awaited in the final exit sequence, placed at the first position of the lanes $\alpha_1$, $\alpha_2$, . . . , $\alpha_{i_1}$ with $i_1$ being the lane number containing the first load of this sequence $\sigma$. This set brings together all the loads that can be the first load of the sequence to be injected into the collector. Indeed, a load in first position in a lane placed upstream to the lane comprising the first load of the sequence is likely to be injected first, while at the same time being situated behind the first load in the final flow of the collector. However, a load in first position in the lanes downstream from the lane comprising the first load will never be injected before this first load into the collector.

FIG. 5 shows a diagram equivalent to that of FIG. 4 in taking the achievable sequence $\sigma$={id21, id31, id22, id11, id23, id32, id33, id34, id12}. In this example, n=9, therefore each load has a unique sequence number enabling it to be identified while at the same time speedily knowing its desired position in the sequence $\sigma$. FIG. 5 immediately makes it possible to see that the chosen sequence is achievable, indeed content of $\alpha_1$={4,9}, content of $\alpha_2$={1,3,5} and content of $\alpha_3$={2,6,7,8}. In addition, we have the particular set $L_{i_1}$={id11, id21}={4,1}.

5.1.3 Departure Dates and Injection Dates

Figure 6:
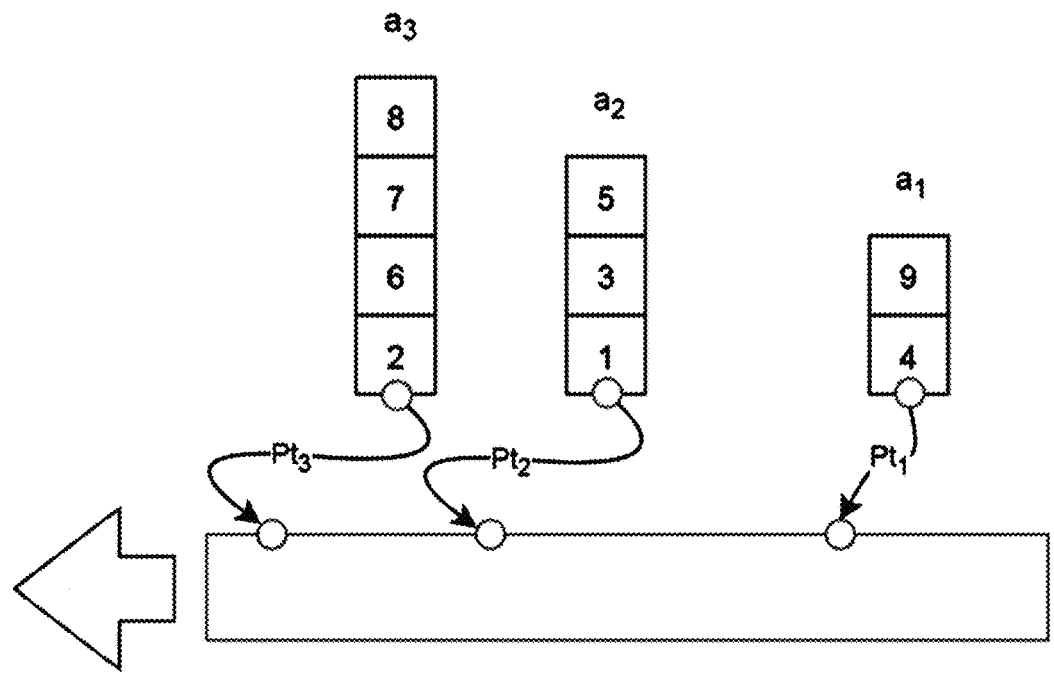
FIG. 6 shows a departure point and an injection point.

It may be recalled that each lane corresponds to an injection flow at a given instant, represented as a FIFO column attached to the collector. However, in the warehouse, it can happen that the load awaiting injection is at a distance from the collector. Let departure point denote the place at which this load awaits the order to depart from its lane (conveyor), illustrated by a point attached to the FIFO column, and let injection point denote the space of the collector that is the first to be touched by the load in the course of being really injected into this collector, illustrated by a dot attached to the collector in FIG. 6.

Figure 7:
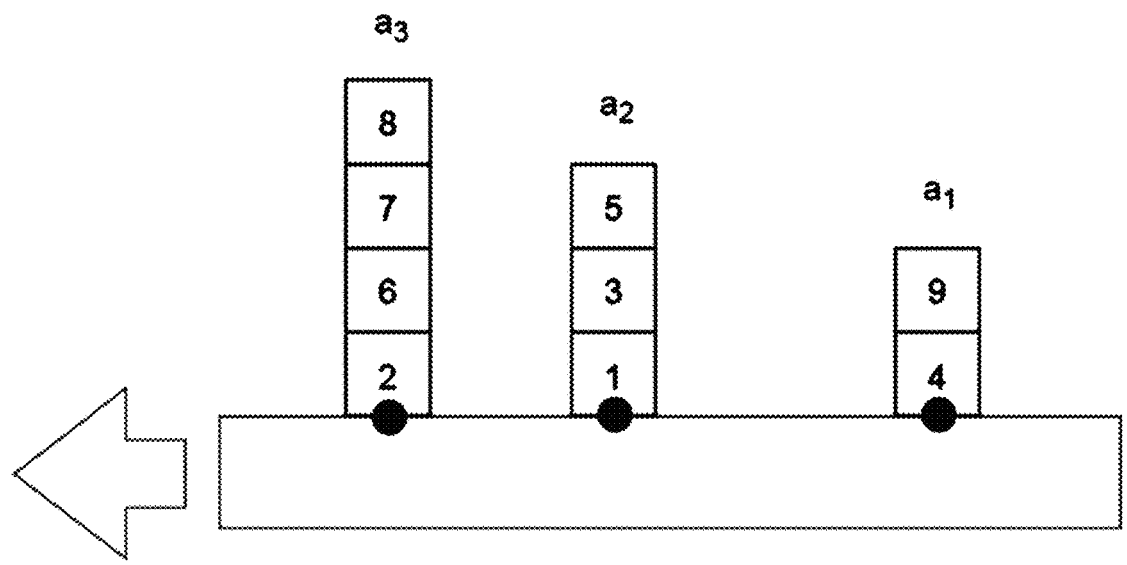
FIG. 7 shows coinciding points without loss with respect to the general configuration.

In the diagrams of the system in lanes, these two points (dots) coincide and are represented in black in FIG. 7. In reality, these points are often different, and the duration needed for a load of the flow i to pass from one point to the other is called $Pt_i$ (see FIG. 6). The departure date $T_D$ of the load when it must leave its lane (conveyor) is linked to its date of injection T into the collector (coinciding with the injection point) by the following simple formula: $T_D$=T–$Pt_i$. Consequently, without loss in terms of general description here below, we shall present solely the computations of the injection dates.

5.2 Data Structure 5.2.1 Sub-Dividing the Drain-Off System (Collector): Time Unit (Time Span)

The drain-off system (or collector) will be considered as a system with time spans (like a sorter) also called slots or positions.

Figure 8:
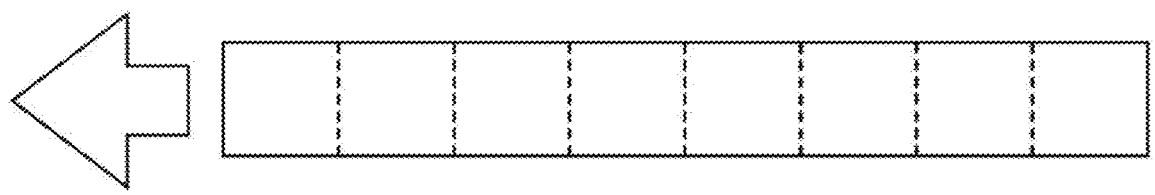
FIG. 8 shows a slicing of the collector into spans (positions or slots)

FIG. 8 illustrates the sub-division into time spans (positions or slots) of the collector.

Figure 9:
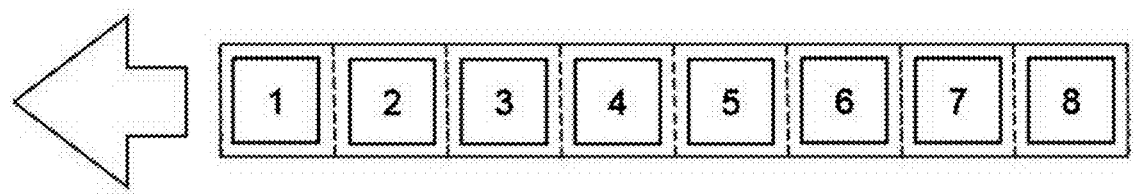
FIG. 9 shows the desired exit sequence expected in the slicing of the collector.

Thus, our goal of obtaining a maximum throughput with an ordered outgoing flow amounts to filling the spans of the collector as can be seen in FIG. 9.

Figure 10:
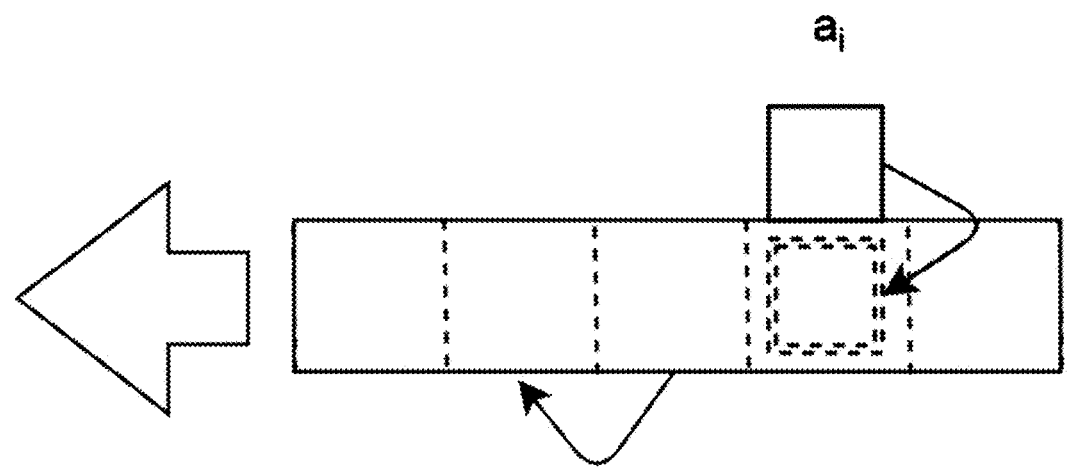
FIG. 10 shows the time unit associated with the collector span relative to the duration of injection of a load.

We shall consider a time unit corresponding to this time span that sub-divides the collector, according to its speed of movement. A time unit, called a "time span", corresponds to the duration needed for a point of the collector to move exactly by the physical distance corresponding to one position. The distance defined for this position corresponds to the size of a load plus a security distance. This security distance must be adjusted according to the needs of those skilled in the art and in order to comply with the following condition (illustrated in FIG. 10).

The time unit must obligatorily be greater than the time taken by a load to be injected into the collector from the time when a part of the load touches the collector up to the time when the entire load is placed accurately on the collector (i.e. in its flow).

5.2.2 Distance from the Injection System

Figure 11:
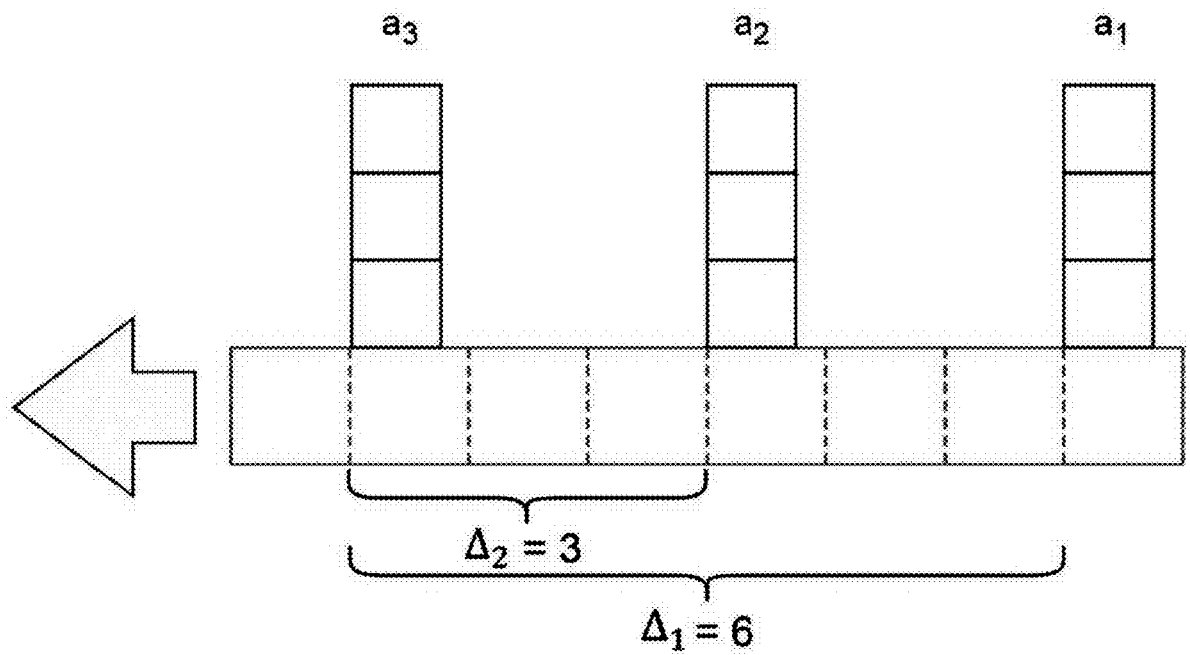
FIG. 11 shows distances as integer values between the injection flows.
Figure 12:
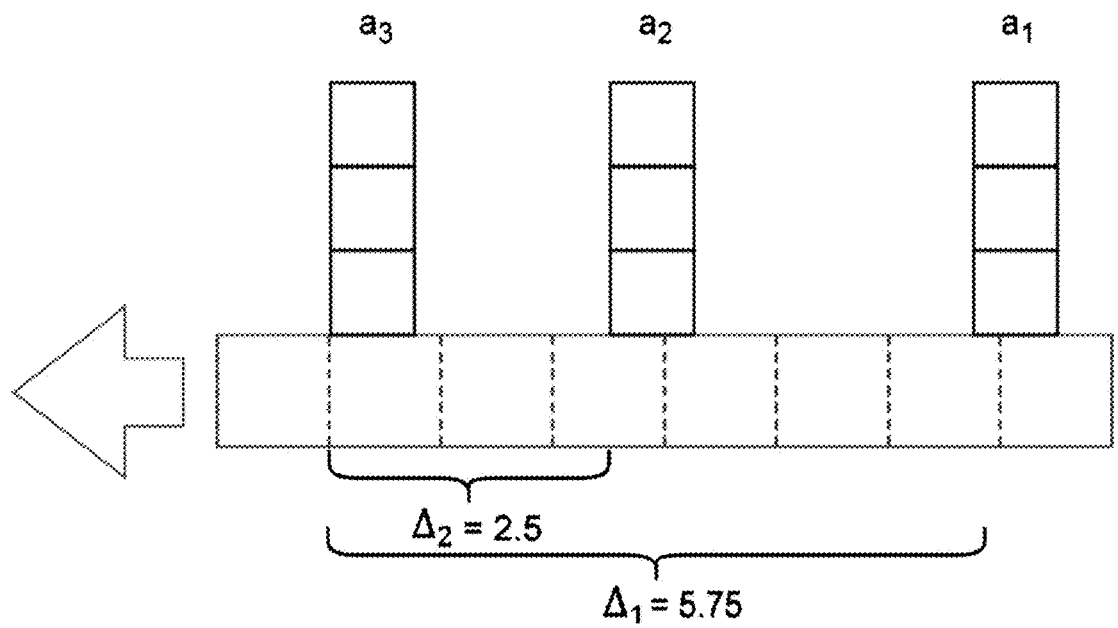
FIG. 12 shows distances between the injection flows that are not required to be integer values.

As illustrated in FIG. 11, $\Delta_i$ is defined as corresponding to the number of time spans of the collector (drain-off system) between the lane $\alpha_i$ and the last lane $\alpha_k$, as can be seen in the following figures with k=3. As illustrated in FIG. 12, it is possible for this number not to be an integer. $\Delta_k$=0.

The time distance between two lanes $a_i$ and $a_j$ is denoted as $\Delta_{i,j}$, the second index being the lane relative to which operation is situated.

5.2.3 Associated Job Shop Model

The following table is a summary of the notations of the Job Shop model

TABLE 2

| | |
|---|---|
| {$J_u$, u ∈ {1, . . . , n}} | Set of n jobs associated with a Job Shop model. The $u^{th}$ load of the sequence $\sigma$ is denoted as $\sigma_u$ = $a_i$ (j), occupies the $j^{th}$ place of the lane $a_i$ and is associated with the job $J_u$ |
| {$M_1$, . . . , $M_k$} | Set of k machines of the Job Shop model. The lane $a_i$ is associated with the machine $M_i$. |
| {$o_{u,i}$, $o_{u,\{i+1\}}$, . . . $o_{u,k}$} u ∈ {1, . . . ,n}, $\sigma_u$ = $a_i$ (j) | List of k – i consecutive operations associated with the job $J_u$, it being known that the operation $o_{u,i}$ must be carried out on the machine $M_i$. |

For each exit sequence $\sigma$, we model the system as a unit-job Job Shop model, with n jobs and k machines. Each load of the sequence $\sigma_u$ ($u^{th}$ load of this sequence) is associated with a job $J_u$ and each lane $\alpha_i$ is associated with a machine $M_i$. Each job $J_u$ associated with a load contained in the lane $\alpha_i$ must follow an ordered list of k−i+1 unit operations $\{o_{u,i}, o_{u,\{i+1\}}, \ldots, o_{u,k}\}$. An operation denoted as $o_{u,i}$ is a unit job of the job $J_u$ to be performed specifically on the machine $M_i$. A job can be assigned to only one machine at a time and a machine can carry out only one operation at a time.

We shall try to schedule these jobs on the machines in complying with the sequential order given by their respective list of operations. The goal is to schedule them in order to minimize the total duration of execution of all these jobs.

6. DETERMINING THE DATE OF INJECTION OF EACH LOAD, FOR A COLLECTOR PROCESSING ONLY THE INJECTION FLOWS

In this part, we shall consider a collector processing only the injection flows. The collector is entirely vacant and ready to retrieve the injection flows. Only the merger of these injection flows must be controlled to accurately inject their loads in order to have a final flow that is fluid, continuous and corresponds to the desired exit sequence.

6.1 Solution for Consecutively Well-Distributed Lanes

Figure 13:
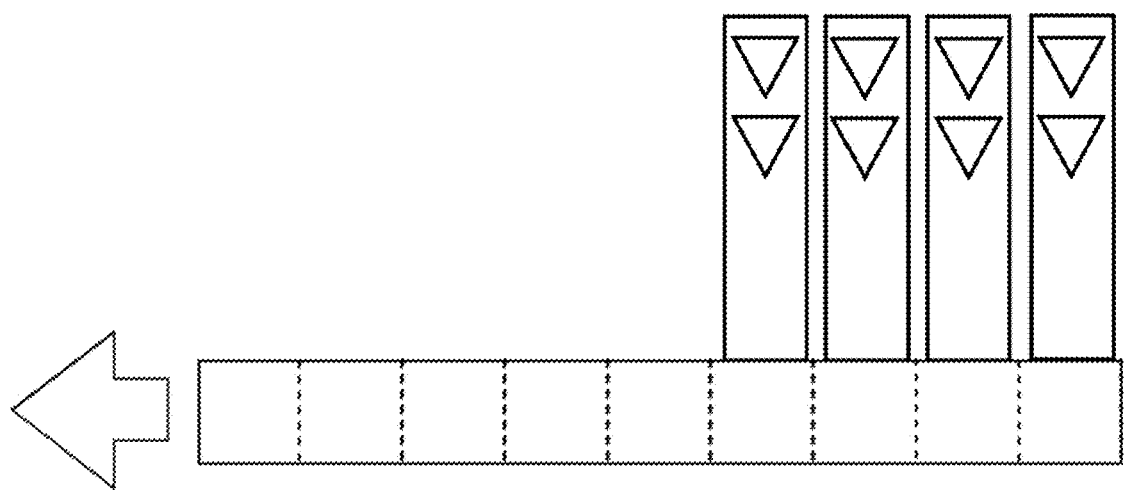
FIG. 13 is a drawing of the collector with injection points placed consecutively at each span.

In order to simplify matters, we shall assume that the injection flows are distributed consecutively on the collector in such a way that a time interval is needed for a load on the collector to pass from one injection zone to the next as can be seen in FIG. 13. This simplified case corresponds to $\Delta_{i,i+1}=1$, for all $i \in \{1, \ldots, k-1\}$.

6.1.1 Modelling the System as a Job Shop Scheduling

We shall explain the modelling of the system as a problem of Job Shop scheduling in this particular case.

Each of then loads is associated with a job $J_u$, $u \in \{1, \ldots, n\}$, with numbering in accordance with the sequence number of the load. Thus, if $\sigma_u$ corresponds to the $u^{th}$ load in the sequence $\sigma$, then its associated job is $J_u$. The operations of these jobs must be processed by a set of k machines $\{M_1, \ldots, M_k\}$. An operation can be allotted to only one machine at a time. Each machine is associated with a lane (i.e. an injection flow) that can carry out only one operation at a time. It may be recalled that these lanes are numbered $\{\alpha_1, \ldots, \alpha_k\}$, from upstream to downstream (i.e. according to the sense of conveyance of the collector).

Thus, a load $\sigma_u$ being injected into the collector from the lane $\alpha_i$ will pass in front of each lane $a_j$ with j in $\{i, i+1, \ldots, k\}$. This mechanism is represented by the fact that each job associated with a load of the lane $\alpha_i$ is composed of k−i+1 unit operations $\{o_{u,i}, o_{u,\{i+1\}}, \ldots, o_{u,k}\}$ to be processed consecutively without waiting. Each operation has to be scheduled on a specific machine. Thus, if the operation $o_{u,i}$ (processed by the machine $M_i$) starts at the instant t, the operation $o_{u,\{i+1\}}$ (processed by the machine $M_{\{i+1\}}$) starts at the instant t+1, etc., and finally the operation $o_{u,k}$ (processed by the machine $M_k$) starts at the instant t+k−i.

If the starting instant of the first operation $o_{u,i}$ of this job corresponds to the date of injection into the collector, the starting instants of the following operations (c.-à-d. $\{o_{u,\{i+1\}}, \ldots, o_{u,k}\}$) represent the instants at which the load is in front of the following lanes.

It can be noted that each job is composed of at least one operation on the last machine $M_k$ (since each load passes in front of at least the last lane $\alpha_k$). The sequence of the operations scheduled on the machine $M_k$ corresponds exactly to the order in which the loads will pass in front of the last lane and their departure date corresponds to the instant when these loads will pass in front of this last injection lane. This is why, if the load u is before the load v in the given exit sequence, the last operation of u must begin before the last operation of v on $M_k$.

The goal of not having space on the collector amounts to not having idle time between the operations of the machine $M_k$.

6.1.2 Principle of the Algorithm Enabling the Injection Dates to be Attained The scheduling problem proposed here above can be resolved by the following algorithm.

To begin with, assuming that the first load of the sequence comes from the lane $\alpha_i$, the operations $\{o_{1,i}, o_{1,\{i+1\}}, \ldots, o_{1,k}\}$ associated with this job start at the instants t, t+1, . . . t+k−i.

Then, the operations of the job corresponding to the next load of the sequence will be scheduled first of all by executing the operation to be processed on the machine $M_k$. This operation $o_{u,k}$ will be scheduled just after the previous operation programmed on $M_k$ (without idle time). In assuming that this operation begins at the instant t, the operation on the machine $M_{\{k-1\}}$ (if it exists) is scheduled at the instant t−1, and so on and so forth, until all the operations are programmed.

This procedure is applied iteratively to each of the following jobs of the given sequence.

The real dates of injection into the collector are deduced directly from the start of the first operation of each job. The time unit used is the one defined here above ("the time span" of the collector).

6.1.3 Computation of Dates of Injection by Formula

Now that we have described how the algorithm for resolving the scheduling problem works, we shall deduce the formula used to compute the injection dates.

The notations used in the formula here below are those of the summary table discussed further above.

Let us fix the origin of the time at the earliest date of injection of the very first load or loads injected into the collector. In the present system, the unoccupied location that will receive this load is therefore placed just in front of the lane of this load at the instant 0. Thus, we will compute the date $$t_0 = \max_{u=a_i(j) \in L', 1 \leq i \leq k, 1 \leq j \leq h_i} \{k + 1 - i - \sigma(u)\}$$

corresponding to the earliest date at which the first load of the sequence passes in front of the lane $a_k$.

Proof: Let 0 be the date at which the injection of the load starts. Let $t_0$ be the date at which the first load of the sequence (i.e. $\sigma_1$) passes in front of the lane $a_k$. We note that the first load injected into the collector is necessarily a load at the head of a lane, in a lane situated from the lane $a_1$ to the lane of $\sigma_1$. Let $L' \subset L$ be this sub-set of loads.

Therefore, for any load $u = \alpha_i(j) \in L'$, we know that if it were to be injected at the date x, it would pass in front of the lane $\alpha_k$ at the date x+k−i. We have x≥0 since we cannot inject the load before the date 0. Now, by definition of $t_0$, the load u will pass in front of the lane $\alpha_k$ at the date $t_0+\sigma(u)-1=x+k-i$. That is, $t_0+\sigma(u)-1-k+i=x\geq 0$.

From this, we deduce that for all $u=\alpha_i(j) \in L'$, $t_0 \geq k+1-i-\sigma(u)$. We search for the earliest date enabling the verification of all these constraints, therefore:

$$t_0 = \max_{u=a_i(j) \in L'} \{k + 1 - i - \sigma(u)\}$$

Figure 14:
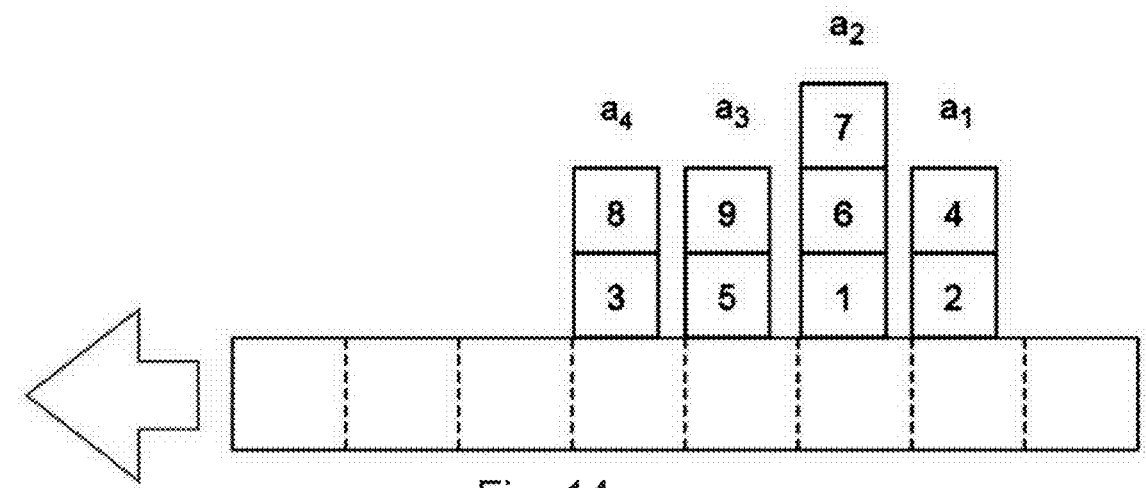
FIG. 14 shows an example of collector with four-lane that are placed consecutively according to span of the collector.

The algorithm 1 here below gives the dates of injection T(u), i.e. the dates of entry of each load u into the collector. The time unit used is the "time span" defined further above. The algorithm 1 gives the formula for computing these injection dates should the flows get injected at each consecutive location on the collector (see FIG. 14).

---
Algorithm 1: Computation of the dates of injection without disturbing flow in one particular case
---

Require: σ, k, L', $a_i(j)$, $h_i$, $\forall i \in \{1, \ldots, k\}$, $\forall j \in \{1, \ldots, h_i\}$ $t_0 = \max\limits_{u=a_i(j) \in L'} \{k+1-i-\sigma(u)\}$ for all $i \in \{1, \ldots, k\}$ do
  for all $j \in \{1, \ldots, h_i\}$ do
    set $u = a_i(j)$
    $T(u) = t_0 + \sigma(u) - 1 - (k - i)$
  end for
end for
return T(u), $\forall u \in L$

---

6.1.4 Example

In scheduling, the Gantt chart is a very useful tool for viewing, in time, the operations composing a job. This tool will enable us to graphically represent the progress of the work of each machine and visually show us the solution provided to our problem. In addition, we can see the link between the results obtained by the algorithm enabling the injection dates to be attained and the associated formula.

Let us take the configuration of the system as follows (see FIG. 14): k=4 lanes comprising two or three loads. Each load is identified by a unique sequence number by means of the exit sequence σ=(1,2,3,4,5,6,7,8,9). This is an achievable sequence.

Figures 15, 18:
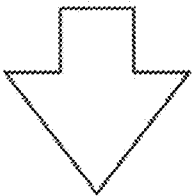
FIG. 15 is a Gantt chart related to the job shop and retrieving data to be computed by formula.
FIG. 18 shows an example of a collector and two lanes with the identifiers of the loads.

In this simplified case, we can represent the Job Shop solution in a Gantt chart such that each row corresponds to one machine. The fact that each load passes by the machines consecutively is represented by the fact that each load sequence number appears in consecutive boxes from left to right in the table (see FIG. 15). In addition, the first appearance of each load indicates its date of injection given by the formula in locking the time scale to the instant 0 defined further above. It may be recalled that the date 0 corresponds to the instant of the first possible load injection. We can even place the date $t_0$ according to its definition and find it by computation. It is recalled that $t_0$ is the date at which the first load of the sequence ($\sigma_1$) passes in front of the lane k=4, namely the number 1 when the operation of the job 1 is carried out by the machine $M_4$.

We find the desired sequence, without vacant space, on the machine $M_4$ and the date of injection of each load is given by the reading of the box of the first appearance (from left to right) of the sequence number giving the identification of this load.

6.2 Solution for Lanes with any Unspecified Distribution

Now that the simplified case has been seen, let us consider the general case of the collector that processes only the injection flows. The flows therefore no longer get injected consecutively at each time span of the collector but are distributed in any unspecified way. The distances between lanes are known. It is the travel time between the point of injection of the lane $\alpha_i$ and the last lane $\alpha_k$ that is of particular interest to us. It will be denoted $\Delta_i = \Delta_{i,k}$ (as defined further above).

6.2.1 Computation of the Dates of Injection by Formula

The algorithm 2 here below takes account of this notion of any unspecified time distance between lanes and thus responds to the general case of the collector dedicated to injection flows.

Let us again consider the date 0 as being the date of the first possible injection. This time, a load u of the lane i injected at the date x arrives in front of the lane $a_k$ at the date $x+\Delta_i$. Thus, we obtain the earliest date at which the first load of the sequence passes in front of the lane $\alpha_k$ by the formula $$t_0 = \max\limits_{u=a_i(j) \in L'} \{\Delta_i + 1 - \sigma(u)\}.$$

---
Algorithm 2: Computation of dates of injection without disturbing flow in a general case
---

Require: σ, k, L', $a_i(j)$, $\Delta_i$, $h_i$, $\forall i \in \{1, \ldots, k\}$, $\forall j \in \{1, \ldots, h_i\}$ $t_0 = \max\limits_{u=a_i(j) \in L'} \{\Delta_i + 1 - \sigma(u)\}$ for all $i \in \{1, \ldots, k\}$ do
  for all $j \in \{1, \ldots, h_i\}$ do
    set $u = a_i(j)$
    $T(u) = t_0 + \sigma(u) - 1 - \Delta_i$
  end for
end for
return T(u), $\forall u \in L$

---

FIG. 46 presents a flowchart of the method for merging k incoming flows into one outgoing flow, according to a first particular embodiment based on the algorithm 2. The method is executed at least once by the control system. A given execution is performed at an instant Tb and comprises the following steps:

- obtaining (step 461) a set L comprising n payloads distributed at the instant Tb on the k lanes and having to be injected into the collector to form an exit sequence σ, each of the n payloads being identified by a single sequence number within the exit sequence σ, each of the k lanes containing an ordered set, ordered in a rising order of sequence numbers, of $h_i$ payloads having to be injected one by one into the collector;
- computation (step 462) of a date $t_0$ at which the first payload $\sigma_1$ of the exit sequence σ passes in front of the lane $a_k$;
- computation (step 463) of a date of injection on the collector for each of the n payloads of the set L according to the following formula: $T(u)=t_0+\sigma(u)-1-\Delta_i$, with:
  u=$a_i(j) \in L$, a payload of the set L and coming from the $j^{th}$ position in the lane $a_i$, $i \in \{1, \ldots, k\}$, $j \in \{1, \ldots h_i\}$,
  σ(u) being the sequence number of the payload u in the exit sequence σ;
- commanding (step 464) the collector and the k lanes for an injection of the n payloads into the collector in keeping with the n injection dates T(u), $\forall u \in L$.

6.2.2 Example

Let us take an example similar to that of paragraph 6.1.4 in setting aside the lanes this time.

Let us take the configuration of the system as follows (see FIG. 16): k=4 lanes comprising two or three loads. Each load is identified by a unique sequence number as a function of the exit sequence σ=(1,2,3,4,5,6,7,8,9). This is an achieveable sequence. We know the distance from each lane to the last one: $\Delta_1=12$, $\Delta_2=7$, $\Delta_3=4$ and $\Delta_4=0$.

FIG. 17 gives the representation of the solution in the form of a Gantt chart. This time, two consecutive machines must be spaced out by as many rows as there are "time spans" between the two corresponding consecutive lanes. This is why the solution is given by a table with 13 ($=\Delta_1+1$) rows. By computation, we have $$t_0 = \max_{u \in \{1,2\}} \{\Delta_i + 1 - \sigma(u)\} = \max(7, 11) = 11,$$

which we find actually by definition at the instant 11 on the graph.

Here, for ease of comprehension, we give an example with inter-lane distances that are integer values but it is possible to take non-integer values in numbers of "time spans".

6.3 Description of One Particular Embodiment 6.3.1 List of Elements to be Grouped Together Each injection flow (incoming flow) is represented by a lane containing a list of loads in a FIFO order. The number of lanes can vary from 2 to k, and the list of the lane i contains $h_i$ loads ($h_i$ can be zero). There are, in all, n loads to be merged into collector. Let us take for example (see FIG. 18): k=2, $h_1=h_2=5$ and n=10.

In addition, staying with the general case, we shall take the resolutions of this general case with $\Delta_1=1$ and $\Delta_2=0$.

6.3.2 Building of a Default Sequence

When the final sequence of the loads on the collector is of no importance, it is enough to define, in any unspecified way an achievable sequence that sets the order of the loads.

We can design different ways of defining a "default" exit sequence:

Remove, in alternation, one load from each lane, $\sigma=(id_5, id_{10}, id_4, id_9, id_3, id_8, \ldots, id_6)$ Remove the loads as a function of their arrival in the injection flow, Remove the first load from each lane drawn randomly, etc.

6.3.3 a Sequence Given by a Disorder Minimizing Computation

Figure 19:
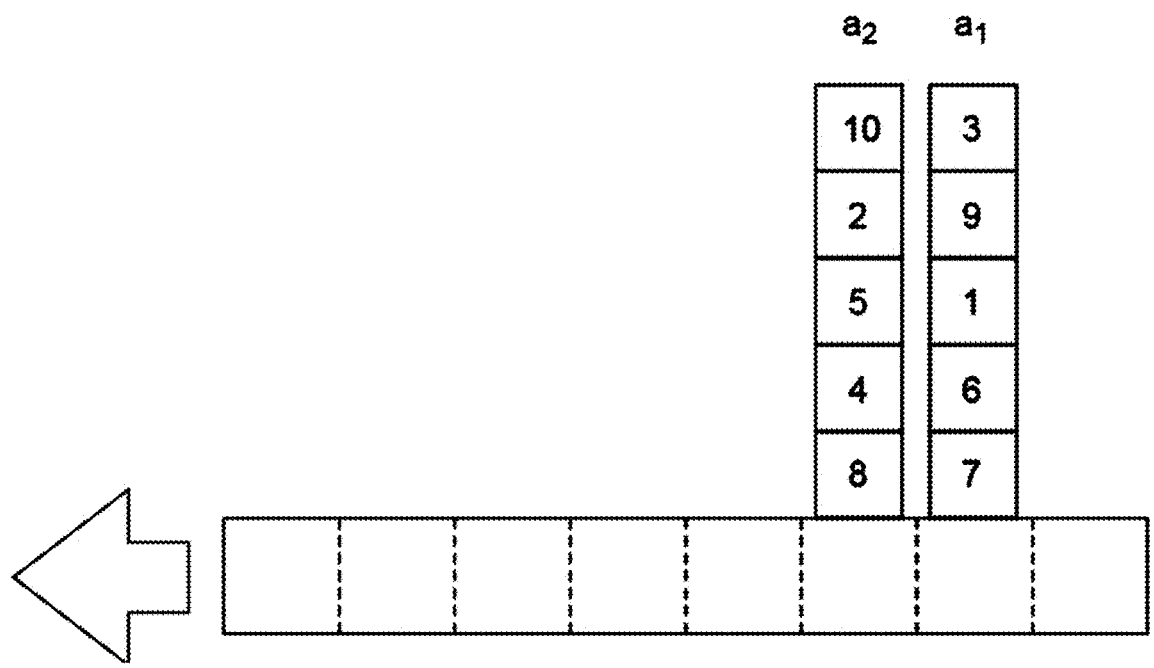
FIG. 19 shows an example of a collector and two lanes with the sequential order number identifiers.

FIG. 19 illustrates an example of a sequence ($\sigma'=(8,4,5,2,7,6,1,9,3,10)$) resulting from a disorder minimizing computation. The numbers indicated are not sequence numbers within the final sequence but sequential order numbers relative to customer orders to be picked.

This sequence $\sigma'$ can be seen as a given exit sequence for the algorithm which computes the injection dates. This sequence is obligatorily achievable and minimizes the disorder. We obtain a maximum throughput with a minimum disorder for the outgoing flow from the collector.

Figure 20:
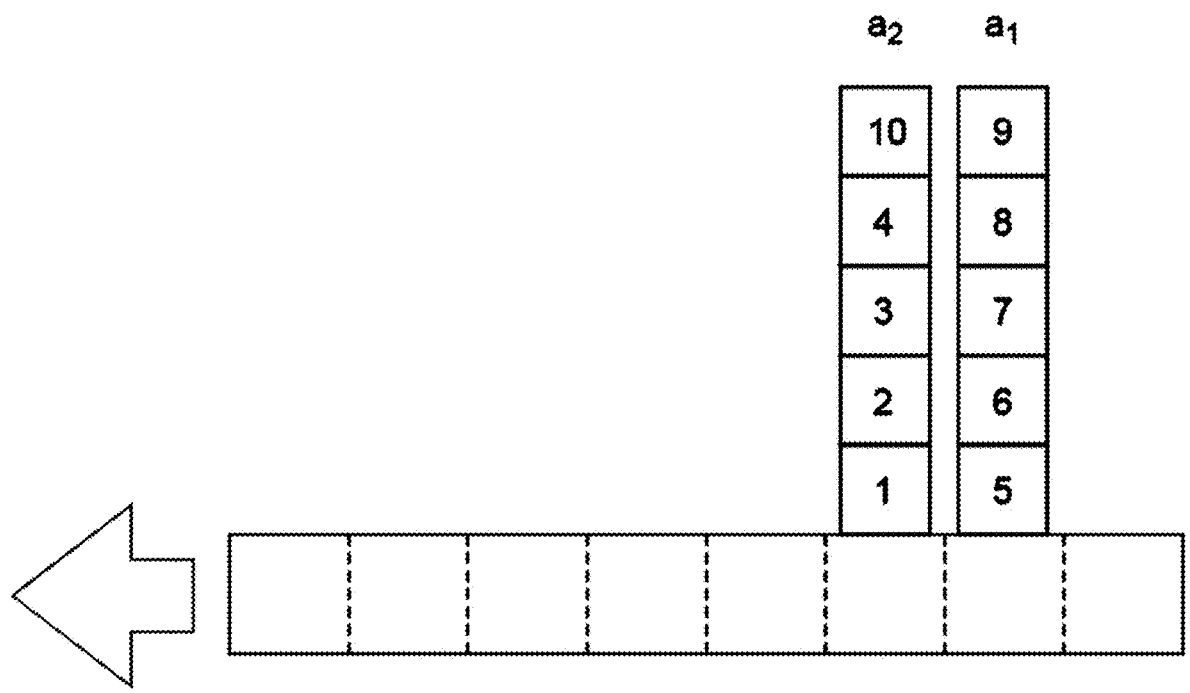
FIG. 20 shows an example of a collector and two lanes with sequence number identifiers.

Since it is always possible to assign a single sequence number from 1 to n to all the loads, corresponding to their position in the final sequence $\sigma$, we shall display the loads with these sequence numbers to identify them and characterize them entirely (cf. FIG. 20). FIGS. 19 and 20 are equivalent. The exit sequence $\sigma=(1,2,3,4,5,6,7,8,9,10)$ truly makes it possible to see the rising order of loads on each injection flow (proof of feasibility of the sequence).

Let us keep this configuration to continue the study of the example.

6.3.4 Building of $t_0$

In the present example, L' brings together the loads numbered 1 and 5.

We search for the maximum between $\{\Delta_2+1-\sigma(1), \Delta_1+1-\sigma(5)\}$, and we obtain $t_0=0$.

6.3.5 Computation of the Injection Dates (by Formula)

$T(1)=t_0+\sigma(1)-1-\Delta_2=0$ $T(2)=t_0+\sigma(2)-1-\Delta_2=1$ $T(3)=t_0+\sigma(3)-1-\Delta_2=2$ $T(4)=t_0+\sigma(4)-1-\Delta_2=3$ $T(5)=t_0+\sigma(5)-1-\Delta_1=3$ $T(6)=t_0+\sigma(6)-1-\Delta_1=4$ $T(7)=t_0+\sigma(7)-1-\Delta_1=5$ $T(8)=t_0+\sigma(8)-1-\Delta_1=6$ $T(9)=t_0+\sigma(9)-1-\Delta_1=7$ $T(10)=t_0+\sigma(10)-1-\Delta_2=9$ 6.3.6 Explanation of the Result in Images The dates of injection T(u) being given in the time unit (i.e. the time span of the collector), this amounts visually to seeing the collector move by one span at each time unit. If we view an image of the system at each time unit, each load u appears for the first time on the collector at the date T(u) (its injection date).

The configuration of the collector at the instant 0 (cf. FIG. $2_1$) corresponds to the first real injection of a load, in this case the load 1 (because $t_1=0$), even if it is not always the case. It must be noted that indeed the first load of the sequence is not obligatorily the first load to be injected into the collector.

The load 2 must be injected at the instant 1, which means that it is on the collector after the movement by one step of the collector, as is shown by FIG. 22.

The load 3 is injected at the instant 2, as is shown by FIG. 23.

The loads 4 and 5 are injected at the date 3, as is shown by FIG. 24.

And so on and so forth.

7. PROGRESS OF THE BATCHES

The computation of the injection dates is done on a given state of the system. With the system developing in time, a first possibility consists in redoing this computation whenever a new load arrives at the system because it has does not yet have its definite injection date. However, instead of also regularly launching the computation algorithm, which is not advantageous for various reasons (in particular the consumption of computation resources), it is preferable to proceed by batches. This kind of batchwise operation is explained in this section.

7.1 Work Batch

We would like a flow (outgoing flow) that is continuous and optimal on the collector throughout a workday. We have just seen how to define an optimal injection date (in order to arrive at our goal) on the loads present in the lanes at a given fixed instant. This goal now needs to be attained for all the loads arriving by the injection flows at any given instant. We propose to call the injection date computation algorithm at the instant needed to obtain a fluid and continuous filling of the collector. To this end, in this section, we define the way to fill the FIFO lists of each lane for the configuration of the system at a fixed instant. Then, we define what a batch is and then finally explain this succession of the processing of two batches without leaving any vacant space on the collector.

7.1.1 Filling the FIFO Lists of the Lanes

In each lane, there is a list of loads with a unique sequence number for each load. These sequence numbers of the loads are obligatorily numbers that are rising by lane but not necessarily consecutive (due to the definition of the achievable sequence to be given).

FIG. 25 illustrates an example of a FIFO list associated with three lanes.

FIG. 26 illustrates the final achievable sequence, awaited on the collector.

It may be recalled that each lane corresponds to an injection flow represented as a FIFO column attached to the collector, with its injection point defined by a black dot on the diagrams.

The FIFO list of the loads taken into account in a lane for a fixed configuration of the system sets the order of the loads waiting at the injection point of this lane in accordance with the following conditions:

the loads taken into account during the analysis are waiting at the injection point (represented by a black dot in the following figures) (FIG. 27: first load of the flow attached to the injection point and therefore forming part of the FIFO list; FIG. 28: first load of the flow not attached to the injection point and therefore not forming part of the FIFO list);

the loads taken into account during the analysis are on "continuous" hold behind a first load forming part of the FIFO list (FIG. 29: second load on continuous hold behind a first load forming part of the FIFO list; FIG. 30: load on continuous hold behind a first load not forming part of the FIFO list).

7.1.2 Definition of Batches

A work batch corresponds to the set of loads of the FIFO list of all the lanes (it is the set L of n loads). However, these loads correspond to the static photograph of our system at a given instant, complying with the rules of the preceding paragraph. The loads present in the system at this instant, which do not comply with the rules of filling of FIFO lists, will be assigned later to another batch. Once the loads of the batch are all allotted, the injection dates for this batch are computed. The injection of these loads is done as and when the time passes, in complying with the injection dates computed beforehand. The system develops in the course of time, without again calling the injection date computation algorithm, although new loads are eligible under the rules of filling of the FIFO lists or even if new loads appear in the system.

All these injection dates are computed in order to succeed in placing each load of the batch at a reserved place on the conveyor, in complying with the order of the desired final sequence, while at the same time minimizing the vacant spaces. Let p designate the last place reserved for the last load of this batch given by the order of the sequence. After this place p, the collector is vacant. It is the time at which this last place p (which can be still vacant) passes below the first injection flow (first lane) that a new batch will be defined.

The following batch will be built in the same way, but on a new static photo of the system at this fixed instant (with, as its first unoccupied location, the span of the collector attached to this last place p).

It must be noted, in one particular implementation, that if a new batch is defined before the preceding batch has been entirely executed, the last loads of the exit sequence of the preceding batch can be considered for the new batch (following batch). In this case, if a load at the position i in the exit sequence is put back into the next batch, then so too are all the loads having positions greater than i). However, it is worthwhile to take up the loads again only if the desired final sequence has changed. In this case, the last place p considered will be the place of the last load not taken up in the next batch. For the loads that are taken up, the injection dates already defined in the preceding batch will be obsolete and replaced by dates of injection computed for the next batch.

In the example illustrated in FIG. 31, the first batch will be composed of the loads: 1, 2, 3, 4, 5, 6, 7, 8, 9. The following batch could be: xx, yy or 9, xx, yy, . . . , or again 7, 8, 9, xx, yy, . . . (but not 8, xx, yy, nor 7, 9, xx, yy).

7.2 Dynamic Processing of the Batches

The processing of each batch is done continuously and in series (batch1, batch2, etc.). The processing of a batch is a static computation of all the dates of injection of the loads composing this batch. The linking and the building of these batches provides a comprehensive solution to the problem of merging the incoming flows into one outgoing flow in the warehouses, which is a dynamic problem.

7.2.1 Computation of the Dates of Injection of a First Batch

FIG. 32 illustrates an example of a first batch for an exit sequence σ=(1,2,3,4,5,6,7,8,9,10), with the loads 2, 6, 7 and 8 (for which the injection dates are denoted as Time 4, Time 8, Time 9 and Time 10 respectively) on the lane $a_3$, the loads 1, 3 and 5 (for which the injection dates are denoted as Time 0, Time 2 and Time 4 respectively) on the lane $a_2$ and the loads 4 and 9 (for which the injection dates are denoted as Time 0 and Time 5 respectively) on the lane $a_1$.

7.2.2 Injection in Time of the Batch

So long as the time span of the collector awaiting the highest sequence number (in this case n° 9, surrounded by a circle in FIGS. 32 and 33) has not arrived in front of the injection lane that is furthest upstream (i.e. the lane $\alpha_1$), no processing of the next batch is done. The processing of the loads of the first batch continues as and when time passes, these loads being injected at the injection date computed beforehand as can be seen in the upper part and the lower part of FIG. 33.

7.2.3 Formation of the Next Batch and Static Computation of the Future Dates of its Injection When the last marked span of the last load of the sequence of the first batch arrives before the lane $\alpha_1$, it is the signal for building the next batch. This batch is constituted by all the valid loads of each FIFO list of each lane according to the rules explained further above.

FIG. 34 illustrates the formation of the next batch composed of six new loads that have appeared on the lanes and are numbered 1 to 6 (sequence numbers of the new exit sequence desired for the new batch).

The algorithm for computing the static injection dates is applied to this new batch in considering the unoccupied part of the collector (to the right of the place reserved for the load numbered 9 of the previous batch). The injection dates are computed as a function of a time scale, the origin of which corresponds to the first injection of a load of the new batch.

The configuration of the static system, taken at the "Time 5" as can be seen in FIG. 34, is given (as input data) to the algorithm. This configuration is defined as follows: k=3 lanes comprising six new loads that have appeared (belonging to the new batch). Each new load is identified by a unique sequence number as a function of the new exit sequence of this new batch: σ=(1,2,3,4,5,6). This is an achievable sequence. We know the time distances relative to the last lane: $\Delta_1=6, \Delta_2=3$ and $\Delta_3=0$.

The date 0 is fixed by simultaneous injection of two new loads numbered 1 and 4 (into the lanes $a_2$ and $a_1$ respectively). Since this origin of time, the algorithm gives a date of injection T(u) for each of the six new loads u of this new batch.

$L'=\{1,4\}$ and $t_0=\max\{\Delta_1+1-\sigma(4), \Delta_2+1-\sigma(1)\}=\max\{3,3\}=3$ $T(1)=t_0+\sigma(1)-1-\Delta_2=0$ $T(2)=t_0+\sigma(2)-1-\Delta_2=1$ $T(3)=t_0+\sigma(3)-1-\Delta_3=5$ $T(4)=t_0+\sigma(4)-1-\Delta_1=0$ $T(5)=t_0+\sigma(5)-1-\Delta_2=4$ $T(6)=t_0+\sigma(6)-1-\Delta_1=2$

7.2.4 Link Between the Injection Dates of a Batch and the Real Time that Elapses Each load of each batch will be given an injection date as a function of an origin of time that is well specified in relation to the static system. These injection dates must be placed at the right instant in the dynamic configuration to be consistent with the dynamic solution.

A time scale common to all the batches makes it possible to link the injections of all the loads into the dynamic system. The time unit of this time scale is the "time span" of the collector, as defined further above. Let "Time" be the time derived from this common time scale, with the time 0 representing the starting date of the operations in the system.

The injection dates given by the algorithm must be repositioned correctly in this common time scale. To this end, it is necessary to find the time-related correspondence, in the dynamic system, of the situation described at the date 0 of the batch. This means that it is necessary to obtain a correspondence between the date 0 of the batch and the Time of the common scale truly enabling the first injection of the load of this batch. It is then necessary to shift all the injection dates of this batch exactly this time.

To this end, it is necessary to know the Time (also called "Tb") at which the algorithm call has been launched and the (or at least one of the) first load or loads of the batch to be injected at the earliest on the collector, which shall be called $\sigma_*$. The date 0 of the batch corresponds to the action of injecting this load $\sigma_*=\alpha_i(j)$, and it is done really by the dynamic system exactly $\sigma(\sigma_*)+\Delta_{1,*}$ time spans after the call.

Returning to the present example, it is necessary to add to each injection date computed by the algorithm for the new batch (for all t u∈L,T(u)), the actual date (algorithm call date) in this case the Time 5 (i.e. Tb=5) plus the position of the first injected load of the new batch injected into the new sequence (in this case it is the load 1, hence we need to add σ(1)=1) plus the distance between the lane $\alpha_1$ and the one containing this first injected load (in this case $\Delta_{1,2}=3$). In noting that the load 4 of the new batch is also injected first into the collector (at the same time as the load 1 of the new batch), we could have chosen it and added $\sigma(4)+\Delta_{1,1}=4$; this really amounts to the same thing as adding $\sigma(1)+\Delta_{1,2}=1+3=4$.

For the dynamic application, we carry out a linear transformation of the injection time as follows:

$T(1)+5+4=0+5+4=9$ $T(2)+5+4=1+5+4=10$ $T(3)+5+4=5+5+4=14$ $T(4)+5+4=0+5+4=9$ $T(5)+5+4=4+5+4=13$ $T(6)+5+4=2+5+4=11$

In this case, the earliest date of the first load of the new sequence passing in front of $\alpha_k$ will be exactly $Tb+\sigma(u_*)+\Delta_1-\Delta_{i*}+t_0$, with $u_*=\alpha_{i*}(1)$ the first load of the new sequence to be injected into the collector (being not necessarily the first load of the new sequence). Now, we know that $t_0$ is a maximum attained exactly by this load $u_*$, giving $$t_0 = \max_{u=\alpha_i(j)\in L'}\{\Delta_i + 1 - \sigma(u)\} = \Delta_{i_*} + 1 - \sigma(u_*).$$

Thus, we know that the first load of the new sequence will pass in front of $\alpha_k$ at $Tb+\sigma(u_*)+\Delta_1-\Delta_{i*}+t_0=Tb+\sigma(u_*)+\Delta_1-\Delta_{i*}+\Delta_{i*}+1-\sigma(u^*)=Tb+1+\Delta_1$, in the common time scale.

An equivalent way of giving the injection times in the common time scale is, by definition, to give the algorithm $t_0=Tb+1+\Delta_1$, when we obtain knowledge of the system exactly at an instant $Tb=(u_{last})-\Delta_1+\Delta_{i^{last}}$, with $u_{last}=\alpha_{i^{last}}(j^{last})$ being the last load of the sequence of the preceding instant.

In the above example, the instant Tb=5 corresponds exactly to the condition and we could therefore have called the algorithm with $t_0=Tb+1+\Delta_1=5+1+6=12$ (rather than 3) and we could have directly had the injection times expressed in the common time scale.

Ultimately, our system can be represented as is shown by FIG. 35. In the common time scale:
the injection times of the loads 6, 7 and 8 of the preceding batch are denoted as Time 8, Time 9 and Time 10 respectively; and
the injection times of the loads 1, 2, 3, 4, 5 and 6 of the new batch are denoted as Time 9, Time 10, Time 14, Time 9, Time 13 and Time 11 respectively.

8. DETERMINING DATES OF INJECTION OF THE LOADS FOR A COLLECTOR PROCESSING ONE OR MORE DISTURBING FLOWS

We shall assume that there now exists at least one disturbing flow (of disturbing loads) already present in the collector. These disturbing loads are part of none of the injection flows (incoming flows). Therefore, they are not ordered in the desired exit sequence of the injection flows. These disturbing loads disturb the introduction of the payloads contained in the injection flows because they occupy places on the collector. It is necessary to take account of these obstructions which block the injection of the payloads from time to time. In addition, if these disturbing loads disappear from the collector between the injection lanes, that can create vacant spaces in the exit flow from the collector.

Our goal is always to comply with an exit sequence in maximizing the throughput of the collector and thus minimizing these vacant spaces.

To achieve this goal, we shall use non-valid lists of dates to be exploited with the modelling of the Job Shop seen further above.

The following table gives new notations needed for the part that follows (summary of notations for the disturbing flows).

The following table gives the new notations for the disturbing flows.

TABLE 3

| | |
|---|---|
| F | Disturbing flow |
| n' | Total number of disturbing loads |
| l (p) or $l_p$, $p \in F$ | Number of the last lane in front of which the disturbing load p passes |
| g (p) or $g_p$, $p \in F$ | Number of the first lane in front of which the disturbing load p passes |
| $U_i$, $i \in \{1, \ldots, k\}$ | List of prohibited dates for an injection of a payload injection by the lane $a_i$ |
| $\sigma'$ | Ordered list of disturbing loads |
| $\sigma'_p$ | The $p^{th}$ disturbing load of the disturbing flow |
| $\sigma'(u, v)$ | Duration between the disturbing load u and the disturbing load v in the disturbing flow, in number of "spans" at a given instant |
| $t_r$ | Date of arrival of the first disturbing load of the disturbing flow in front of the lane $a_1$, in the particular case where this load passes effectively in front of this lane (link with $\delta_p$) |
| $\delta_p$ | Distance between the disturbing load p and the last lane $a_k$ at the date 0 |
| $start_p$ | Date at which the disturbing load p is injected "fictitiously" before the lane $a_1$. (Fictitiously if $g_p > 1$ because in this case the load p will not pass before the lane $a_1$) |

8.1 Modelling of the System with a Non-Controlled Disturbing Flow

The disturbing loads of the disturbing flow block the injection of a payload into the collector when they pass in front of the injection lanes. It is therefore necessary to compute the non-valid dates not valid for an injection of a payload for each lane. We now seek to compute the new dates of injection of the payloads in taking account of the non-controlled disturbing flow (over which, by definition, we assume that we have no control whatsoever). We note that there can henceforth be unoccupied spaces in the exit flow, and we shall nevertheless seek the optimal minimizing of these unoccupied spaces.

8.1.1 Creation of the List of Non-Valid Dates

We can take account of a non-controlled disturbing flow, comprising disturbing loads that remain on the collector, thus passing in front of all the lanes and forming part of the final flow of the collector (mixed with the payloads of the injection flows). We can also take account of a non-controlled disturbing flow comprising disturbing loads present on the collector but disappearing between the injection lanes, thus creating unoccupied locations in front of certain lanes but not all of them. We can also take account of the case of a mixture of these types of non-controlled disturbing flows, as well as disturbing loads arriving and getting distributed between the lanes. Everything can be envisaged, and we can even take account of an unspecified obstruction on one or more spans of the collector (an obstruction being not obligatorily a disturbing load but being capable also of being a place of the collector that is damaged, reserved, etc.).

In any case, the idea is to take account of the disturbing loads and/or other obstructions to compute the dates not valid for an injection of a payload of a lane. The non-valid dates are obtained by computing the instants of passage of each obstruction (i.e. each disturbing load of the disturbing flow or any other obstruction) in front of this injection lane. Let $U_i$ denote the set of non-valid dates where the lane $a_i$ cannot inject a payload because of the disturbing loads and/or any unspecified obstructions of the time spans of the collector.

8.1.2 Idea of the Solution for Lanes that are Consecutively Well Distributed

This Job Shop scheduling problem, with a list of non-valid dates for each machine, can be resolved by following almost the same steps as those of the paragraph 6.2.1.

Here is the approach in the particular case of lanes well distributed by conveyor spans.

To begin with, assuming that the first load of the sequence comes from the lane $\alpha_i$, the operations $\{o_{1,i}, o_{1,\{i+1\}}, \ldots, o_{1,k}\}$ associated with this job begin at the dates $t, t+1, \ldots t+k-i$ starting from a date t which makes it possible to have dates $t, t+1, \ldots, t+k-i$ respectively on each machine $\{M_1, M_{\{i+1\}}, \ldots, M_k\}$ that are free (i.e. without obstruction).

Then, the operations of the job corresponding to the next load of the sequence will be scheduled first of all by executing the operation to be processed on the machine $M_k$. This operation $o_{u,k}$ will be scheduled just after (without idle time) the preceding operation programmed on $M_k$. In assuming that this operation starts at a new instant t (different from the instant t defined further above for the computations related to the first load) the operation on the machine $M_{\{k-1\}}$ (if it exists) is scheduled at the instant t−1, and so on and so forth, until all the operations are programmed. If an operation cannot be carried out at these indicated dates because of an obstruction, we shall start the scheduling of the (entire) job in shifting the instant t of execution of the operation to be processed on the machine $M_k$ of a time unit (i.e. a location, span or slot).

This procedure is applied iteratively to each of the following jobs of the given sequence.

The real dates of injection of the payloads on the collector are deduced directly from the start of the first operation of each job. The time unit used is the one defined further above.

NOTE: This method does not always give a flow without vacant spaces. The disturbing flow and/or the obstructions are non-controlled and we therefore maximize the throughput without ensuring maximality.

8.1.3 Idea of the Solution with a Non-Controlled Disturbing Flow in the General Case Based on the above paragraph, this is the approach followed in the general case to compute the real dates of injection during the merger of several flows comprising incoming flows (injection flows) and (at least) one non-controlled disturbing flow.

Let us consider that we can start by scheduling the jobs from the instant 0 onwards. It must not be forgotten that it is necessary to follow a particular sequential order in the execution of the operations of the machine $M_k$ while at the same time minimizing the idle time of this machine.

To begin with, let $t_0 (\geq 0)$ denote the earliest date at which the job associated with the first load of the sequence can be assigned to the machine $M_k$, if it did not have a disturbing flow. Let the loads be scheduled in the order given by the desired sequence without taking account of the disturbing flow, and then the date of injection is modified in following this order. Indeed, it can be noted that the scheduling of a load $\sigma_c$ has an impact solely on the loads $\sigma_{c'}$ such that $c'>c$.

For the job associated with the load u, let us first schedule its operation to be processed on the machine $M_k$. This operation $o_{u,k}$ will be scheduled at $t_0$ if it is the load $\sigma_1$, else just after (without idle time) the preceding operation programmed on $M_k$. Assuming that this operation on $M_k$ starts at the instant t, the operation on the machine $M_{\{k-1\}}$ (if it exists) is scheduled at the instant $t-\Delta_{k-1}$. Then the operation on the machine $M_{\{k-2\}}$ (if it exists) is scheduled at the instant $t-\Delta_{k-2}$, and so on and so forth until all the operations are programmed. If an operation cannot be carried out at these dates indicated during an obstruction, we shall restart the scheduling of the (entire) job in shifting the instant t of execution of the operation to be processed on the machine $M_k$ by a time unit (i.e. by one location, span or slot).

This procedure is applied iteratively on each of the following jobs of the given sequence.

It is necessary, if need be, to shift the date 0 and the date $t_0$ to make them correspond to their definition. Since the shifting of the date 0 must correspond to the first possible injection of loads on the collector, it has repercussions on all the schedules (injection dates) which will be shifted in their turn.

The real dates of injection of the payloads into the collector are deduced directly from the start of the first operation of each job. The time unit used is the one defined further above.

NOTE: The presence of non-controlled disturbing flows does not always enable a flow without vacant space on the collector. With this method, we maximize the throughput of the collector without guarantee of maximality.

8.1.4 Algorithm in the General Case

The algorithm 3 here below computes the dates of injection of the payloads in taking account of the disturbing flow that takes the form of the dates of prohibition of injection by lane.

The date 0 corresponds to the first load injected into the collector at the earliest. The date $t_0$ is always the date at which the first load of the sequence passes in front of the lane $a_k$. The general formula for $$i = 1 \ldots k : t_0 = \max_{u = a_i(j) \in L', j \leq h_i} \{\Delta_i + 1 - \sigma(u)\}$$

remains valid if there is no conflict with the disturbing flow during the injection of the first load of the sequence.

The algorithm 3 gives the date of injection of each load in taking account of the disturbing flow and in correcting the date $t_0$ if necessary. The disturbing flow is taken into account by preliminary computation of the set $U_i$, $i=1 \ldots k$ giving the dates of passage of each disturbing load of this disturbing flow in front of the lane $\alpha_i$. These dates are therefore prohibited dates of injection (also called dates not valid for a payload injection).

In this algorithm, we use the simplified notation "$u=\sigma_c=\alpha_i(j)\in L$" to define a load u corresponding to the $c^{th}$ load of the sequence $\sigma$, also defined by its position j in the lane $\alpha_i$.

---

Algorithm 3: Computation of dates of injection with non-controlled disturbing flows

---

Require: $\sigma$, $\Delta_i$, $U_i$, $i \in \{1, \ldots, k\}$//Give the values $U_i$, computation to be made case by case $t_0 = \max_{u=a_i(j) \in L'} \{\Delta_i + 1 - \sigma(u)\}$//Theoretical computation of $t_0$ last = $t_0$//Theoretical date of passage of $\sigma_1$ in front of the lane $a_k$
for c = 1 to n do
set u = $a_i(j)$ = $\sigma_c$
  do {//Scheduling of the load $\sigma_c$ in avoiding all obstructions
    check = true
    for all z = k to z = i, z - - do
      if(last - $\Delta_z \in U_z$) then check = false;
    end for
    if(check = false) then {
      last = last + 1;
      if(c = 1) then $t_0 = t_0 + 1$;//$t_0$ is modified if disturbance
    }end if
  }while (check = false);
  T(u) = last - $\Delta_i$//Final date of injection for the load $\sigma_c$
  last = last + 1//Theoretical date of passage of $\sigma_{c+1}$ in front of the lane $a_k$
end for
//Possible shifting of the date 0
set $t_{min}$ to min{T(u), $\forall u \in L$}
if($t_{min}$ != 0) then
    $t_0 = t_0 - t_{min}$
  for u $\in$ L do
    T(u) = T(u) - $t_{min}$
  end for
end
return $t_0$, T(u), $\forall u \in L$ FIG. 36 is a graph of the algorithm 3 here above.

FIG. 47 presents a flowchart of a method for merging k incoming flows into one outgoing flow according to a second particular embodiment based on the algorithm 3 (illustrated in FIG. 36). The method is executed at least once by the control system. A given execution is performed at an instant Tb and comprises the following steps:

obtaining (step 471) a set L comprising n payloads distributed at the instant Tb on the k lanes and having to be injected into the collector to form an exit sequence σ, each of the n payloads being identified by a single sequence number within the exit sequence σ, each of the k lanes containing an ordered set, according to a rising order of sequence numbers, of $h_i$ payloads having to be injected one by one into the collector;

for each lane $a_i$, i∈{1, . . . , k}, obtaining (step 472) a set $U_i$ of dates not valid for an injection of one of the payloads of the lane $a_i$ on the collector because of a non-controlled disturbing load or another obstruction of a time span of the collector;

in not taking account of the sets $U_1$, i∈{1, . . . , k}, computing (step 473) a date $t_0$ at which the first payload $σ_1$ of the exit sequence σ passes in front of the lane $a_k$;

for the first payload $σ_1$ of the exit sequence σ, in assuming that the first payload $σ_1$ comes from the lane $a_j$ (step 474):

a) initializing t with $t_0$;

b) if none of the dates t, $t-\Delta_{k-1}$, $t-\Delta_{k-2}$, . . . , $t-\Delta_i$ belongs respectively to the sets $U_k$, $U_{k-1}$, $U_{k-2}$, . . . , $U_i$, computing a date of injection of the first payload $σ_1$ into the collector with the following formula: $T(u)=t-\Delta_i$, with $u=σ_1=α_i(j)$;

c) if one of the dates t, $t-\Delta_{k-1}$, $t-\Delta_{k-2}$, . . . , $t-\Delta_i$ belongs respectively to one of the sets $U_k$, $U_{k-1}$, $U_{k-2}$, . . . , $U_i$, incrementing t by one unit and reiterating the steps b) and c) with the new value of t;

for each following payload a of the exit sequence σ, c∈{2, . . . , n}, in assuming that the following $σ_c$ comes from the lane $a_i$ (step 475):

a') incrementing t by one unit, with t being used to compute the date of injection of the preceding payload $σ_{c-1}$;

b') if none of the dates t, $t-\Delta_{k-1}$, $t-\Delta_{k-2}$, . . . , $t-\Delta_i$ belongs respectively to the sets $U_k$, $U_{k-1}$, $U_{k-2}$, . . . , $U_i$, computing a date of injection of the following payload $σ_c$ on the collector with the following formula: $T(u)=t-\Delta_i$, with $u=σ_c=α_i(i)$;

c') if one of the dates t, $t-\Delta_{k-1}$, $t-\Delta_{k-2}$, . . . , $t-\Delta_i$ belongs respectively to one of the sets $U_k$, $U_{k-1}$, $U_{k-2}$, . . . , $U_i$, incrementing t by one unit and reiterating the steps b') and c') with the new value of t;

computing (476) de $t_{min}$ according to the following formula: $t_{min}=\min\{T(u), \forall u \in L\}$;

if $t_{min}>0$, modification (477) of the n dates of injection according to the following formula: $T(u)=T(u)-t_{min}$, $\forall u \in L$;

commanding (step 478) the collector and of the k lanes for an injection of the n payloads on the collector in compliance with the n injection dates $T(u), \forall u \in L$ 8.1.5 Description of One Particular Embodiment Let us look at a non-controlled disturbing flow already present on the collector, not taken into account by the desired sequence finally because the disturbing loads will all disappear before the last injection lane. This is the case for example in the context of FIG. 50 (PTS Intel's GTP automated system) with the management of the injection into the collector of the payloads coming from the automated system (PTS) but also that of the return of loads that arrive at this collector in order to return into the automated system (PTS) (see paragraph 2.2 in the context of this possible application).

FIG. 37 illustrates this configuration with the disturbing loads (marked by a cross) of the return flow (constituting the non-controlled disturbing flow) that returns to the automated system (PTS). According to this configuration, we make two observations:

no disturbing load of the return flow (and therefore of the disturbing flow) will pass in front of the last lane; and the disturbing loads leaving the collector (towards the automated system (PTS)) before the lane $α_1$ pose no problem and will therefore not be studied. All the remaining loads will pass necessarily in front of the lane $α_1$.

8.1.5.1 Computation of the Lists of Non-Valid Dates Induced by the Flow of Disturbing Loads Let us take a flow F of n' disturbing loads already present in the collector and to exit the collector between the injection lanes. This disturbing flow, called a return flow, corresponds to the loads that have to return to stock in the automated system (PTS). These disturbing loads must indeed pass in front of one or more injection lanes. For each disturbing load p of this return flow (disturbing flow), $g_p$ (and $l_p$ respectively) denote the number of the first lane (and the last lane respectively) in front of which the disturbing load p passes. We shall see two methods enabling the computation of the non-valid injection dates ($U_i$), induced by the return flow as a function of the known data.

In this particular embodiment, $g_p=1$ and $l_p<k$, for every load p of the return flow specific to the automated system (PTS). We shall give however the general solution with the notations $g_p$ and $l_p$.

Either, in the above-mentioned specific case of a return flow, we know the date of arrival (denoted $t_r$) of the first disturbing load of the return flow (disturbing flow) in front of the lane numbered $α_1$ (or again the machine $M_1$). We also know the order in which the disturbing loads of this return flow are distributed on the collector (let us call this sequence σ') and the duration between each disturbing load and another disturbing load of this disturbing flow. Let $σ'_p$ give the $p^{th}$ disturbing load of the return flow and σ'(u,v) give the duration between the disturbing load u and the disturbing load v in the disturbing flow in number of "spans".

Then, the instants $t_r$, $t_r+σ'(σ'_1,σ'_2)$, . . . , $t_r+σ'(σ'_1,σ'_{n'})$ are congested for the machine $M_1$ and form $U_1$.

For the machine $M_i$, i=2, . . . , k, the congested dates are the $U_i=\{t_r+σ'(σ'_1,σ'_j)+\Delta_{i,1}$ if $l(σ'_j) \geq i$, $\forall j=1, \ldots, n'\}$.

Another way of seeing things would be to copy the "congested" (or non-valid) dates $U_i$ of the machine $M_i$ of the disturbing loads u which are $l(u) \geq i+1$ and add to all these instants $\Delta_{i,i+1}$ to obtain the list of congested dates $U_{i+1}$ for the machine $M_{i+1}$.

Or, in a more general framework, we know the distance of each disturbing load p relative to the last lane $\alpha_k$ of the date 0 which we shall denote $\delta_p$. With these data, we compute the values $U_i$ as follows:

```
For all i ∈ {1, . . . , k} do U_i = ∅;
For all p ∈ F do
    For all i ∈ {g_p, . . . , l_p} do
        U_i = U_i ∪ {δ_p − Δ_i};
    end for
end for
return U_i, ∀i = 1 . . . k
```

8.1.5.2 Examples

Let us return to the configuration of the example of paragraph 6.2.2.

Let us take k=4 lanes comprising two or three payloads. Each payload is identified by a unique sequence number as a function of the exit sequence $\sigma=(1,2,3,4,5,6,7,8,9)$. This is an achievable sequence. We know the distances from each lane to the last one: $\Delta_1=12$, $\Delta_2=7$, $\Delta_3=4$ and $\Delta_4=0$.

As illustrated in FIG. 38, it is assumed that this time there are three time spans of the collector obstructed by disturbing loads A, B and C. We know that these disturbing loads pass in front of certain lanes and disappear from the collector thereafter. The loads A and B pass in front of the lanes $a_1$ and $a_2$. Finally, the load C passes in front of all the lanes $a_1$, $a_2$ and $a_3$. Thus, we have $l_A=2$, $l_B=2$ and $l_C=3$, as well as $g_A=g_B=g_C=1$.

We show a state of the system at the date 0, when the first payload of the batch will be injected into the first unoccupied place of the collector. In the diagram, an unoccupied position of the collector is vacant, and the crosses indicate the positions taken by the payloads of the preceding batch and the letters denote the disturbing loads of the disturbing flow. The position of the disturbing flow at the date 0 enables us to deduce the following pieces of information: $\delta_A=13$, $\delta_B=14$ and $\delta_C=18$.

The disturbing load B obliges the payload 4 to shift in time by one position and will leave a vacant space in the final flow of the collector. Then, the disturbing flow C obliges the payload 7 to shift by yet another position, leaving a vacant space later in the final flow of the collector.

FIG. 39 is a Gantt chart illustrating the solution proposed in this case. We can see that if the disturbing flow were to be controlled (and not non-controlled), the first vacant space could be filled by the lane $\alpha_3$ or $\alpha_4$ and the second vacant space solely by the lane $\alpha_4$. Thus, vacant spaces would be avoided, and the throughput of the final flow (outgoing flow) from the collector would be increased.

8.2 Modelling of the System with a Controlled Disturbing Flow

We have seen that when the disturbing flow was non-controlled, it gave rise to vacant spaces in the final flow of the collector. It is therefore worthwhile to control the disturbing flow to avoid these vacant spaces. We could thus prioritize the loads of the injection flows over the loads of the disturbing flows and be able to make the disturbing flows pass into the unoccupied or free spaces left by the injection of the different lanes.

8.2.1 Formulation of the Problem

We now assume that we can control the disturbing flow. This amounts to achieving mastery over the injection of the disturbing loads of a disturbing flow, and we must decide the date (denoted as $start_p$) at which the disturbing load p is injected before the lane $a_1$ so as not to disturb the outgoing flow (outgoing flow formed by the merger of the injection flows), i.e. in not creating any vacant space in the exit flow.

8.2.2 Idea of the Solution Algorithm

We shall first compute the dates of injection of the payloads coming from the lanes, as if they were no disturbing flows (cf. Section 6). It is these injection dates that we shall give as the dates unavailable ($U_i$) for a disturbing load passing in front of a lane ($\alpha_i$). Then, taking account of the list of non-valid dates, we shall compute the injection of the loads of the disturbing flow. To this end, in the order of arrival of the disturbing loads, we schedule each of their passages in front of the lanes at the earliest time, i.e. as soon as these dates of passage into the respective machines fall on free dates.

8.2.3 General Algorithm

The algorithm 4 described in detail here below gives the injection dates of the payloads as well as the control of the disturbing flow. The loads to be injected constitute the final flow of the collector. Their injection is decided without taking account of the disturbing flow. Then, we shall determine when to let through the loads of the disturbing flow in considering this time that the injected payloads play the same role as the non-controlled flow in the algorithm 3 here above. Thus, we can use the same technique as here above with the computation of the sets $V_i$, i=1 . . . k giving the dates of passage of each payload of the injected flow in front of the lane $\alpha_r$. These dates are therefore injection dates prohibited for the disturbing loads.

It may be recalled that $\sigma'_{p,p'}$ gives the distance between the disturbing loads p and p' at the date 0 and $t_r$ gives the date, without waiting, of arrival of the 1$^{st}$ load of the disturbing flow in front of the lane number $a_1$.

In this algorithm, we use the simplified notation "$u=\sigma_c=\alpha_i(j)\in L$" to define a load u corresponding to the c$^{th}$ load of the sequence $\sigma$, also defined by its position j in the lane $\alpha_i$.

Algorithm 4: Computation of dates of injection of the
loads of the controlled disturbing flows

```
Require: σ, Δ_i, Δ_1i, i ∈ {1, . . . , k} t_0 = max   {Δ_i + 1 − σ(u)}//Theoretical computation of t_0
     u=a_i(j)∈L' for all i ∈ {1, . . . , k} do
    for all j ∈ {1, . . . , h_i} do
    set u = a_i(j)
    T(u) = t_0 + σ(u) − 1 − Δ_i
        for all z ∈ {i, . . . , k}do
            V_z = V_z ∪ {T(u) + Δ_i − Δ_z}
        end for
    end for
end for
set t = δ_1 − Δ_1//Arrival of the first disturbing load in front of a_1
for all p = 1 to f do//Load identified by their place in σ_f
    do {
        check = true
        for i = g_p to l_p do
            if(t + Δ_1 − Δ_i ∈ V_i) then check = false; t + +; break;
        end for
    }while (check = false);
    start_p = t
    t = Max (t + 1, δ_{p+1} − Δ_1)//Possible wait for arrival of p + 1
end for
return T(u), start_p, ∀u ∈ L, ∀p ∈ F
```

FIG. 40 is a diagram of the algorithm 4 here above.

FIG. 48 presents a flowchart of a method for merging k incoming flows into one outgoing flow, according to a third particular embodiment based on the algorithm 4 (illustrated in FIG. 40). The method is executed at least once by the driving system. A given execution is performed at an instant Tb and comprises the following steps:

for each payload $u=a_i(j) \in L$ coming from a lane $a_i$, computing (step 481) the dates of passage of the payload in front of the lanes $a_i$ to $a_k$, the date of injection T(u) of the payload into the collector being known;

for each lane $a_i$, $i \in \{1, \ldots, k\}$, obtaining (step 482) a set $V_i$, containing each date of passage of one of the payloads in front of the lane $a_i$;

for each controlled disturbing load p of a disturbing flow controlled by means of a control means situated along the collector and having a lane $a_{g(p)}$ in the sense of movement of the collector, with $g(p) \in \{1, \ldots, k\}$, $a_{g(p)}$ being also the first lane, in the sense of movement of the collector, before which the controlled disturbing load passes (step 483):

a) initializing t with the date $\delta_1 - \Delta_1$, with $\delta_1$ representing the possible date of arrival should the first controlled disturbing load not be put on hold before the lane $a_k$;

b) computing the dates $t + \Delta_{1,g(p)}$, $t + \Delta_{1,g(p)+1}$, ..., $t + \Delta_{1,l(p)}$ of passage of the controlled disturbing load in front of the lanes $a_{g(p)}$ to $a_{l(p)}$, with $a_{l(p)}$ being the last lane in the sense of movement of the collector, before which the controlled disturbing load passes;

c) if none of the dates $t + \Delta_{1,g(p)}$, $t + \Delta_{1,g(p)+1}$, ..., $t + \Delta_{1,l(p)}$ belongs respectively to the sets $V_{g(p)}$, $V_{g(p)+1}$, ..., $V_{l(p)}$, computing a fictitious date of passage $\text{start}_p$ of the controlled disturbing load p in front of the lane $a_1$, with the following formula: start=t;

d) if one of the dates $t + \Delta_{1,g(p)}$, $t + \Delta_{1,g(p)+1}$, ..., $t + \Delta_{1,l(p)}$ belongs respectively to one of the sets $V_{g(p)}$, $V_{g(p)+1}$, ..., $V_{l(p)}$, incrementing t by one unit and reiterating the steps b), c) and d) with the new value of t;

commanding (step 484) the control means for an injection on the date $\text{start}_p + \Delta_{1,g(p)}$ of each controlled disturbing load p before the lane $a_{g(p)}$.

8.2.4 Description of One Particular Embodiment

Let us take the example common to all the previous cases to be able to compare the final solutions. Let k=4 lanes comprising two or three loads. Each load is identified by a single sequence number as a function of the exit sequence $\sigma=(1,2,3,4,5,6,7,8,9)$. This is an achievable sequence. We know the distances from each lane to the last one: $\Delta_1=12, \ldots, \Delta_2=7, \Delta_3=4$ and $\Delta_4=0$. The disturbing flow is composed of the loads A, B, C such that $1_A=2$, $1_B=2$, $1_C=3$, $g_A=g_B=g_C=1, \delta_A=13, \delta_B=14$ and $\delta_C=18$.

This time, the disturbing flow is controllable. We can see in FIG. 41 the control point of this disturbing flow, represented by a vertical rectangle just before the lane $a_1$.

FIG. 42 is an illustration, in the form of a Gantt chart, of the solution without taking account of the disturbing flow ("pure injection solution").

The solution of the algorithm taking account of the disturbing flow amounts to sliding the disturbing loads into the grey boxes, left empty by the pure injection solution. The load A is allowed to pass as soon as it arrives at the control point of the disturbing flow while the load B is retained for one time unit. This wait enables the disturbing load B to be made to pass into the free spaces of the injections, just before the load 5 is injected. This is also the case with the load C and the load 8 of the sequence. FIG. 43 is an illustration, in the form of a Gantt chart, of the solution proposed to control the disturbing flow (i.e. by choosing the placing of the disturbing loads). The loads B and C no longer form a vacant space in the final flow of the collector. They have been interposed at strategic places so that the vacant space that they leave initially is then filled by an injection of a time-compatible load. Through the control of the disturbing flow, we have shown that the vacant spaces on the collector are avoidable.

8.3 Modelling the System with a Non-Controlled Disturbing Flow and a Controlled Disturbing Flow Should there be at the same time at least one non-controlled disturbing flow and at least one controlled disturbing flow, we proceed thus.

We differentiate the non-controlled disturbing loads from the controlled disturbing loads as follows:

Let S be the set of s non-controlled disturbing loads to be allowed obligatorily to pass without control into the injection zone of the lanes of the collector, each being identified by a unique sequence number corresponding to its position in the order of arrival (denoted as $\sigma'_s$).

Let $\delta'_p$ designate the distance between each disturbing load $p \in S$ and the last lane $\alpha_k$ at the date Tb and let $g'_p$ and $l'_p$ respectively designate the number of the first and last lane in front of which the disturbing load p must pass.

Finally, the sets $U_i$, $i=1 \ldots k$, give the dates of unavailability of passage in front of the lane $\alpha_i$ for the payloads.

Let F designate the set of f disturbing loads to be allowed to pass under control into the injection zone of the lanes of the collector, each being identified by a unique sequence number corresponding to its position in the order of arrival (denoted as $\sigma_f$).

Let $\delta_p$ designate the distance from each disturbing load $p \in F$ to the last lane $\alpha_k$ at the date Tb and let $g_p$ and $l_p$ respectively denote the number of the first and last lane in front of which the disturbing load p must pass.

Finally, the sets $V_i$, $i=1 \ldots k$, give the dates of unavailability of passage in front of the lane $\alpha_i$ for these controlled disturbing loads.

The algorithm 5 provides a detailed view here below of the dates of injection of the payloads as well as the control of the disturbing flow, in taking account of the non-controlled disturbing flow.

Algorithm 5: Computation of the injection dates of the payloads and the loads of the controlled disturbing flow with the non-controlled disturbing flow being taken into account:

Require: F, S, $\sigma$, $\Delta_i$, $\Delta_{1i}$, $a_i(j)$, $\forall i \in \{1, \ldots, k\}$, $\forall j \in \{1, \ldots, h_i\}$ $$t_0 = \max_{u=a_i(j) \in L'} \{\Delta_i + 1 - \sigma(u)\} \text{//Theoretical computation of } t_0$$

//Compute values $U_i$:
   for all p = 1 to s do
      for all i ∈ {$g_p'$, ..., $l_p'$} do
         $U_i = U_i \cup \{\delta_p' - \Delta_i\}$//Load p in front of $a_i$
      end for
   end for
//Compute values T(u)
   last = $t_0$//Theoretical date of the passage of $\sigma_1$ in front of the lane $a_k$
   for u = 1 to n do
      set u = $a_i(j)$
      do {//Scheduling of the $u^{th}$ load of $\sigma$
         check = true
         for all z = k à z = i, z - - do
            if (last - $\Delta_z \in U_z$) then check = false;
         end for
         if (check = false) then {
            last = last + 1;
            if (u = 1) then $t_0 = t_0 + 1$;
         }end if
      }while (check = false);

-continued

Algorithm 5: Computation of the injection dates of the payloads and the loads of the controlled disturbing flow with the non-controlled disturbing flow being taken into account:

```
T(u) = last - Δ_i//Final date of injection for the load u
    last = last + 1//Following place before a_k
end for
//Possible shifting of the date 0
set t_min to min {T(u), ∀u ∈ L}
if (t_min! = 0) then
        t_0 = t_0 - t_min
        for u ∈ L do
            T(u) = T(u) - t_min
        end for
endif
//compute values V_z:
    for u = 1 to n do
        set u = a_i(j)
        for all z ∈ {i, ..., k} do
                V_z = V_z ∪ {T(u) + Δ_i - Δ_z}
            end for
    end for
    for all z ∈ {1, ..., k} do
                V_z = V_z ∪ U_z
    end for
//compute values start_p:
    set t = δ_1 - Δ_1//Arrival of the first disturbing load in front of a_1
    for all p = 1 to f do//Load identified by its place in σ_f
        do {
            check = true
            for i = g_p to l_p do
                if(t + Δ_1 - Δ_i ∈ V_i) then check = false; t + +; break;
                end for
            }while (check = false);
            start_p = t
            t = Max (t + 1, δ_{p+1} - Δ_1)//Possible wait for the arrival of p + 1
        end for
    return t_0, T(u), ∀u ∈ L, start_p, ∀p ∈ F
```

FIG. 45 is a diagram of the algorithm 5 here above.

FIG. 49 is a flowchart of a method for merging k incoming flows into one outgoing flow, according to a fourth particular embodiment based on the algorithm 5 (illustrated in FIG. 45). The method is executed at least once by the control system. A given execution is performed at an instant Tb and comprises the following steps:

for each payload $u=\alpha_i(j) \in L$ coming from a lane $a_i$, computing (step 491) the dates of passage of the payload in front of the lanes $a_i$ to $a_k$, the injection date T(u) of the payload into the collector being known;

for each lane $a_i$, $i \in \{1, \ldots, k\}$, obtaining (step 492) a set $V_i$, containing on the one hand each date of passage of one of the payloads in front of the lane $a_i$ and on the other hand the set $U_i$ of dates not valid for an injection of one of the payloads of the lane $a_i$ into the collector;

for each controlled disturbing load p of a disturbing flow controlled through a control means situated along the collector and before a lane $a_{g(p)}$ in the sense of movement of the collector, with $g(p) \in \{1, \ldots, k\}$, $a_{g(p)}$ being also the first lane in the sense of movement of the collector, before which the controlled disturbing load passes (step 493):

a) initializing t with the date $\delta_1 - \Delta_1$, with $\delta_1$ representing the possible date of arrival should the first controlled disturbing load in front of the lane $a_k$ not be put on hold;

b) computing the dates $t+\Delta_{1,g(p)}$, $t+\Delta_{1,g(p)+1}$, ..., $t+\Delta_{1,l(p)}$ of passage of the controlled disturbing load in front of the lanes $a_{g(p)}$ to $a_{l(p)}$, with $a_{l(p)}$ being the last lane, in the sense of movement of the collector, before which the controlled disturbing load passes;

c) if none of the dates $t+\Delta_{1,g(p)}$, $t+\Delta_{1,g(p)+1}$, ..., $t+\Delta_{1,l(p)}$ belongs respectively to the sets $V_{g(p)}$, $V_{g(p)+1}$, ..., $V_{l(p)}$, computing a fictitious date of passage $start_p$ of the controlled disturbing load p in front of the lane $a_1$, with the following formula: $start_p = t$;

d) if one of the dates $t+\Delta_{1,g(p)}$, $t+\Delta_{1,g(p)+1}$, ..., $t+\Delta_{1,l(p)}$ belongs respectively to one of the sets $V_{g(p)}$, $V_{g(p)+1}$, ..., $V_{l(p)}$, incrementing t by one unit and reiterating the steps b), c) and d) with the new value of t;

commanding (step 494) the control means for an injection at the date $start_p + \Delta_{1,g(p)}$ of each controlled disturbing load p before the lane $a_{g(p)}$.

9. CONCLUSION

Since the travel time is critically important to obtaining the highest possible production rate, it is very important, in logistics, to being capable of combining several incoming flows. Using all the mechanical capacities of each system and therefore maximizing the throughput of such a collector is crucial in avoiding loss of time in customer order picking for example.

We have attained the optimal throughput by injecting the loads at the earliest in a synchronized manner. We have especially attained the maximum capacities of the collector when it is dedicated to the injection flows. In addition to the modelling and mathematical resolution, we have extracted a formula enabling the direct computation of the dates of injection of each load. These results are given to comply with a final exit sequence of the loads once they are all on the collector, thus making it possible to combine the optimization of a speed and of a sorting operation.

We have also discussed the management of several types of flows on the collector, in using the term "disturbing flow" to denote a flow different from the injection flow. We are able to compute the dates of injection using an algorithm that takes account of this disturbing flow when it is non-controlled. However, the throughput is optimal without guarantee of maximality. Indeed, such a non-controlled disturbing flow does not make it possible to recover a space left by a disturbing flow that would have gone out of the collector between the injection lanes.

We have also proposed a solution in which the disturbing flow is controlled. Another algorithm has been given to make the controlled disturbing flow pass in such a way as to prioritize the maximum throughput of the collector once all the injection lanes have passed. The control of this controlled disturbing flow enables a maximum throughput of the injection flows once on the collector when all the loads of the controlled disturbing flow disappear before the last injection lane. If not, the remaining disturbing flows are included in the final flow of the collector and inserted into the sequence without spaces.

An algorithm has also been given to manage at least one non-controlled flow (obstructions that are not obligatorily disturbing loads) and, at the same time, at least one controlled flow (disturbing loads).

10. EXAMPLE OF A CONTROL SYSTEM

The proposed solution is a method of merging, within a logistical warehouse, k incoming flows of payloads, transported respectively by k conveyors called lanes $\alpha_i$ with $i \in \{1, \ldots, k\}$, into one outgoing flow of payloads transported by another conveyor called a collector.

The method of merger is executed by a control system. This is for example a central warehouse control system or WCS.

FIG. 44 presents the structure of the control system 90 according to one particular embodiment of the invention. This control system comprises a live memory 92 (for example a RAM), a processing unit 91 equipped for example with a processor and controlled by a computer program 930 stored in a read-only memory 93 (for example a ROM or a hard disk drive).

At initialization, the code instructions of the computer program are for example loaded into the live memory 92 and then executed by the processor of the processing unit 91, to implement the method of merger of the invention (according to any one of the different embodiments described here above). The processing unit 91 inputs pieces of information 94 pertaining to the incoming flows. The processor of the processing unit 91 processes the information 94 and generates at exit instructions or commands 95 used to control (command) different elements included in the system, especially the lanes, the collector, the control means, etc.

This FIG. 44 illustrates only one particular way, among several possible ways, of carrying out the technique of the invention in any one of its embodiments. Indeed, the control system is obtained equally well on a reprogrammable computing machine (for example a PC computer, a DSP processor, a microcontroller, etc.) executing a program comprising a sequence of instructions, or on a dedicated computing machine (for example a set of logic gates such as an FPGA or an ASIC or any other hardware module).

Should the control system be carried out with a reprogrammable computing machine, the corresponding program (i.e. the sequence of instructions) can be stored in a storage medium that it detachable (such as for example a floppy disk, a CD-ROM or a DVD-ROM) or non-detachable, this storage medium being partially or totally readable by a computer or a processor.

The invention claimed is:

1. A method for merging, within a logistical warehouse, k incoming flows of payloads, transported respectively by k conveyors called lanes $\alpha_i$ with $i \in \{1, \ldots, k\}$, into one outgoing flow of payloads transported by another conveyor called a collector:

the logistical warehouse being such that
the k lanes are of a "first-in-first-out" type, distributed along the collector and numbered $a_1$ to $a_k$ in one sense of movement of the collector, and
$\Delta_i$ is a time-related distance between the lanes $a_i$ and $a_k$ expressed in time units corresponding each to one time span of the collector,
the method being executed at least once by a control system, a given execution being performed at an instant Tb and comprising:
obtaining a set L comprising n payloads distributed at the instant Tb on the k lanes and having to be injected into the collector to form an exit sequence $\sigma$, each of the n payloads being identified by a single sequence number within the exit sequence $\sigma$, each of the k lanes containing an ordered set, ordered in a rising order of sequence numbers, of $h_i$, payloads having to be injected one by one into the collector;
computing a date $t_0$ at which the first payload $\sigma_1$ of the sequence passes in front of the lane $a_k$;
computing a date of injection into the collector of each of the n payloads of the set L according to the following formula: $T(u) = t_0 + \sigma(u) - 1 - \Delta_i$, with:

$u = \alpha_i(j) \in L$, a payload of the set L and coming from the $j^{th}$ position in the lane $a_i$, $i \in \{1, \ldots, k\}$, $j \in \{1, \ldots, h_i\}$,
$\sigma(u)$ is the sequence number of the payload u in the exit sequence $\sigma$;
commanding the collector and the k lanes, for an injection of the n payloads into the collector in compliance with the n injection dates $T(u)$, $\forall u \in L$.

2. The method according to claim 1, wherein $\Delta_{i,i'}$ is a time-related distance between the lanes $a_i$, and $a_{i'}$, expressed in time units each corresponding to a time span of the collector, and further comprising:
for each payload $u = \alpha_i(j) \in L$ coming from a lane $a_i$, computing the dates of passage of the payload in front of the lanes $a_i$ to $a_k$, the date of injection $T(u)$ of the payload into the collector being known;
for each lane $a_i$, $i \in \{1, \ldots, k\}$, obtaining a set $V_i$ each containing a date of passage of one of the payloads in front of the lane $a_i$;
for each controlled disturbing payload p of a disturbing flow controlled by a controller situated along the collector and before a lane $a_{g(p)}$ in the sense of movement of the collector, with $g(p) \in \{1, \ldots, k\}$, $a_{g(p)}$ being also the first lane, in the sense of movement of the collector, in front of which the controlled disturbing load passes:
a) initializing t with the date $\delta_1 - \Delta_1$, with $\delta_1$ representing the possible date of arrival of the first controlled disturbing load in front of the lane $a_k$ if this load is not put on hold;
b) computing the dates $t + \Delta_{1,g(p)}$, $t + \Delta_{1,g(p)+1}$, ..., $t + \Delta_{1,l(p)}$ of passage of the controlled disturbing load in front of the lanes $a_{g(p)}$ to $a_{l(p)}$, with $a_{l(p)}$ being the last lane, in the sense of the movement of the collector, in front of which the controlled disturbing load passes;
c) if none of the dates $t + \Delta_{1,g(p)}$, $t + \Delta_{1,g(p)+1}$, ..., $t + \alpha_{1,l(p)}$ belongs respectively to the sets $V_{g(p)}$, $V_{g(p)+1}$, ..., $V_{l(p)}$, computing a fictitious date of passage $start_p$ of the controlled disturbing load p in front of the lane $a_1$, with the following formula: $start_p = t$;
d) if one of the dates $t + \Delta_{1,g(p)}$, $t + \Delta_{1,g(p)+1}$, ..., $t + \Delta_{1,l(p)}$ belongs respectively to one of the sets $V_{g(p)}$, $V_{g(p)+1}$, ..., $V_{l(p)}$, incrementing t by one unit and reiterating b), c) and d) with the new value of t;
commanding the controller, for an injection at the date $start_p + \Delta_{1,g(p)}$ of each controlled disturbing load p before the lane $a_{g(p)}$.

3. A method for merging, within a logistical warehouse, k incoming flows of payloads, transported respectively by k conveyors called lanes $\alpha_i$ with $i \in \{1, \ldots, k\}$, into one outgoing flow of payloads, transported by another conveyor called a collector, the logistical warehouse being such that:
the k lanes are of a "first-in-first-out" type, distributed along the collector and numbered $a_1$ to $a_k$ in one sense of movement of the collector, and
$\Delta_i$ is a time-related distance between the lanes $a_i$ and $a_k$ expressed in time units each corresponding to one time span of the collector,
the method being executed at least once by a control system, a given execution being done at an instant Tb and comprising:
obtaining a set comprising n payloads distributed at the instant Tb on the k lanes and having to be injected into the collector to form an exit sequence $\sigma$, each of the n payloads being identified by a single sequence number within the exit sequence $\sigma$, each of the k lanes containing an ordered set, in a rising order of sequence numbers, of $h_i$ payloads having to be injected one by one into the collector;

for each lane $a_i$, $i \in \{1, \ldots, k\}$, obtaining a set $U_i$ of dates not valid for an injection of one of the payloads of the lane $a_i$ into the collector because of a non-controlled disturbing load or another obstruction of a time span of the collector;

in not taking account of the sets $U_i$, $i \in \{1, \ldots, k\}$, computing a date $t_0$ at which the first payload $\sigma_1$ of the exit sequence a passes in front of the lane $a_k$;

for the first payload $\sigma_1$ of the exit sequence a, in assuming that the first payload $\sigma_1$ comes from the lane $a_i$:

a) initializing t with $t_0$;
b) if none of the dates t, $t-\Delta_{k-1}, t-\Delta_{k-2}, \ldots, t-\Delta_i$ belongs respectively to the sets $U_k, U_{k-1}, U_{k-2}, \ldots, U_i$, computing a date of injection of the first payload $\sigma_1 = \alpha_i(j)$; into the collector with the following formula: $T(u) = t - \Delta_i$, with $u = \sigma_1 = \alpha_i(j)$;
c) if one of the dates t, $t-\Delta_{k-1}, t-\Delta_{k-2}, \ldots, t-\Delta_i$ belongs respectively to one of the sets $U_k, U_{k-1}, U_{k-2}, \ldots, U_i$, incrementing t by one unit and reiterating b) and c) with the new value of t ;

for each following payload $\sigma_c$ of the exit sequence $\sigma$, $c \in \{2, \ldots, n\}$, in assuming that the following payload a comes from the lane a:

a') incrementing t by one unit, with t used to compute the date of injection of the preceding payload $\sigma_{c-1}$;
b') if none of the dates t, $t-\Delta_{k-1}, t-\Delta_{k-2}, \ldots, t-\Delta_i$ belongs respectively to the sets $U_k, U_{k-1}, U_{k-2}, \ldots, U_i$, computing a date of injection of the following payload $\sigma_c$ into the collector with the following formula: $T(u) = t - \Delta_i$, with $u = \sigma_c = \alpha_i(j)$;
c') if one of the dates t, $t-\Delta_{k-1}, t-\Delta_{k-2}, \ldots, t-\Delta_i$ belongs respectively to one of the sets $U_k, U_{k-1}, U_{k-2}, \ldots, u_i$, incrementing t by one unit and reiterating b') and c') with the new value of t;

commanding the collector and the k lanes for an injection of the n payloads into the collector in compliance with the n injection dates $T(u), \forall u \in L$.

4. The method according to claim 3, wherein the commanding the collector and the k lanes for an injection of the n payloads into the collector in compliance with the n injection dates $T(u), \forall u \in L$, is preceded by:

computing $t_{min}$ according to the following formula: $t_{min} = \min\{T(u), \forall u \in L\}$;

if $t_{min} > 0$, modifying the n injection dates according to the following formula: $T(u) = T(u) - t_{min} \forall u \in L$.

5. The method according to claim 3, wherein $\Delta_{i,i'}$ is a time-related distance between the lanes $a_i$ and $a_{i'}$ and expressed in time units each corresponding to a time span of the collector and the method furthermore comprises:

for each payload $u = \alpha_i(j) \in L$ coming from a lane $a_i$, computing the dates of passage of the payload in front of the lanes $a_i$ to $a_k$, the injection date $T(u)$ of the payload into the collector being known;

for each lane $a_i$, $i \in \{1, \ldots, k\}$, obtaining a set $V_i$ containing, on the one hand, each date of passage of one of the payloads in front of the lane $a_i$ and, on the other hand, the set $U_i$ of dates not valid for an injection of one of the payloads of the lane $a_i$ into the collector;

for each controlled disturbing load p of a disturbing flow controlled by a controller situated along the collector and before a lane $a_{g(p)}$ in the sense of movement of the collector, with $g(p) \in \{1, \ldots, k\}$, $a_{g(p)}$ also being the first lane, in the sense of movement of the collector, in front of which the controlled disturbing load passes:

a) initializing t with the date $\delta_1 - \Delta_1$, with $\delta_1$ representing the possible date of arrival of the first disturbing load in front of the lane $a_k$ if this load is not put on hold;
b) computing dates $t+\Delta_{1,g(p)}, t+\Delta_{1,g(p)+1}, \ldots, t+\Delta_{1,l(p)}$ of passage of the controlled disturbing load in front of the lanes $a_{g(p)}$ to $a_{l(p)}$, with $a_{l(p)}$ being the last lane, in the sense of movement of the collector, in front of which the controlled disturbing load passes;
c) if none of the dates $t+\Delta_{1,g(p)}, t+\Delta_{1,g(p)+1}, \ldots, t+\Delta_{1,l(p)}$ belongs respectively to the sets $V_{g(p)}, V_{g(p)+1}, \ldots, V_{l(p)}$, computing a fictitious date of passage $start_p$ of the controlled disturbing load pin front of the lane $a_1$, with the following formula: $start_p = t$;
d) if one of the dates $t+\Delta_{1,g(p)}, t+\Delta_{1,g(p)+1}, \ldots, t+\Delta_{1,l(p)}$ belongs respectively to one of the sets $V_{g(p)}, V_{g(p)+1}, \ldots, V_{l(p)}$, incrementing t by one unit and reiterating b), c) and d) with the new value of t;

commanding the controller for an injection at the date $start_p + \Delta_{1,g(p)}$ of each controlled disturbing load p before the lane $a_{g(p)}$.

6. The method according to claim 1, wherein the date to is computed with the following formula:

$$t_0 = \max_{u = a_i(j) \in L'} \{\Delta_i + 1 - \sigma(u)\},$$

with:
$u = \alpha_i(j) \in L'$, a payload of a set L' comprising payloads placed in first position of the lanes situated, according to the sense of movement of the collector, from the lane $a_1$ up to the lane $a_{i1}$ containing the first payload $\sigma_1$ of the exit sequence $\sigma$.

7. The method according to claim 1, wherein the method is executed iteratively, each new execution being carried out at a new instant Tb computed with the following formula: $Tb = T(u_{last}) - \Delta_1 + \Delta_{i^{last}}$, with $u_{last} = \alpha_{i^{last}}(j^{last})$ a last payload coming from the $(j^{last})^{th}$ position in the lane $\alpha_{i^{last}}$, of the exit sequence $\sigma$ of a preceding execution at a preceding instant Tb.

8. The method according to claim 1, wherein the method is executed iteratively, each new execution being carried out at a new instant Tb defined as an instant at which no load of the exit sequence $\sigma$ of a preceding execution at a preceding instant Tb is situated in a portion of the collector going from the first lane $a_1$ to the lane $\alpha_{i_1}$ containing the first load of the exit sequence $\sigma$ of the new execution at the new instant Tb.

9. The method according to claim 1, it wherein the method is executed iteratively, each new execution being carried out at a new instant Tb computed with the following formula: $Tb = Max(Tb+1, T(u_{last}) - \Delta_1 + \Delta_{i^{last}})$, with:

$u_{last} = \alpha_{i^{last}}(j^{last})$ being a last payload, coming from the $(j^{last})^{th}$ position in the lane $\alpha_{i^{last}}$, of the exit sequence $\sigma$ of a preceding execution at a preceding instant Tb, and (Tb+1) being obtained by an incrementing, by one unit, of the preceding instant Tb.

10. The method according to claim 3, wherein the date to is computed with the following formula:

$$t_0 = \max_{u = a_i(j) \in L'} \{\Delta_i + 1 - \sigma(u)\},$$

with:
- $u=\alpha_i(j)\in L'$, a payload of a set $L'$ comprising payloads placed in first position of the lanes situated, according to the sense of movement of the collector, from the lane $a_1$ up to the lane $a_{i1}$ containing the first payload $\sigma_1$ of the exit sequence $\sigma$.

11. The method according to claim 3, wherein the method is executed iteratively, each new execution being carried out at a new instant Tb computed with the following formula: $Tb=T(u_{last})-\Delta_1+\Delta_{i^{last}}$, with $u_{last}=\alpha_{i^{last}}(j^{last})$ a last payload coming from the $(j^{last})^{th}$ position in the lane $\alpha_{i^{last}}$, of the exit sequence $\sigma$ of a preceding execution at a preceding instant Tb.

12. The method according to claim 3, wherein the method is executed iteratively, each new execution being carried out at a new instant Tb defined as an instant at which no load of the exit sequence a of a preceding execution at a preceding instant Tb is situated in a portion of the collector going from the first lane $a_1$ to the lane $a_{i_1}$ containing the first load of the exit sequence $\sigma$ of the new execution at the new instant Tb.

13. The method according to claim 3, wherein the method is executed iteratively, each new execution being carried out at a new instant Tb computed with the following formula: $Tb=Max(Tb+1,T(u_{last})-\Delta_1+\Delta_{i^{last}})$, with:
- $u_{last}=\alpha_{i^{last}}(j^{last})$ being a last payload, coming from the $(j^{last})^{th}$ position in the lane $\alpha_{i^{last}}$, of the exit sequence a of a preceding execution at a preceding instant Tb, and
- (Tb+1) being obtained by an incrementing, by one unit, of the preceding instant Tb.

\* \* \* \* \*